US012196022B2

(12) United States Patent
Kajino et al.

(10) Patent No.: US 12,196,022 B2
(45) Date of Patent: Jan. 14, 2025

(54) VEHICLE DOOR DEVICE

(71) Applicant: AISIN CORPORATION, Kariya (JP)

(72) Inventors: Yusuke Kajino, Kariya (JP); Seiichi Sumiya, Kariya (JP); Masato Kumano, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/937,627

(22) Filed: Oct. 3, 2022

(65) Prior Publication Data

US 2023/0137554 A1 May 4, 2023

(30) Foreign Application Priority Data

Nov. 2, 2021 (JP) ................................ 2021-179835

(51) Int. Cl.

*E05D 15/10* (2006.01)
*E05D 3/12* (2006.01)
*E05D 7/00* (2006.01)
*E05D 11/00* (2006.01)
*E05F 15/00* (2015.01)

(52) U.S. Cl.

CPC ............. *E05D 15/101* (2013.01); *E05D 3/12* (2013.01); *E05D 7/0009* (2013.01); *E05D 11/00* (2013.01);

(Continued)

(58) Field of Classification Search

CPC .......... E05D 15/101; E05D 2015/1026; E05D 15/28; E05F 15/649; E05B 83/40;

(Continued)

(56) References Cited

U.S. PATENT DOCUMENTS 5,398,988 A * 3/1995 DeRees ................. E05D 15/101 49/213
6,183,039 B1 * 2/2001 Kohut ................. E05D 15/1081 296/146.12

(Continued)

FOREIGN PATENT DOCUMENTS

CN 116950526 A * 10/2023
CN 117103958 A * 11/2023 ............ B60J 5/0472

(Continued)

*Primary Examiner* — Catherine A Kelly
*Assistant Examiner* — Patrick B. Ponciano
(74) *Attorney, Agent, or Firm* — Oblon, McClelland, Maier & Neustadt, L.L.P.

(57) ABSTRACT

A vehicle door device includes: first and second link arms; a door-side engagement portion that is provided at a close-side end portion of the door that opens and closes a door opening of the vehicle; and a vehicle body-side engagement portion that is provided at a close-side end portion of the door opening that the close-side end portion of the door comes into contact with and separates from, in which one side of the door-side engagement portion and the vehicle body-side engagement portion includes an axial engagement portion extending in a vertical direction of the vehicle, the other side of the door-side engagement portion and the vehicle body-side engagement portion includes a guide groove having a pair of side wall portions, and the axial engagement portion is disposed inside the guide groove at an opening-and-closing operation position in the vicinity of a fully closed position of the door.

12 Claims, 35 Drawing Sheets

(52) U.S. Cl.
CPC ........... *E05F 15/00* (2013.01); *E05Y 2201/43* (2013.01); *E05Y 2201/624* (2013.01); *E05Y 2600/46* (2013.01); *E05Y 2600/626* (2013.01); *E05Y 2800/205* (2013.01); *E05Y 2900/531* (2013.01)

(58) Field of Classification Search
CPC .... E05B 83/04; E05B 83/363; E05B 65/0841; B60J 5/047
See application file for complete search history.

(56) References Cited

U.S. PATENT DOCUMENTS

| | | | | |
|---|---|---|---|---|
| 7,765,740 | B2 * | 8/2010 | Heuel | B60J 5/062<br>49/248 |
| 9,605,469 | B2 * | 3/2017 | Henseleit | E05F 15/614 |
| 11,441,346 | B2 * | 9/2022 | Caccaro | E05F 5/02 |
| 11,585,137 | B2 * | 2/2023 | Zindler | E05F 15/638 |
| 11,738,626 | B2 * | 8/2023 | Sumiya | E05D 15/101<br>296/146.12 |
| 2006/0249983 | A1 * | 11/2006 | Heuel | E05F 15/638<br>296/155 |
| 2016/0076277 | A1 * | 3/2016 | Kouzuma | E05C 3/12<br>292/201 |
| 2016/0237733 | A1 * | 8/2016 | Henseleit | E05D 15/28 |
| 2018/0074555 | A1 * | 3/2018 | Meguro | G06F 1/1635 |
| 2022/0205293 | A1 * | 6/2022 | Sumiya | E05D 15/101 |

FOREIGN PATENT DOCUMENTS

| | | | | |
|---|---|---|---|---|
| JP | 2006-90097 | A | 4/2006 | |
| JP | 2008-163693 | A | 7/2008 | |
| JP | 2024089885 | A * | 7/2024 | |
| WO | WO-2014162840 | A1 * | 10/2014 | B60J 5/06 |

* cited by examiner

SHORTENED STATE

EXTENDED STATE : P0

VEHICLE DOOR DEVICE

CROSS REFERENCE TO RELATED APPLICATIONS

This application is based on and claims priority under 35 U.S.C. § 119 to Japanese Patent Application No. 2021-179835, filed on Nov. 2, 2021, the entire content of which is incorporated herein by reference.

TECHNICAL FIELD

The present disclosure relates to a vehicle door device.

BACKGROUND DISCUSSION

In the related art, there has been a vehicle door device including a first link arm and a second link arm that include a first rotation coupling point with respect to a vehicle body, and a second rotation coupling point with respect to a door of a vehicle. In such a vehicle door device, the door provided in a door opening performs opening-and-closing operation, based on the operation of a link mechanism formed by the first link arm and the second link arm. Furthermore, for example, JP 2006-90097 A discloses a configuration in which each link arm forming a link mechanism is housed at a position outside a door opening mounted on a terminal portion of a vehicle body side portion and inside a weather strip mounted on a vehicle interior side of the door in a case where the door is in a closed state. For example, JP 2008-163693 A discloses a configuration in which such a link mechanism formed by each link arm is combined with a structure in which a guide rail on a vehicle body side and a guide roller unit on a door side engage with each other.

However, in a configuration of supporting a door of a vehicle on a vehicle body via the link mechanism formed by the first and second link arms as described above, the first and second link arms are more likely to be brought closer to each other and be linearly aligned in a case where the door is located in the vicinity of a fully closed position. Therefore, there is a problem that it is difficult to stably support the door.

A need thus exists for a vehicle door device which is not susceptible to the drawback mentioned above.

SUMMARY

A vehicle door device includes: first and second link arms that have a first rotation coupling point with respect to a vehicle body and a second rotation coupling point with respect to a door of a vehicle; a door-side engagement portion that is provided at a close-side end portion of the door that opens and closes a door opening of the vehicle based on operation of a link mechanism formed by the first and second link arms; and a vehicle body-side engagement portion that is provided at a close-side end portion of the door opening that the close-side end portion of the door comes into contact with and separates from based on opening-and-closing operation of the door, in which one side of the door-side engagement portion and the vehicle body-side engagement portion includes an axial engagement portion extending in a vertical direction of the vehicle, the other side of the door-side engagement portion and the vehicle body-side engagement portion includes a guide groove having a pair of side wall portions facing each other in a vehicle width direction and extending in an opening-and-closing operation direction of the door, and the axial engagement portion is disposed inside the guide groove at an opening-and-closing operation position in the vicinity of a fully closed position of the door at which the door-side engagement portion and the vehicle body-side engagement portion are engaged with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Hereinafter, the first embodiment embodying a vehicle door device will be described with reference to the drawings.

Figure 1:
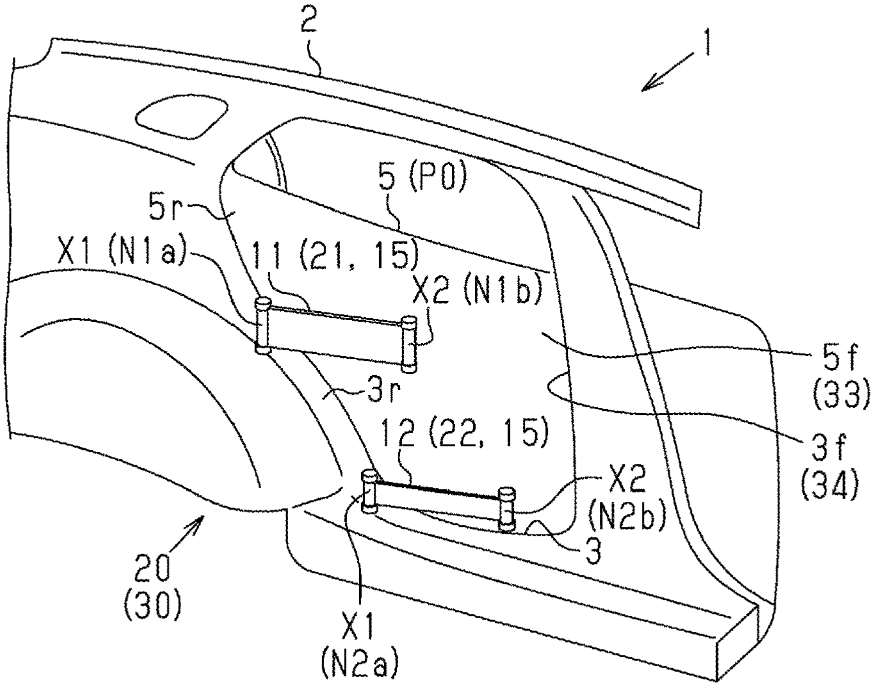
FIG. 1 is a perspective view of a vehicle door device.
Figure 2:
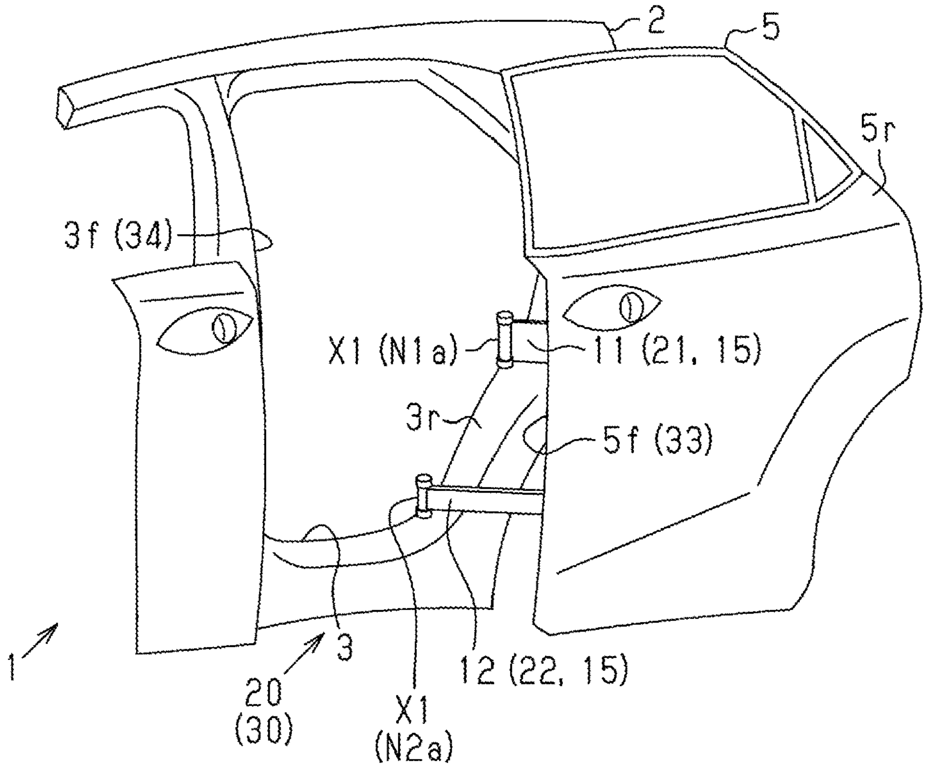
FIG. 2 is a perspective view of a vehicle door device.

As illustrated in FIGS. 1 and 2, a vehicle 1 of the present embodiment includes a door opening 3 provided on a side surface of a vehicle body 2. The door opening 3 is provided with a first link arm 11 and a second link arm 12 which support a door 5 of the vehicle 1 at the door opening 3.

More specifically, in the vehicle 1 of the present embodiment, the first and second link arms 11 and 12 each have a first rotation coupling point X1 with respect to the vehicle body 2 and a second rotation coupling point X2 with respect to the door 5. Specifically, the first link arm 11 is coupled to the vehicle body 2 in a state of being axially supported by a support shaft N1*a* extending in a vertical direction (in FIG. 1 and FIG. 2, a vertical direction), and is coupled to the door 5 in a state of being axially supported by a support shaft N1*b* extending in the vertical direction. The second link arm 12 is also coupled to the vehicle body 2 in a state of being axially supported by a support shaft N2*a* extending in the vertical direction, and is also coupled to the door 5 in a state of being axially supported by a support shaft N2*b* extending in the vertical direction.

That is, as illustrated in FIGS. 3 to 6, in the vehicle 1 of the present embodiment, the first and second link arms 11 and 12 form a link mechanism 15 having a configuration as a four-joint link. The vehicle 1 of the present embodiment is configured such that the door 5 supported by the door opening 3 is opened and closed based on the operation of the link mechanism 15.

More specifically, as illustrated in FIGS. 1 and 2, the vehicle 1 of the present embodiment uses the first and second link arms 11 and 12 to support the door 5 on the door opening 3 on a vehicle rear side (left side in FIG. 1, right side in FIG. 2). In the vehicle 1 of the present embodiment, the first and second link arms 11 and 12 each have the first rotation coupling point X1 rotatably coupled to the vehicle body 2 in the vicinity of a rear edge portion 3*r* of the door opening 3. In the vehicle 1 of the present embodiment, the first and second link arms 11 and 12 are disposed to be separated from each other in the vertical direction.

In the vehicle 1 of the present embodiment, the first link arm 11 is provided above the second link arm 12. Furthermore, the first link arm 11 has the second rotation coupling point X2 rotatably coupled to the door 5 at a substantially central position in a horizontal direction of the door 5. On the other hand, the second link arm 12 has the second rotation coupling point X2 coupled to the door 5 in the vicinity of a front end portion 5*f* of the door 5. Accordingly, in the vehicle 1 of the present embodiment, a vehicle door device 20, in which the door 5 is opened and closed based on the operation of the link mechanism 15 formed by the first and second link arms 11 and 12, is formed.

Specifically, as illustrated in FIGS. 3 to 6, in the vehicle door device 20 of the present embodiment, the first and second link arms 11 and 12 rotate around the first rotation coupling point X1 in a counterclockwise direction at the time of the opening operation of the door 5. Accordingly, the door 5 of the vehicle 1 supported by the first and second link arms 11 and 12 performs opening operation toward the vehicle rear side (left side in FIGS. 3 to 6).

Furthermore in the vehicle door device 20 of the present embodiment, the first and second link arms 11 and 12 rotate around the first rotation coupling point X1 in a clockwise direction at the time of the closing operation of the door 5 in FIGS. 3 to 6. Accordingly, the door 5 of the vehicle 1 supported by the first and second link arms 11 and 12 performs closing operation toward a vehicle front side (right side in FIGS. 3 to 6).

Figure 3:
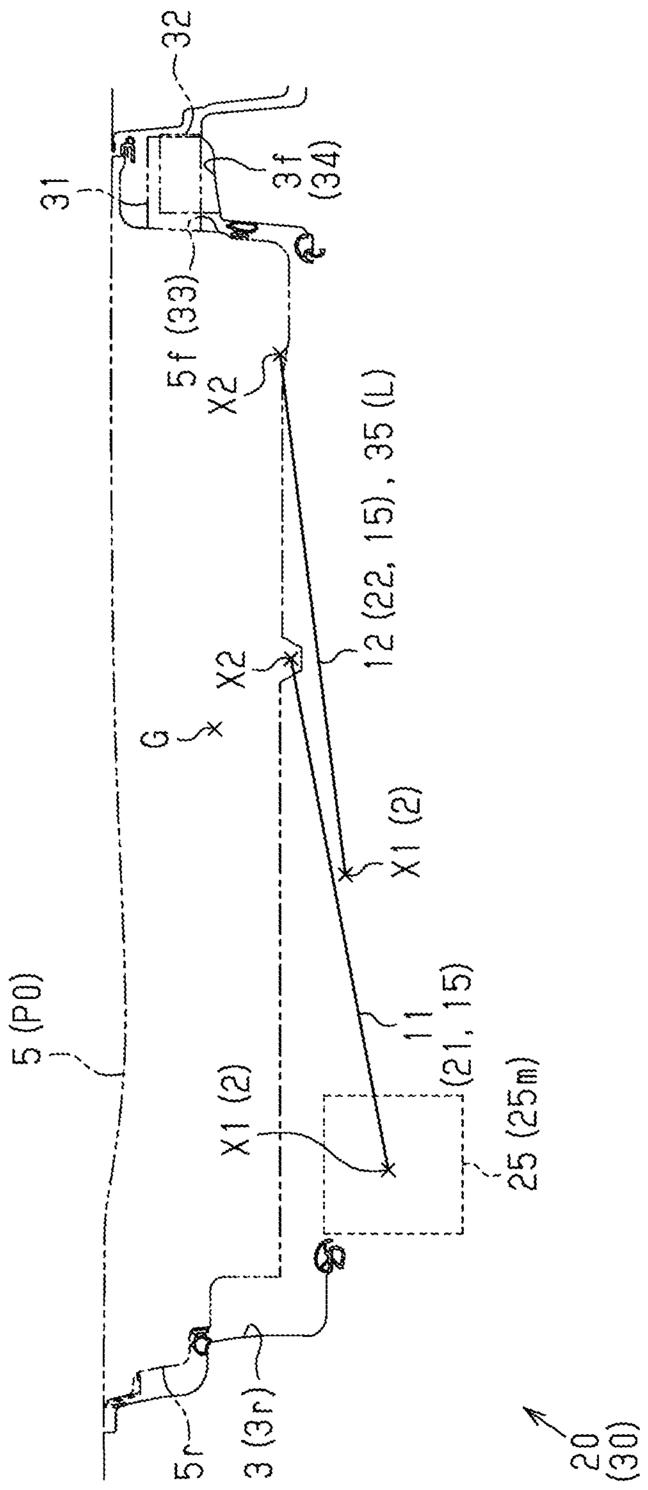
FIG. 3 is a plan view of first and second link arms forming a link mechanism.
Figure 4:
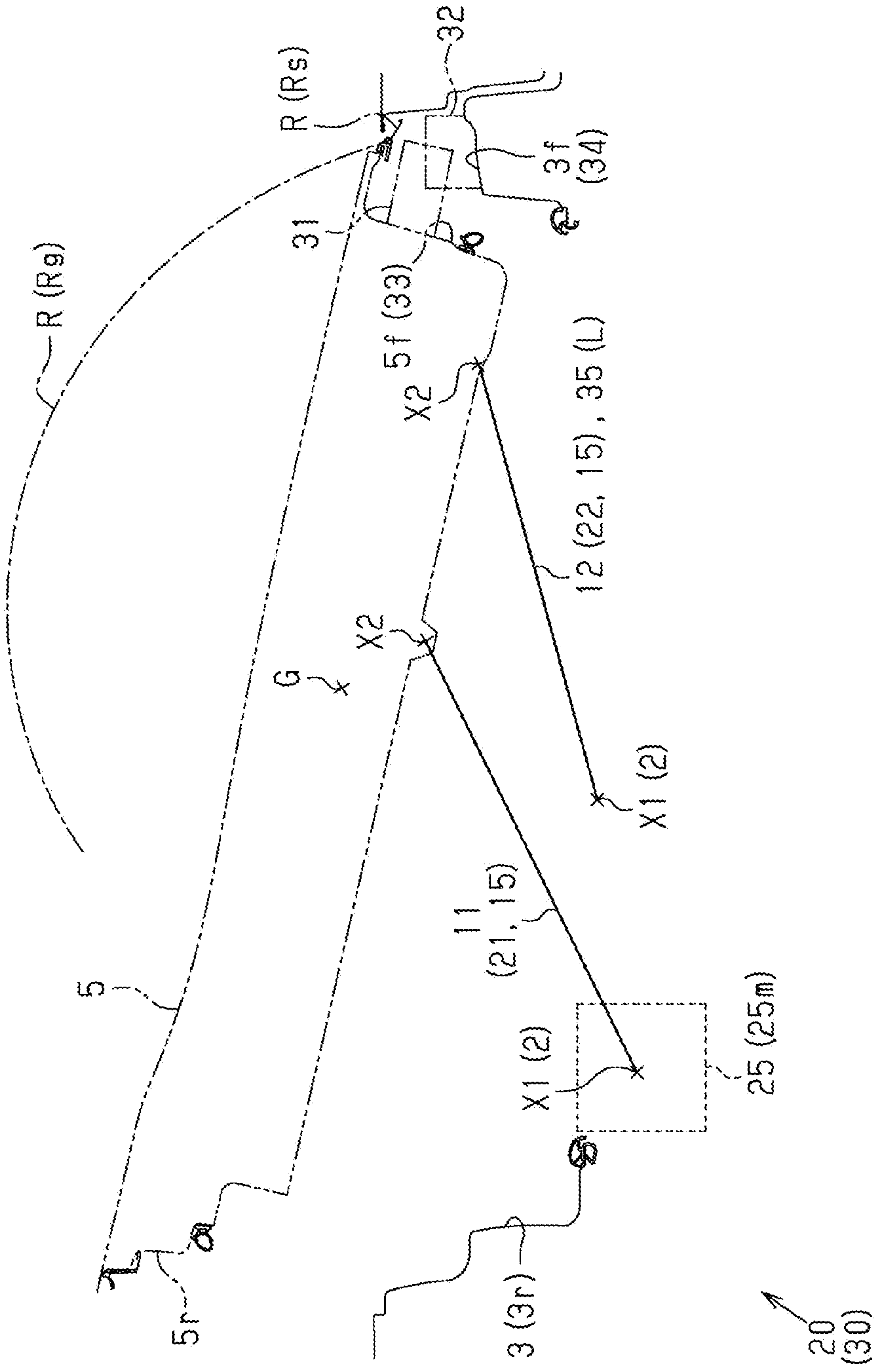
FIG. 4 is a plan view of first and second link arms forming a link mechanism.
Figure 5:
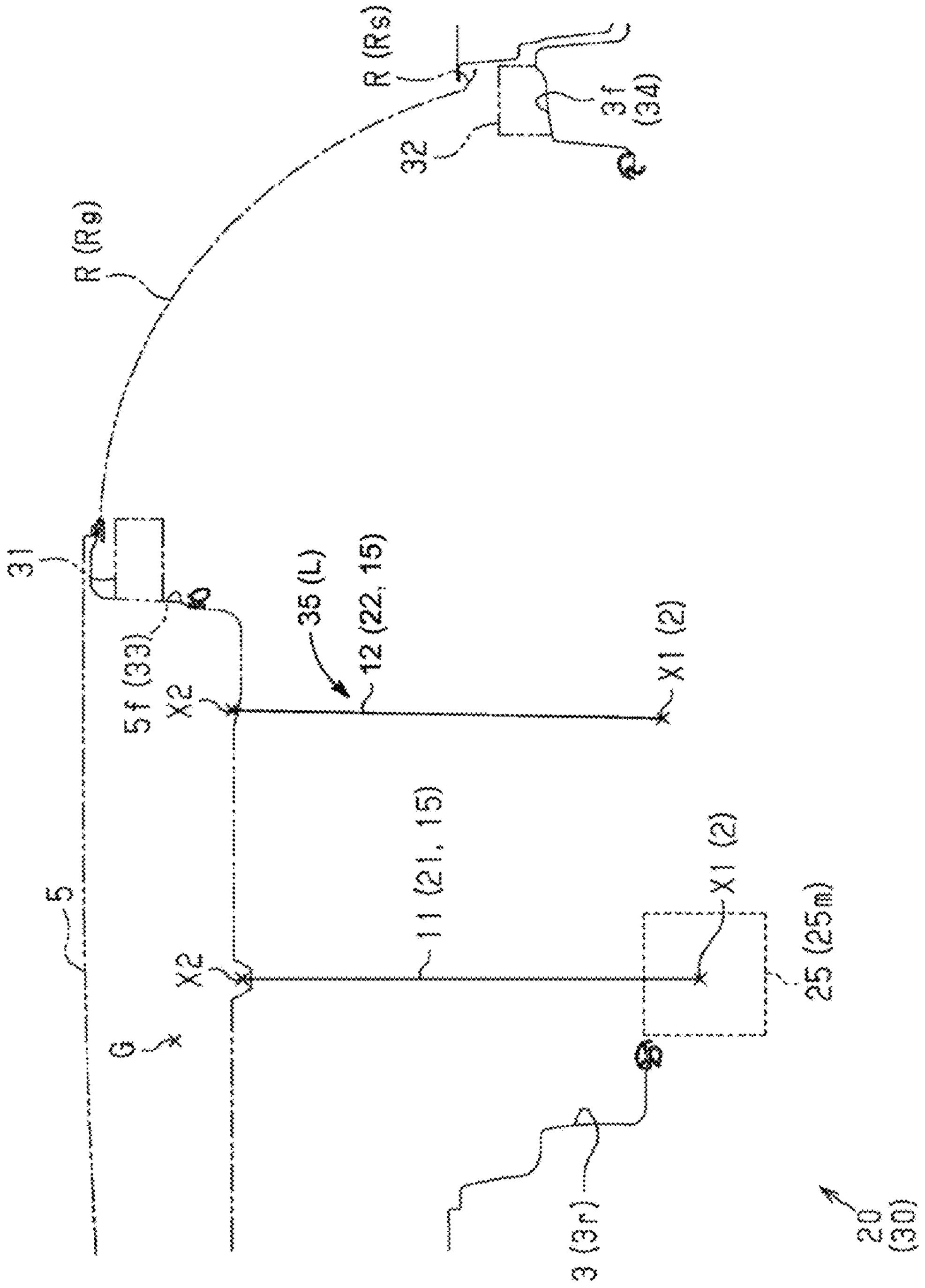
FIG. 5 is a plan view of first and second link arms forming a link mechanism.
Figure 6:
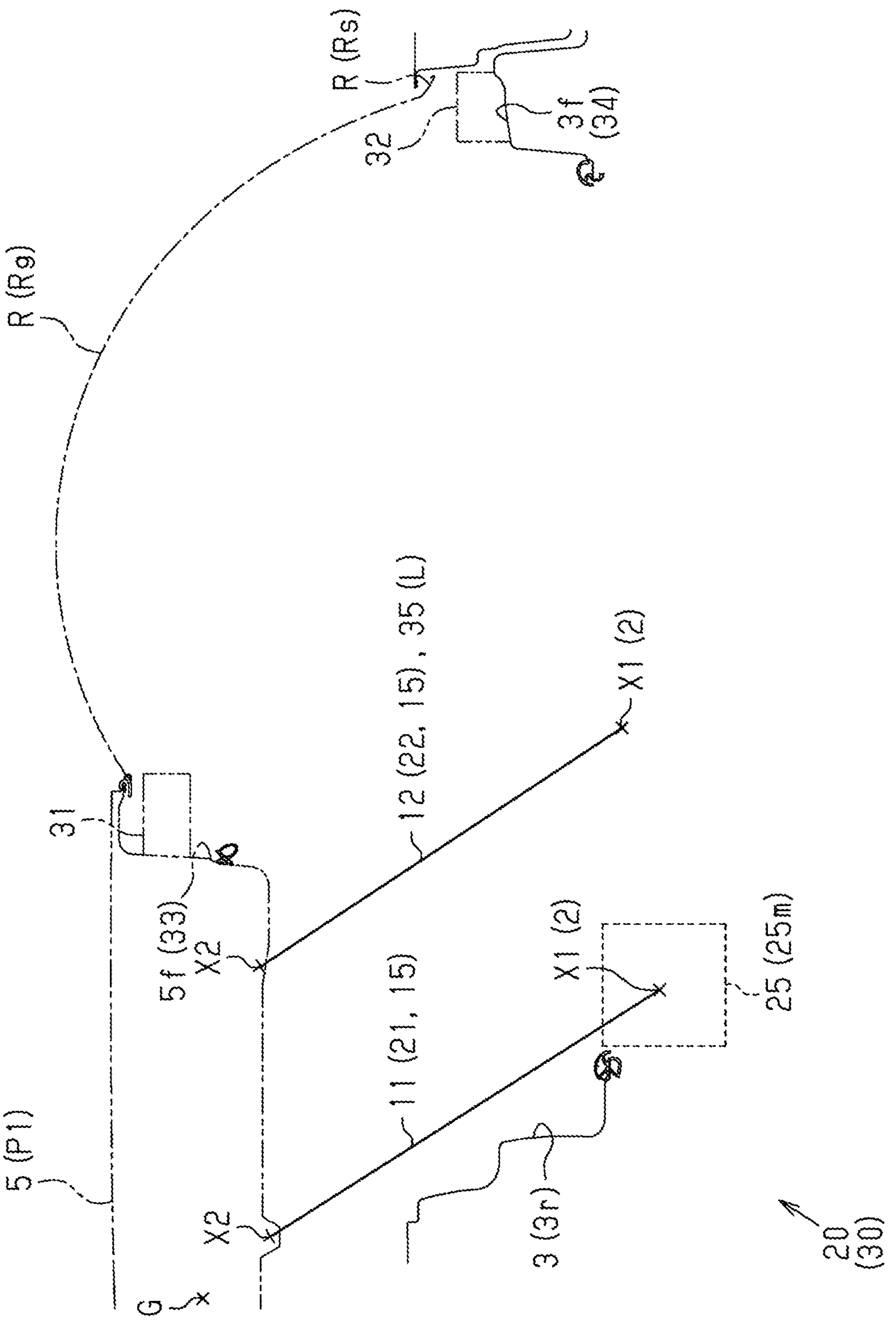
FIG. 6 is a plan view of first and second link arms forming a link mechanism.

Moreover, in the vehicle door device 20 of the present embodiment, an opening-and-closing operation trajectory R of the door 5 is defined so as to draw an arc-shaped glide trajectory Rg based on the operation of the link mechanism 15 formed by the first and second link arms 11 and 12. That is, as illustrated in FIG. 5, at an intermediate position at which the first and second link arms 11 and 12 extend in a vehicle width direction (in FIGS. 3 to 6, in a vertical direction), a movement component in a vehicle horizontal direction increases. As illustrated in FIGS. 3 and 4, the first and second link arms 11 and 12 are in a state of extending in the vehicle horizontal direction (in FIGS. 3 to 6, in a horizontal direction) as an opening-and-closing operation position of the door 5 is closer to a fully closed position P0, and thus the movement component in the vehicle width direction increases.

Furthermore, in the vehicle door device 20 of the present embodiment, the first link arm 11 has the second rotation coupling point X2 with respect to the door 5 at a position closer to the center of gravity G as compared with the second link arm 12. That is, in the vehicle door device 20 of the present embodiment, the first link arm 11 is thus positioned as a main link 21 that supports a larger door load. The second link arm 12 is positioned as a sub-link 22 in which the acting door load is relatively small.

In the vehicle door device 20 of the present embodiment, the first link arm 11 has an outer shape larger than the second link arm 12. Accordingly, the vehicle door device 20 of the present embodiment is configured to impart high support rigidity to the first link arm 11 positioned as the main link 21.

Furthermore, the vehicle door device 20 of the present embodiment includes an actuator 25 that rotationally drives the first link arm 11 by using a motor **25*m* as a drive source. In the vehicle door device 20 of the present embodiment, the actuator 25 is provided at a base end portion of the first link arm 11. That is, the actuator 25 of the present embodiment drives the link mechanism 15 formed by the first link arm 11 and the second link arm 12 by rotating the first link arm 11. Accordingly, the vehicle door device 20 of the present embodiment has a configuration as a power door device 30 capable of opening and closing the door 5 based on a drive force of the actuator 25**.

Furthermore, as illustrated in FIGS. 3 to 7, the vehicle door device 20 of the present embodiment includes a door-side engagement portion 31 provided at the front end portion **5*f* of the door 5 and a vehicle body-side engagement portion 32 provided at a front edge portion 3*f* of the door opening 3. That is, in the vehicle 1 of the present embodiment, the door-side engagement portion 31 is provided at a close-side end portion 33 located on the closing operation side of the door 5 that opens and closes the door opening 3 of the vehicle 1 based on the operation of the link mechanism 15 formed by the first and second link arms 11 and 12**.

Moreover, the vehicle body-side engagement portion 32 is provided at a close-side end portion 34 of the door opening 3 which the close-side end portion 33 of the door 5 comes into contact with or separates from, that is, approaches or separates from, based on the opening-and-closing operation of the door 5 moving in the vehicle horizontal direction. The vehicle door device 20 of the present embodiment is configured such that the door-side engagement portion 31 and the vehicle body-side engagement portion 32 are engaged with each other in a state in which the door 5 is in the vicinity of the fully closed position P0.

Figure 8:
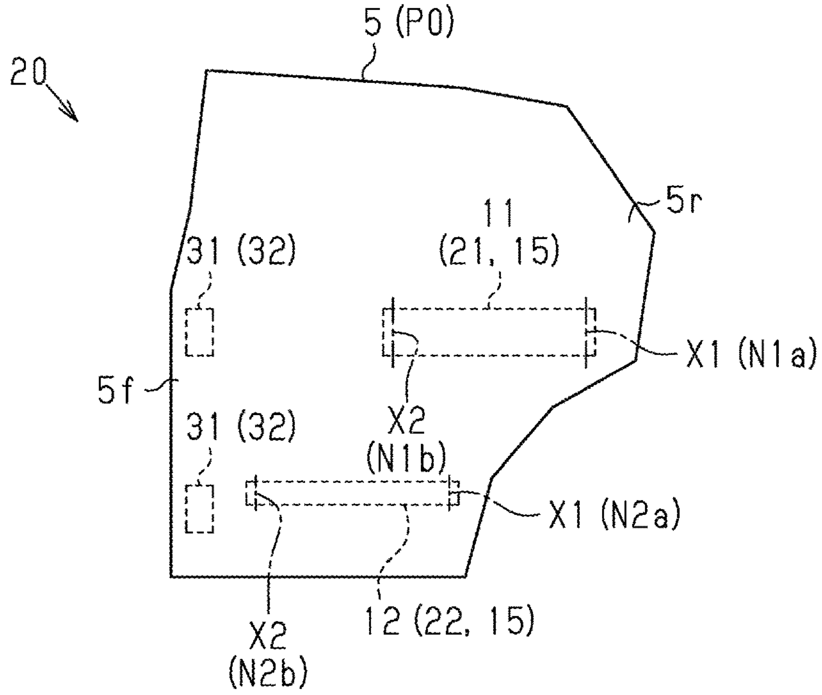
FIG. 8 is an explanatory diagram illustrating arrangement of a door-side engagement portion and a vehicle body-side engagement portion.
Figure 9:
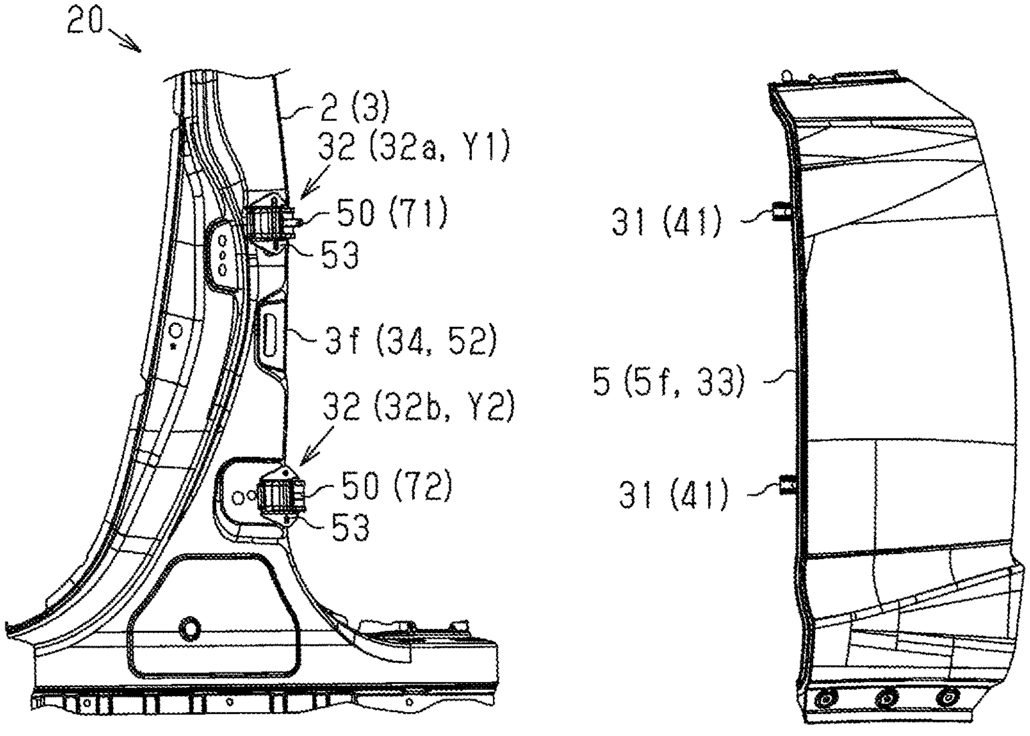
FIG. 9 is a perspective view of a door and a door opening, illustrating arrangement of a door-side engagement portion and a vehicle body-side engagement portion.
Figure 10:
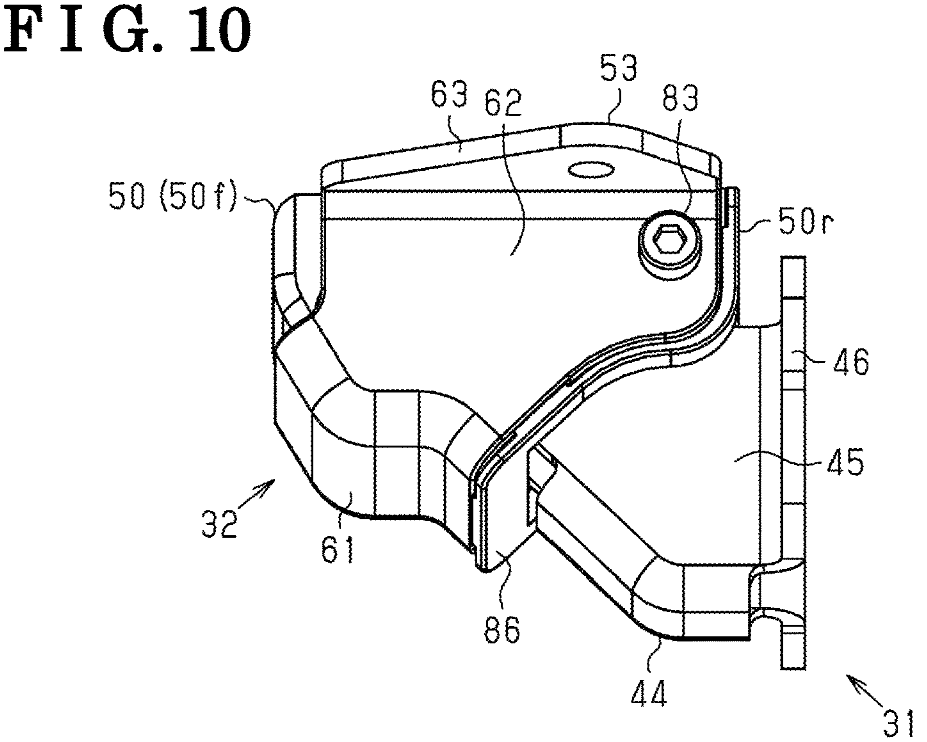
FIG. 10 is a perspective view illustrating a door-side engagement portion and a vehicle body-side engagement portion.
Figure 11:
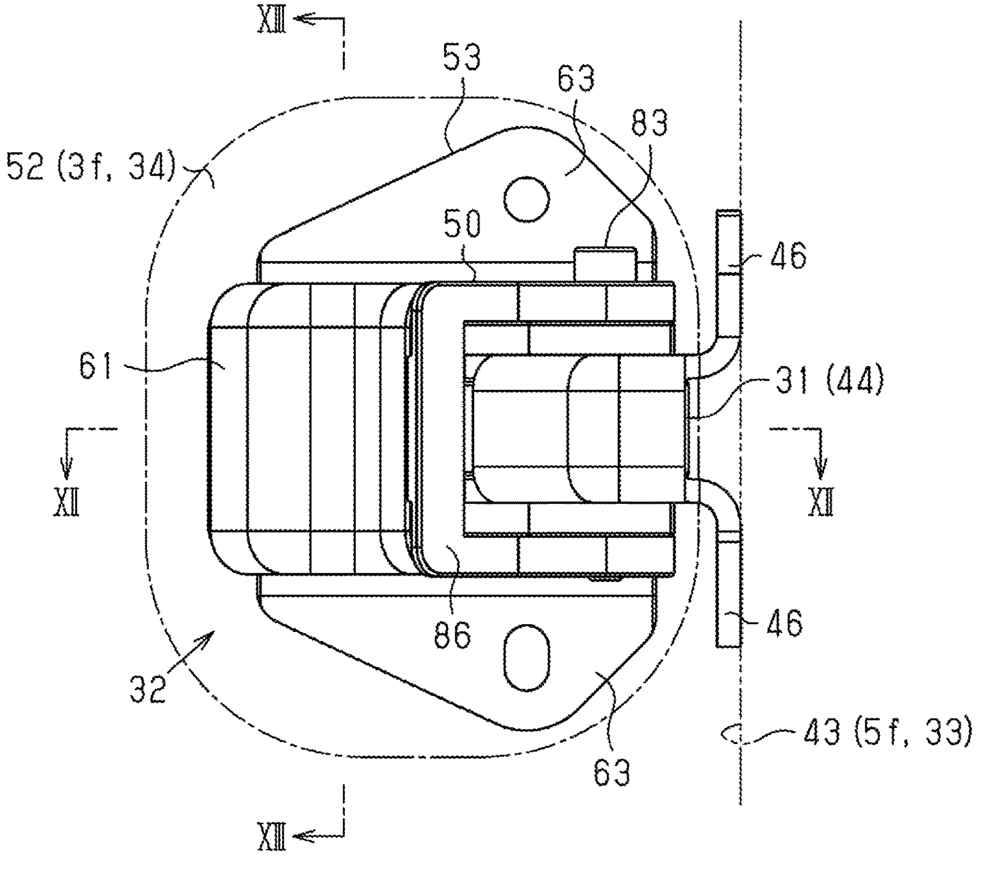
FIG. 11 is a side view illustrating a door-side engagement portion and a vehicle body-side engagement portion.

Specifically, as illustrated in FIGS. 8 to 9, the vehicle door device 20 of the present embodiment includes the door-side engagement portions 31 and 31 provided at the front end portion **5*f* of the door 5 at two positions separated in the vertical direction. Moreover, the vehicle door device 20 includes the vehicle body-side engagement portions 32 and 32 provided at the front edge portion 3*f* of the door opening 3 at two positions separated in the vertical direction in a similar manner. The vehicle door device 20 of the present embodiment is configured to hold the door 5 at the fully closed position P0 in a state in which the door-side engagement portions 31 and 31, and the vehicle body-side engagement portions 32 and 32** are engaged with each other.

Furthermore, as illustrated in FIGS. 3 to 6, in the vehicle door device 20 of the present embodiment, the second link arm 12 positioned as the sub-link 22 is provided with a connection length variable mechanism 35 capable of changing a connection length L between the first rotation coupling point X1 and the second rotation coupling point X2.

Moreover, the connection length variable mechanism 35 is biased in a direction of shortening the length between the first rotation coupling point X1 and the second rotation coupling point X2, that is, the connection length L of the door 5 by the second link arm 12 provided with the connection length variable mechanism 35. Accordingly, the vehicle door device 20 of the present embodiment is configured to open and close the door 5 in a state in which the connection length L is shortened by the second link arm 12.

Figure 7:
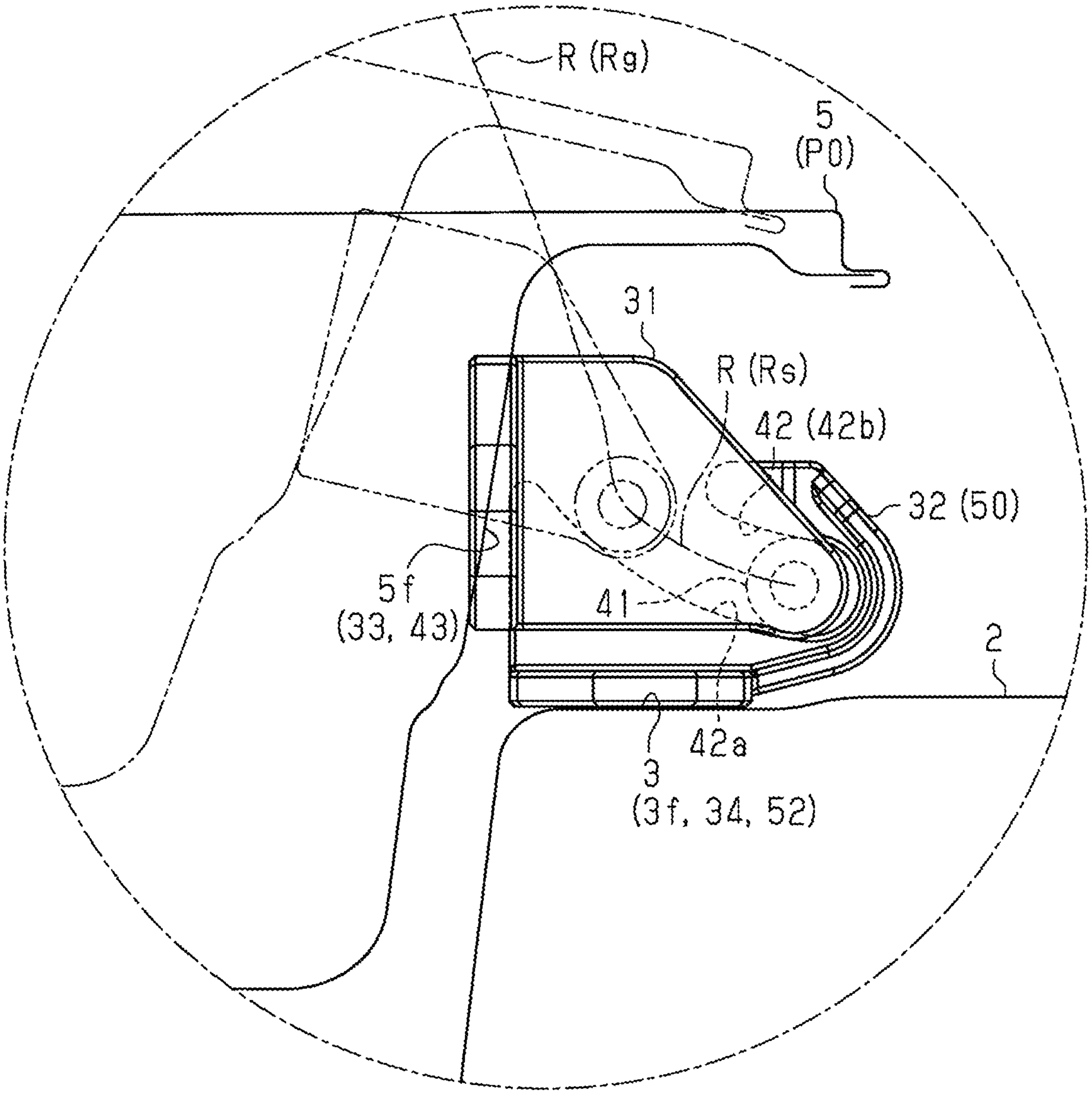
FIG. 7 is a schematic configuration diagram illustrating a door-side engagement portion and a vehicle body-side engagement portion.

Moreover, as illustrated in FIGS. 3, 4, and 7, in the vehicle door device 20 of the present embodiment, the opening-and-closing operation of the door 5 in a state in which the door-side engagement portion 31 and the vehicle body-side engagement portion 32 are engaged with each other is permitted based on the operation of the connection length variable mechanism 35 provided in the second link arm 12. That is, in the vicinity of the fully closed position P0 at which the door-side engagement portion 31 and the vehicle body-side engagement portion 32 are engaged with each other, the connection length L of the door 5 by the second link arm 12 changes, and thus the orientation of the door 5 supported by the link mechanism 15 formed by the first and second link arms 11 and 12 changes. Accordingly, the vehicle door device 20 of the present embodiment is configured such that the door 5 is opened and closed in a mode in which the front end portion **5*f* side of the door 5 provided with the door-side engagement portion 31 moves in the vehicle horizontal direction and a rear end portion 5*r*** side moves in the vehicle width direction.

Specifically, for example, at the time of the closing operation of the door 5 toward the fully closed position P0, the door 5 is in an inclined orientation in which the rear end portion **5*r* side protrudes outward in the vehicle width direction (upper side in FIGS. 3, 4, and 7) as compared with the front end portion 5*f* side. Furthermore, at this time, in a state in which the door-side engagement portion 31 and the vehicle body-side engagement portion 32 are engaged with each other, the drive force of the actuator 25 or manual operation force is applied in a direction in which the door 5 is closed. Moreover, the connection length variable mechanism 35 provided in the second link arm 12 operates based on a force for closing the door 5, and thus the connection length L of the door 5 by the second link arm 12 is extended based on the engagement state between the door-side engagement portion 31 and the vehicle body-side engagement portion 32. Accordingly, the vehicle door device 20 of the present embodiment is configured such that the door 5 supported by the link mechanism 15 is fully closed in a mode in which the front end portion 5***f* side draws a linear slide trajectory Rs with movement of the rear end portion 5*r* side inward in the vehicle width direction.

Furthermore, also at the time of the opening operation from the state in which the door 5 is at the fully closed position P0, in a state in which the door-side engagement portion 31 and the vehicle body-side engagement portion 32 are engaged with each other, the drive force of the actuator 25 or manual operation force is applied in a direction in which the door 5 is opened. Moreover, the connection length variable mechanism 35 operates based on a force for opening the door 5, and thus the connection length L of the door 5 by the second link arm 12 is shortened based on the engagement state between the door-side engagement portion 31 and the vehicle body-side engagement portion 32. Accordingly, the vehicle door device 20 of the present embodiment is configured such that the door 5 supported by the link mechanism 15 is opened in a mode in which the front end portion 5*f* side draws a linear slide trajectory Rs with movement of the rear end portion 5*r* side outward in the vehicle width direction.

Door-Side Engagement Portion and Vehicle Body-Side Engagement Portion

Next, configurations of the door-side engagement portion 31 and the vehicle body-side engagement portion 32 in the vehicle door device 20 of the present embodiment will be described.

As illustrated in FIGS. 7 and 9 to 14, in the vehicle door device 20 of the present embodiment, the door-side engagement portion 31 includes an axial engagement portion 41 extending in the vertical direction of the vehicle 1 (in FIGS. 7 and 12, a direction orthogonal to the paper surface, and in FIGS. 11 and 13, the vertical direction) of the vehicle 1. Furthermore, the vehicle body-side engagement portion 32 includes a guide groove 42 having a pair of side wall portions 42*a* and 42*b* facing each other in the vehicle width direction (in FIGS. 7 and 12, the vertical direction, and in FIG. 13, the horizontal direction) and extending in an opening-and-closing operation direction of the door 5. The vehicle door device 20 of the present embodiment is configured such that the door-side engagement portion 31 and the vehicle body-side engagement portion 32 are engaged with each other in a state in which the axial engagement portion 41 is disposed inside the guide groove 42 in a case where the door 5 is in the vicinity of the fully closed position P0.

Figure 12:
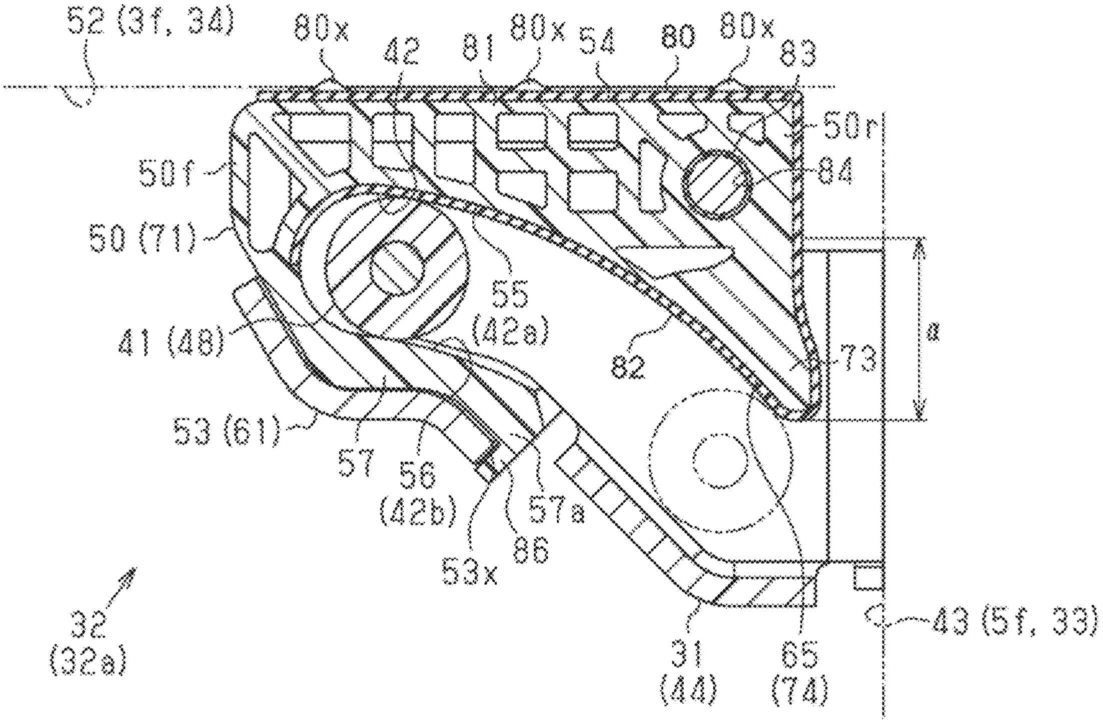
FIG. 12 is a cross-sectional view illustrating a door-side engagement portion and a vehicle body-side engagement portion.

That is, as illustrated in FIGS. 7 and 12, the axial engagement portion 41 of the door-side engagement portion 31 is disposed inside the guide groove 42 of the vehicle body-side engagement portion 32 in a state of being sandwiched between a pair of the side wall portions 42*a* and 42*b* facing each other in the vehicle width direction, and thus the displacement of the door 5 in the vehicle width direction is regulated.

Accordingly, the vehicle door device 20 of the present embodiment can stably support the door 5 even at the opening-and-closing operation position in the vicinity of the fully closed position P0 at which the first and second link arms 11 and 12 are likely to be aligned (see FIGS. 3 and 4).

Moreover, when the door 5 is opened and closed in this state, the axial engagement portion 41 is apparently relatively displaced along the extending direction of the guide groove 42 along with the change of the connection length L based on the operation of the connection length variable mechanism 35. Accordingly, the opening-and-closing operation trajectory R of the door 5 changes, that is, the arc-shaped glide trajectory Rg based on the operation of the link mechanism 15 changes to the linear slide trajectory Rs.

More specifically, as illustrated in FIGS. 10 to 16, the door-side engagement portion 31 of the present embodiment includes a support bracket 44 fixed to an installation surface 43 (see FIG. 7) set at the close-side end portion 33 of the door 5. Specifically, the support bracket 44 includes a pair of support walls 45 and 45 facing each other in the vertical direction (in FIGS. 15 and 16, the vertical direction), and a pair of flange portions 46 and 46 provided at base end portions of the support walls 45 and 45. In the vehicle door device 20 of the present embodiment, the support walls 45 and 45 and the flange portions 46 and 46 are integrally formed by bending a metal plate material. Furthermore, the installation surface 43 on the door 5 side to which the support bracket 44 is fixed is set at the front end portion 5*f* of the door 5 to be the close-side end portion 33 in a direction in which the door 5 is closed, that is, at a position facing the vehicle front side.

The support bracket 44 of the present embodiment is configured such that the pair of the flange portions 46 and 46 is fastened to the installation surface 43 on the door 5 side.

Furthermore, the door-side engagement portion 31 of the present embodiment includes a support shaft 47 placed between a pair of the support walls 45 and 45 constituting the support bracket 44. In the support bracket 44 of the present embodiment, the support shaft 47 is provided at the distal end portions of the support walls 45 and 45 protruding toward the vehicle front side from the installation surface 43 on the door 5 side set at the front end portion 5*f*. Moreover, the door-side engagement portion 31 includes a roller 48 axially supported to be rotatable by the support shaft 47. Accordingly, the vehicle door device 20 of the present embodiment is configured such that the roller 48 functions as the axial engagement portion 41 of the door-side engagement portion 31 axially supported to be rotatable.

On the other hand, as illustrated in FIGS. 10 to 14, in the vehicle door device 20 of the present embodiment, the vehicle body-side engagement portion 32 includes a guide member 50 forming the guide groove 42. The vehicle body-side engagement portion 32 of the present embodiment includes a fixing bracket 53 that fixes the guide member 50 to the installation surface 52 set at the close-side end portion 34 of the door opening 3.

Figure 13:
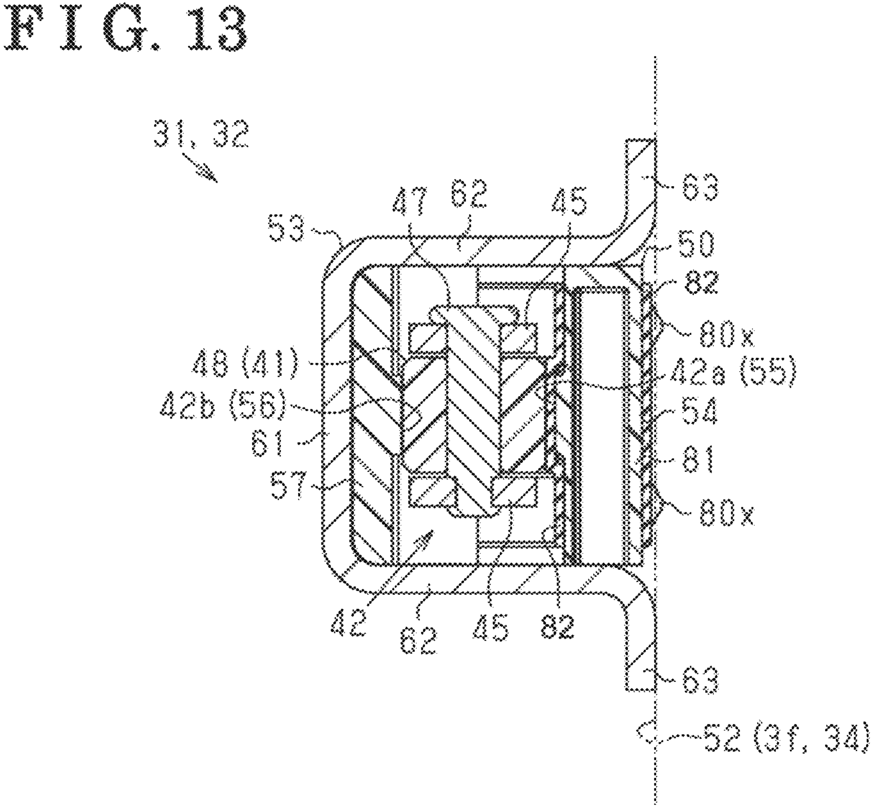
FIG. 13 is a cross-sectional view illustrating a door-side engagement portion and a vehicle body-side engagement portion.

More specifically, in the vehicle 1 of the present embodiment, an installation surface 52 on the vehicle body 2 side to which the guide member 50 and the fixing bracket 53 are fixed is set at the front edge portion 3*f* of the door opening 3 at a position facing outward in the vehicle width direction (lower side in FIG. 12, left side in FIG. 13). The fixing bracket 53 of the present embodiment is configured to fix the guide member 50 in a state in which a formation portion of the guide groove 42 provided in the guide member 50 is sandwiched between the fixing bracket 53 and the installation surface 52 on the vehicle body 2 side.

Specifically, the guide member 50 of the present embodiment has a fixing surface 54 with respect to the installation surface 52 on the vehicle body 2 side, and a first facing surface 55 facing outward in the vehicle width direction in a state in which the guide member 50 is fixed to the installation surface 52. That is, in the guide member 50 of the present embodiment, the fixing surface 54 and the first facing surface 55 face in directions opposite to each other. Moreover, the guide member 50 includes an engagement piece 57 having a second facing surface 56 facing the first facing surface 55.

The guide member 50 of the present embodiment is configured to form the guide groove 42 by using the first facing surface 55 and the second facing surface 56 as a pair of the side wall portions 42*a* and 42*b* facing each other in the vehicle width direction.

That is, in the guide member 50 of the present embodiment, the engagement piece 57 has a substantially plate-like outer shape protruding toward the vehicle rear side (in FIG. 12, from the left side to the right side) from a front end portion 50*f* of the guide member 50, which is disposed on the vehicle front side in a state in which the guide member 50 is fixed to the installation surface 52. Accordingly, the guide member 50 of the present embodiment is configured to form the guide groove 42 that opens in the vertical direction of the vehicle 1 and to the vehicle rear side.

Furthermore, the fixing bracket 53 of the present embodiment has an outer shape having a substantially cross section U-shape that covers the front end portion 50*f* of the guide member 50 forming the guide groove 42. Specifically, the fixing bracket 53 includes a regulation wall 61 that abuts on the engagement piece 57 provided at the front end portion 50*f* of the guide member 50 from the outside in the vehicle width direction. Moreover, the fixing bracket 53 has a pair of side wall portions 62 and 62 that covers the guide member 50 in the vertical direction in a state of being continuous with the regulation wall 61. The fixing bracket 53 has a pair of flange portions 63 and 63 provided at the base end portions of the side wall portions 62 and 62.

In the fixing bracket 53 of the present embodiment, the regulation wall 61, the side wall portions 62 and 62, and the flange portions 63 and 63 are integrally formed by bending a metal plate material. Moreover, a pair of the flange portions 63 and 63 of the fixing bracket 53 is fastened to the installation surface 52 on the vehicle body 2 side. The fixing bracket 53 of the present embodiment is configured to sandwich the front end portion 50*f* side of the guide member 50 including the engagement piece 57, that is, the formation portion of the guide groove 42, between the regulation wall 61 and the installation surface 52 on the vehicle body 2 side.

Furthermore, as illustrated in FIGS. 9 to 14, 17, and 18 to 20, in the vehicle door device 20 of the present embodiment, there is a difference in the shape of each of the guide members 50 constituting two vehicle body-side engagement portions 32 and 32 provided to be separated from each other in the vertical direction.

More specifically, the guide member 50 of the present embodiment includes a guide surface 65 continuous with the guide groove 42. Specifically, the guide surface 65 is provided at a rear end portion 50*r* of the guide member 50 disposed on the vehicle rear side in a state in which the guide member 50 is fixed to the installation surface 52. Moreover, the guide surface 65 is provided continuously with the first facing surface 55 of the guide member 50, that is, one side wall portion 42*a* forming the guide groove 42 in a state of facing outward in the vehicle width direction. That is, the axial engagement portion 41 that is engaged with or disengaged from the guide groove 42 of the guide member 50 based on the opening-and-closing operation of the door 5 is guided in a direction of entering the guide groove 42 and in a direction of disengaging from the guide groove 42 by abutting on the guide surface 65. In the vehicle door device 20 of the present embodiment, for the formation portion of the guide surface 65, a difference in shape is set between a first guide member 71 forming an upper vehicle body-side engagement portion 32*a* and a second guide member 72 forming a lower vehicle body-side engagement portion 32*b*.

Figure 14:
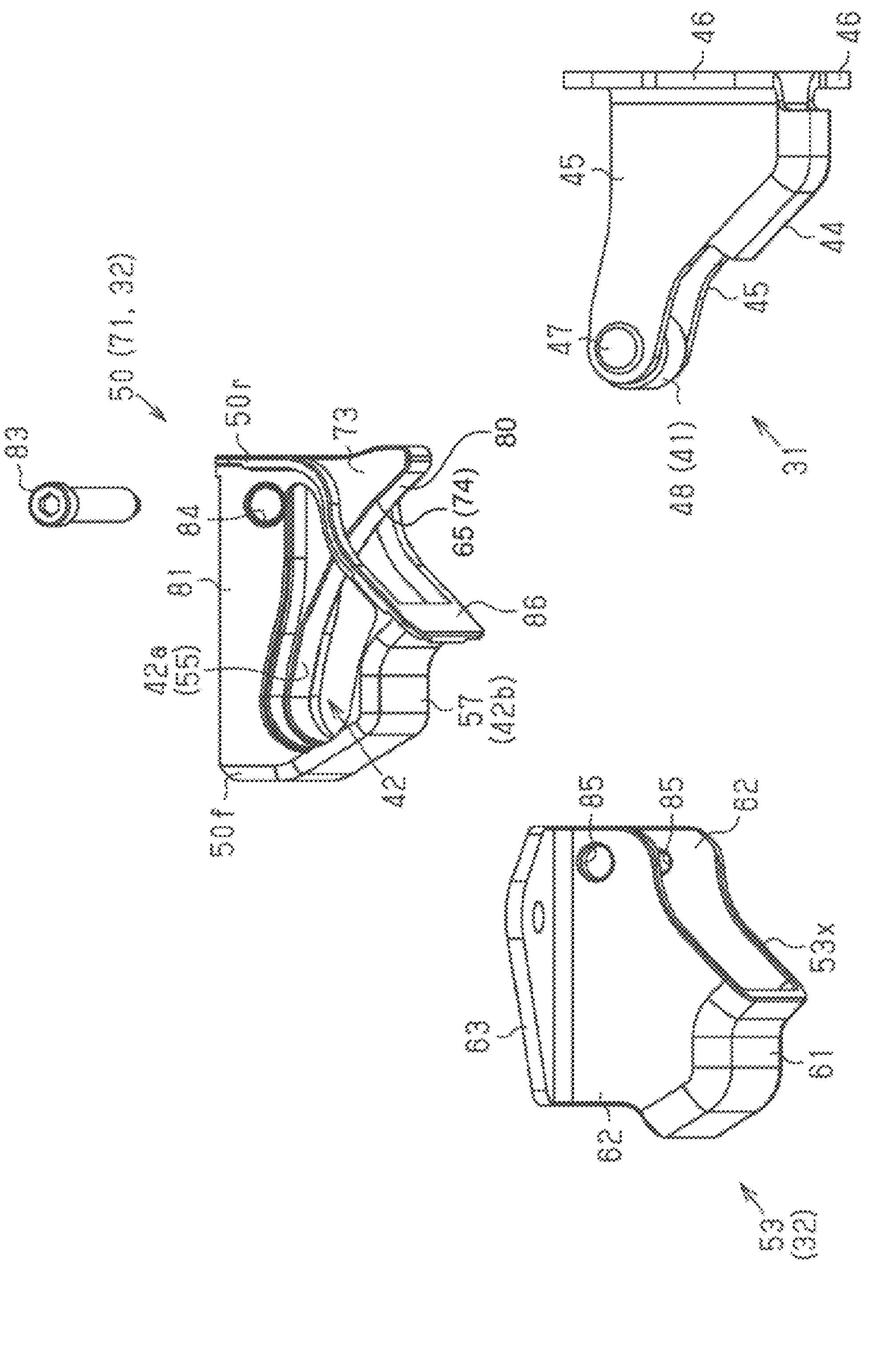
FIG. 14 is an exploded perspective view illustrating a door-side engagement portion and a vehicle body-side engagement portion.
Figure 15:
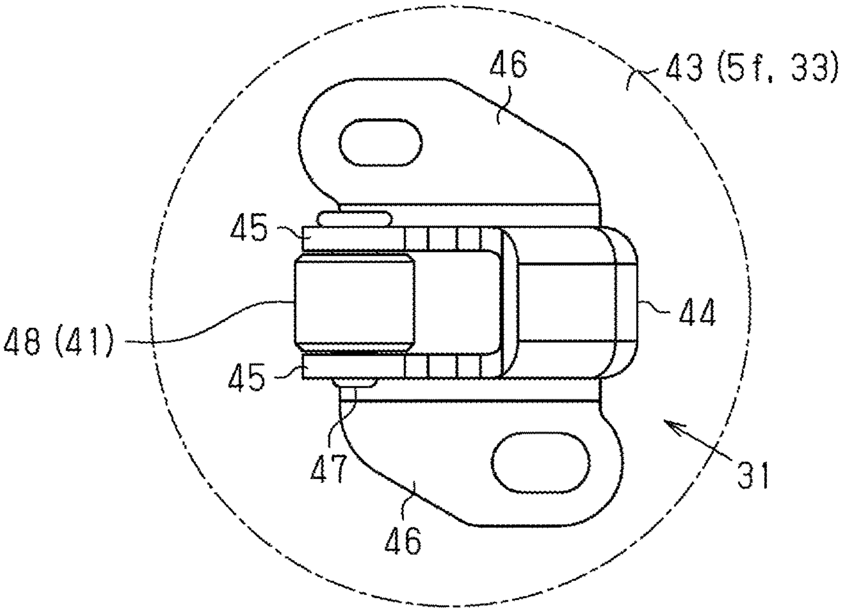
FIG. 15 is a front view of a door-side engagement portion.
Figure 16:
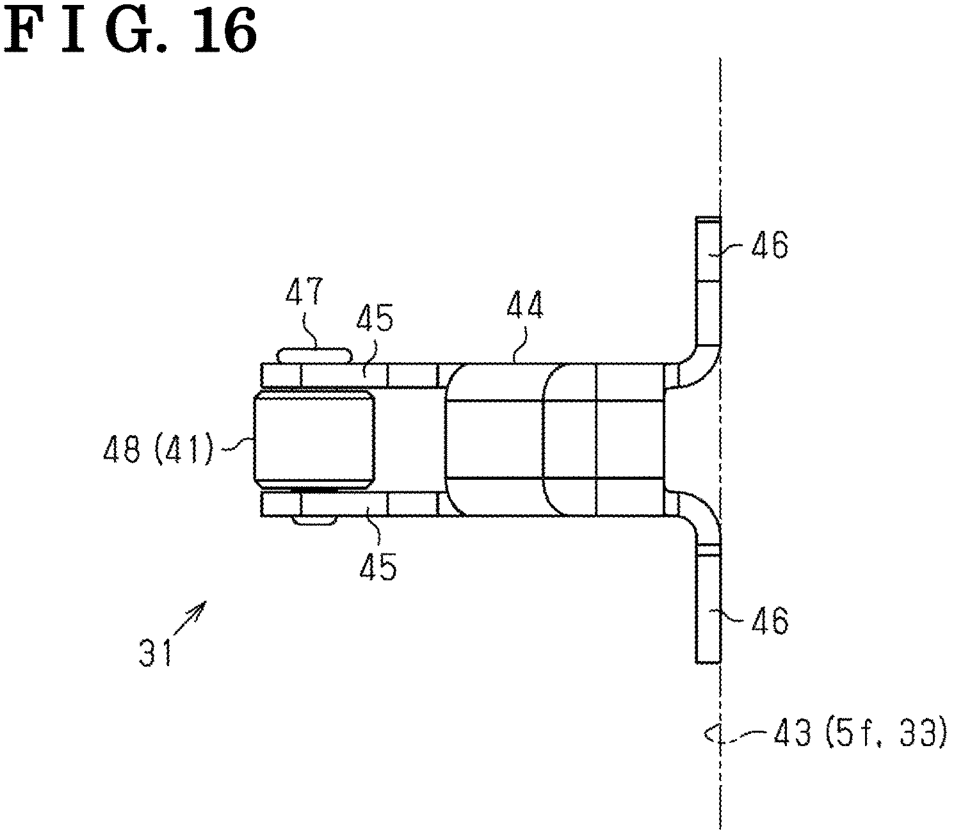
FIG. 16 is a side view of a door-side engagement portion.
Figure 17:
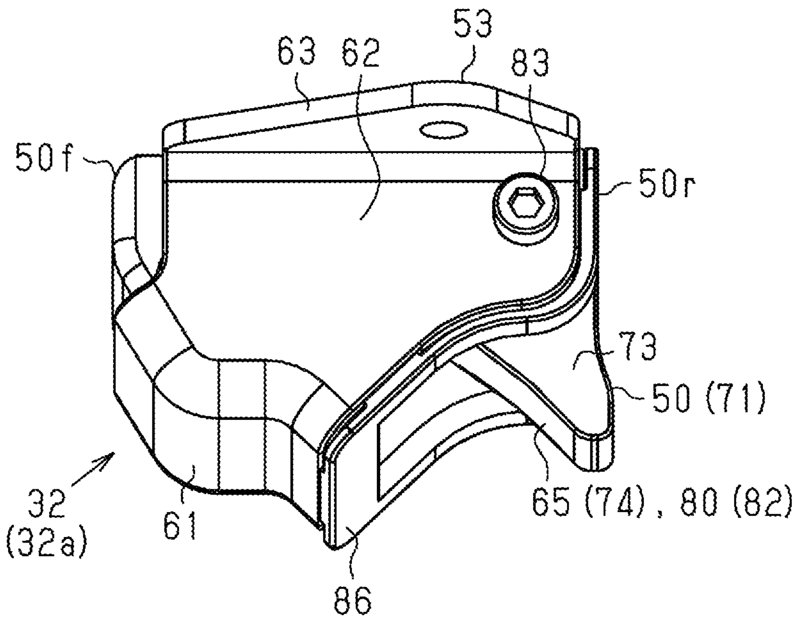
FIG. 17 is a perspective view illustrating a first guide member and a fixing bracket constituting an upper vehicle body-side engagement portion.

More specifically, as illustrated in FIGS. 12 and 14, in the vehicle door device 20 of the present embodiment, the first guide member 71 is provided with a guide protrusion 73 that protrudes outward in the vehicle width direction in a state in which the first guide member 71 is fixed to the installation surface 52. That is, the guide protrusion 73 is provided to protrude in a contacting-and-separating direction of the axial engagement portion 41 based on the opening-and-closing operation of the door 5. Specifically, the guide protrusion 73 has a substantially triangular plate-like outer shape in which a protrusion amount a gradually increases from the front end portion 50*f* side toward the rear end portion 50*r* side as the guide member 50. Accordingly, the first guide member 71 is configured such that an inclined surface 74 formed by the guide protrusion 73 and facing outward in the vehicle width direction is the guide surface 65.

That is, by using the inclined surface 74 as the guide surface 65 of the guide member 50, when the axial engagement portion 41 of the door-side engagement portion 31 abuts, an abutting angle of the axial engagement portion 41 with respect to the guide surface 65 becomes small. Accordingly, the first guide member 71 is configured to alleviate impact applied when the axial engagement portion 41 abuts against.

Furthermore, in the vehicle door device 20 according to the present embodiment, the inclined surface 74 of the guide protrusion 73 forming the guide surface 65 is a curved surface having a substantially constant curvature such that the inclination becomes gentler toward the guide groove 42. Accordingly, the vehicle door device 20 of the present embodiment can suitably alleviate the impact due to the abutting, for example, even in a case where the abutting position of the axial engagement portion 41 with respect to the first guide member 71 is shifted at the time of the closing operation of the door 5 due to tolerance or the like.

Figure 18:
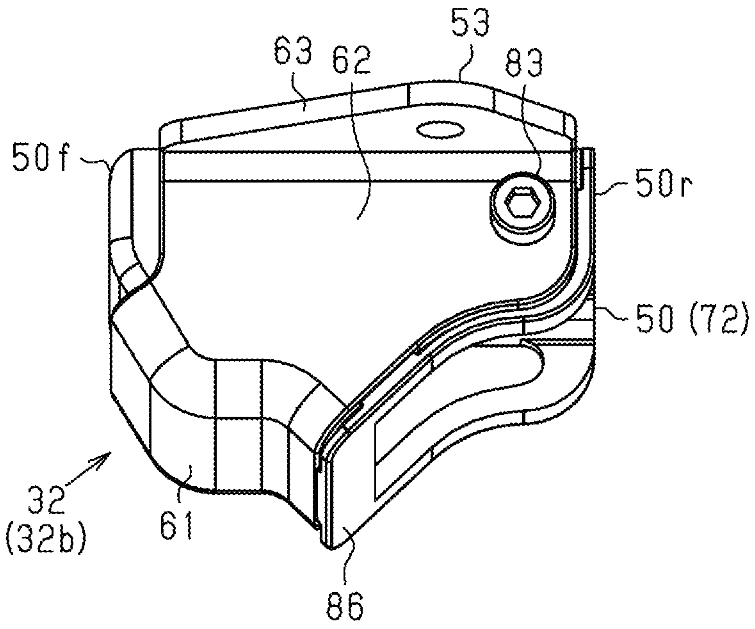
FIG. 18 is a perspective view illustrating a second guide member and a fixing bracket constituting a lower vehicle body-side engagement portion.
Figure 19:
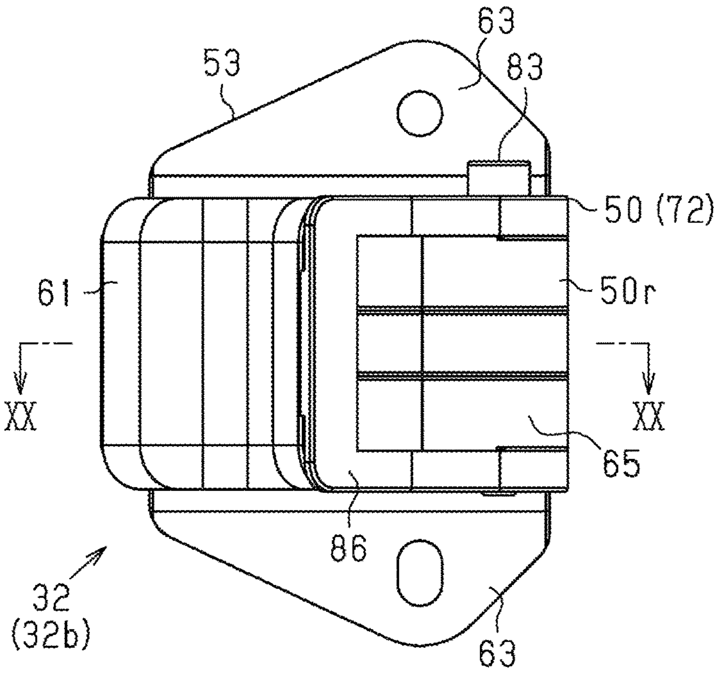
FIG. 19 is a side view illustrating a second guide member and a fixing bracket.
Figure 20:
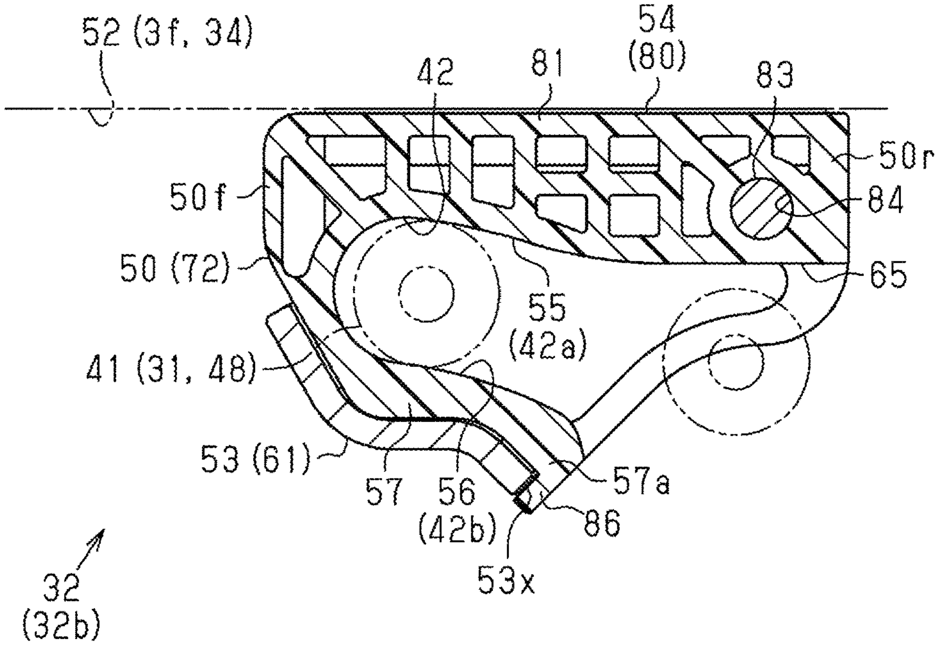
FIG. 20 is a cross-sectional view illustrating a second guide member and a fixing bracket.
Figure 21:
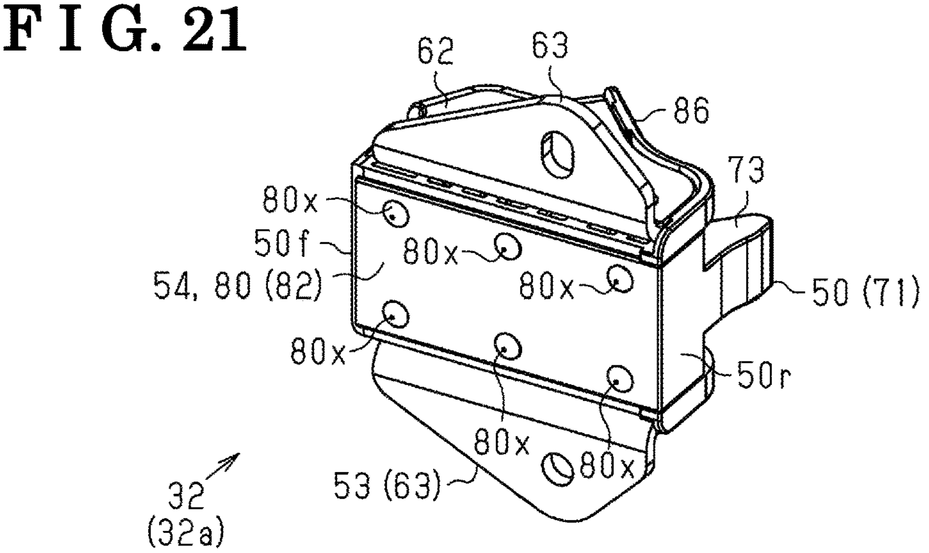
FIG. 21 is a perspective view illustrating a first guide member and a fixing bracket.

On the other hand, as illustrated in FIGS. 18 to 20, the second guide member 72 forming the lower vehicle body-side engagement portion 32*b* is not provided with the guide protrusion 73 unlike described above. Accordingly, the second guide member 72 has the substantially flat guide surface 65.

That is, the vehicle door device 20 of the present embodiment supports the door 5 so as to be openable and closable by the link mechanism 15 formed by the first and second link arms 11 and 12. Therefore, at the opening-and-closing operation position in the vicinity of the fully closed position P0 at which a distance between the first link arm 11 and the second link arm 12 is shortened and the first and second link arms 11 and 12 are linearly aligned, the orientation of the door 5 is likely to change. Accordingly, there is a possibility that a difference occurs in the engagement and disengagement orientation of the axial engagement portion 41 with respect to the guide groove 42, in the upper vehicle body-side engagement portion 32*a* and the lower vehicle body-side engagement portion 32*b*.

In particular, as illustrated in FIGS. 8 and 9, in the vehicle door device 20 of the present embodiment, the upper vehicle body-side engagement portion 32*a* is provided at a first vertical direction position Y1 corresponding to the first link arm 11 positioned as the main link 21. Furthermore, the lower vehicle body-side engagement portion 32*b* is provided at a second vertical direction position Y2 corresponding to the second link arm 12 positioned as the sub-link 22. Therefore, the difference in the engagement and disengagement orientation tends to be noticeable.

Specifically, in the vehicle door device 20 of the present embodiment, the first vertical direction position Y1 corresponding to the first link arm 11 is set to a vertical direction position closer to the support position of the door 5 by the first link arm 11 as compared with the support position of the door 5 by the second link arm 12.

The second vertical direction position Y2 corresponding to the second link arm 12 is set to a vertical direction position closer to the support position of the door 5 by the second link arm 12 as compared with the support position of the door 5 by the first link arm 11.

That is, as described above, the first link arm 11 has the second rotation coupling point X2 with respect to the door 5 at a position closer to the center of gravity G of the door 5 as compared with the second link arm 12. Moreover, the second link arm 12 is provided with a connection length variable mechanism 35 capable of changing the connection length L between the first rotation coupling point X1 and the second rotation coupling point X2. Therefore, in the vehicle door device 20 of the present embodiment, the orientation change of the door 5 becomes greater toward the lower side of the door 5 supported by the second link arm 12. Accordingly, the engagement and disengagement orientation of the axial engagement portion 41 with respect to the guide groove 42 is likely to change in the lower vehicle body-side engagement portion 32*b* as compared with the upper vehicle body-side engagement portion 32*a*.

In view of this point, in the vehicle door device 20 of the present embodiment, for the first guide member 71 forming the upper vehicle body-side engagement portion 32*a*, the engagement and disengagement trajectory of the axial engagement portion 41 with respect to the first guide member 71 is defined by the guide surface 65 formed by the guide protrusion 73.

On the other hand, the second guide member 72 forming the lower vehicle body-side engagement portion 32*b* is not provided with such a guide protrusion 73, and thus the degree of freedom of engagement and disengagement of the axial engagement portion 41 with respect to the second guide member 72 is increased. Accordingly, the vehicle door device 20 of the present embodiment has a configuration in which the axial engagement portions 41 and 41 are hardly caught when the corresponding axial engagement portions 41 and 41 are engaged with or disengaged from the first and second guide members 71 and 72.

Such a phenomenon in which the first and second guide members 71 and 72 provided to be separated from each other in the vertical direction and the axial engagement portions 41 and 41 are caught is likely to occur, for example, in a case where the door 5 is opened from the fully closed position P0, and thus there is a possibility that the door 5 rocks. However, in the vehicle door device 20 of the present embodiment, the rocking of the door 5 due to the occurrence of such catching is suppressed. Accordingly, the vehicle door device 20 is configured to secure excellent operation feeling of the door 5.

Furthermore, as illustrated in FIGS. 12, 14, 17, and 21, in the vehicle door device 20 according to the present embodiment, the first guide member 71 includes a buffer member 80 having elasticity that reduces impact when the axial engagement portion 41 that relatively moves based on the opening-and-closing operation of the door 5 abuts against the first guide member 71.

More specifically, in the first guide member 71, the buffer member 80 is provided on the guide surface 65 formed by the guide protrusion 73 and the first facing surface 55 forming the side wall portion 42*a* of the guide groove 42. That is, the buffer member 80 is provided at a position at which the axial engagement portion 41 of the door-side engagement portion 31 that relatively moves based on the opening-and-closing operation of the door 5 abuts against the first guide member 71. Furthermore, the buffer member 80 is provided on the fixing surface 54 with respect to the installation surface 52 on the vehicle body 2 side. That is, in the vehicle door device 20 of the present embodiment, the buffer member 80 and the installation surface 52 are located on an extension line in a direction in which the axial engagement portion 41 of the door-side engagement portion 31 comes into contact with and is separated from the first guide member 71 based on the opening-and-closing operation of the door 5. Moreover, the buffer member 80 has a plurality of protrusions 80*x* that abut on the installation surface 52 on the vehicle body 2 side. The first guide member 71 is configured to be fixed to the installation surface 52 on the vehicle body 2 side in a state in which the protrusions 80*x* are crushed.

More specifically, in the vehicle door device 20 of the present embodiment, the first guide member 71 includes a base member 81 having the guide groove 42 and a covering body 82 covering the base member 81. Accordingly, in the first guide member 71, the covering body 82 functions as the buffer member 80.

Specifically, for example, a relatively hard material such as fiber-reinforced plastic is used for the base member 81. Furthermore, for the covering body 82, for example, an elastic material such as rubber or elastomer is used. In the vehicle door device 20 of the present embodiment, the base member 81 and the covering body 82 forming the buffer member 80 are integrally formed by insert molding.

Furthermore, as illustrated in FIGS. 12, 14, and 17 to 20, the vehicle door device 20 of the present embodiment includes a coupling shaft 83 passing through the guide member 50 and the fixing bracket 53. Specifically, in the vehicle door device 20 of the present embodiment, the rear end portion 50*r* of the guide member 50 is provided with an insertion hole 84 extending in the vertical direction in a state in which the guide member 50 is fixed to the installation surface 52 on the vehicle body 2 side. Furthermore, the side wall portions 62 and 62 of the fixing bracket 53 respectively have through holes 85 and 85 provided at positions corresponding to the insertion hole 84. The coupling shaft 83 of the present embodiment couples the guide member 50 with the fixing bracket 53 in a state of passing through the guide member 50 and the fixing bracket 53 in the vertical direction of the vehicle 1 by being inserted into the insertion hole 84 and the through holes 85 and 85.

More specifically, as illustrated in FIGS. 12 and 20, the coupling shaft 83 is provided to pass through the guide member 50 and the fixing bracket 53 in a state of being parallel to the installation surface 52 on the vehicle body 2 side and the regulation wall 61 of the fixing bracket 53 sandwiching the guide member 50 with the installation surface 52. Accordingly, the coupling shaft 83 of the present embodiment extends in a direction intersecting the vehicle horizontal direction in which the guide groove 42 extends.

That is, when the axial engagement portion 41 of the door-side engagement portion 31 abuts against the guide member 50, the vehicle door device 20 of the present embodiment defines a direction in which the guide member 50 is to be displaced with the coupling shaft 83 as a support shaft. Specifically, the guide member 50 tends to rotate around the coupling shaft 83 by the abutting of the axial engagement portion 41. The vehicle door device 20 of the present embodiment is configured such that the movement of the guide member 50 is regulated by the installation surface 52 on the vehicle body 2 side or the regulation wall 61 of the fixing bracket 53 which is located in the rotation direction.

For example, in a case where the axial engagement portion 41 to be engaged with the guide groove 42 based on the closing operation of the door 5 abuts against the guide member 50, the guide member 50 tends to be displaced inward in the vehicle width direction (upward in in FIGS. 12 and 20) in a mode of rotating around the coupling shaft 83 (clockwise direction in FIGS. 12 and 20). In this case, the front end portion 50*f* side of the guide member 50 abuts on the installation surface 52 located in the rotation direction, and thus the displacement of the guide member 50 based on the pressing force of the axial engagement portion 41 is regulated.

On the other hand, even in a case where the axial engagement portion 41 to be disengaged from the guide groove 42 based on the opening operation of the door 5 abuts against the guide member 50, the guide member 50 tends to be displaced outward in the vehicle width direction (downward in FIGS. 12 and 20) in a mode of rotating around the coupling shaft 83 (counterclockwise direction in FIGS. 12 and 20).

In this case, the front end portion 50*f* side of the guide member 50 abuts on the regulation wall 61 of the fixing bracket 53 located in the rotation direction, and thus the displacement of the guide member 50 based on the pressing force of the axial engagement portion 41 is regulated.

Furthermore, as illustrated in FIGS. 12, 14, and 17 to 20, the guide member 50 of the present embodiment includes a frame-shaped portion 86 disposed at a position corresponding to an entrance of the guide groove 42. Specifically, the frame-shaped portion 86 has a substantially quadrangular frame shape that opens to the vehicle rear side. Moreover, the frame-shaped portion 86 is provided in a manner as to connect a distal end 57*a* of the engagement piece 57, which is a formation portion of the guide groove 42, with the rear end portion 50*r* of the guide member 50. The guide member 50 of the present embodiment is configured such that the axial engagement portion 41 enters the guide groove 42 through the frame-shaped portion 86 as an entrance.

Moreover, in the vehicle door device 20 of the present embodiment, the frame-shaped portion 86 is disposed at a position to cover a rear end surface 53*x* of the fixing bracket 53, specifically, a rear end portion (right end portion in FIGS. 12, 14, and 17 to 20) having a substantially cross section U-shape formed by the regulation wall 61 and the side wall portions 62 and 62. The vehicle door device 20 of the present embodiment is configured to protect the rear end surface 53*x* of the fixing bracket 53 so as not to come into contact with, for example, a user.

Second Link Arm and Connection Length Variable Mechanism

Next, configurations of the second link arm 12 having a configuration as the sub-link 22 and the connection length variable mechanism 35 provided in the second link arm 12 will be described.

As illustrated in FIGS. 22 to 25, in the vehicle door device 20 of the present embodiment, the second link arm 12 includes a vehicle body-side link 91 having the first rotation coupling point X1 with respect to the vehicle body 2 and a door-side link 92 having the second rotation coupling point X2 with respect to the door 5. Specifically, the vehicle body-side link 91 is coupled to the vehicle body 2 via a vehicle body bracket 93 provided in the vicinity of the rear edge portion 3*r* of the door opening 3. Furthermore, the door-side link 92 is coupled to the door 5 via a door bracket 94 fixed to an inner side surface 5*s* of the door 5. Moreover, the second link arm 12 has a configuration in which the vehicle body-side link 91 and the door-side link 92 are rotatably coupled. In the vehicle door device 20 of the present embodiment, a joint link mechanism 100 formed by this configuration forms the connection length variable mechanism 35.

Figure 22:
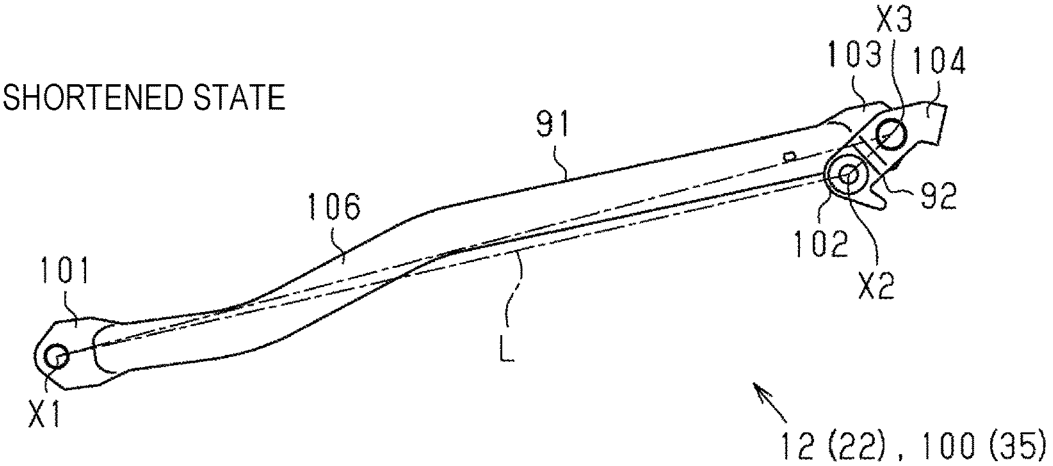
FIG. 22 is a plan view of a joint link mechanism forming a connection length variable mechanism provided in a second link arm.
Figure 23:
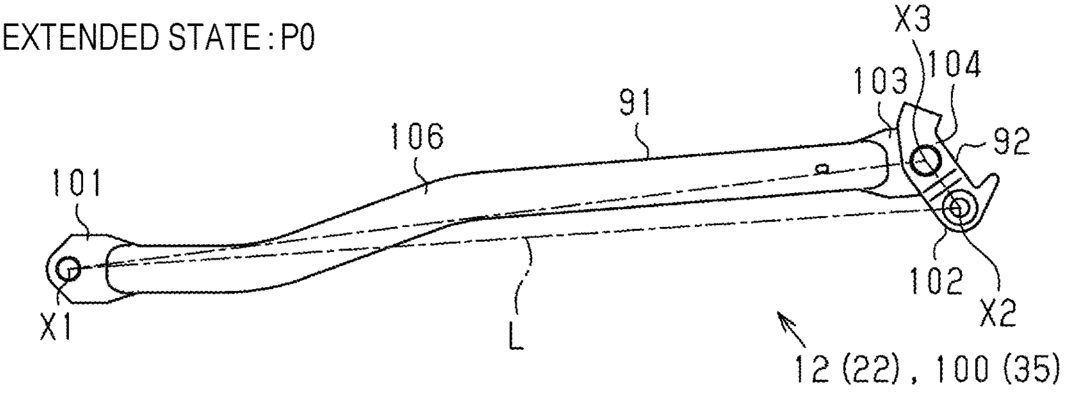
FIG. 23 is a plan view of a joint link mechanism.
Figure 24:
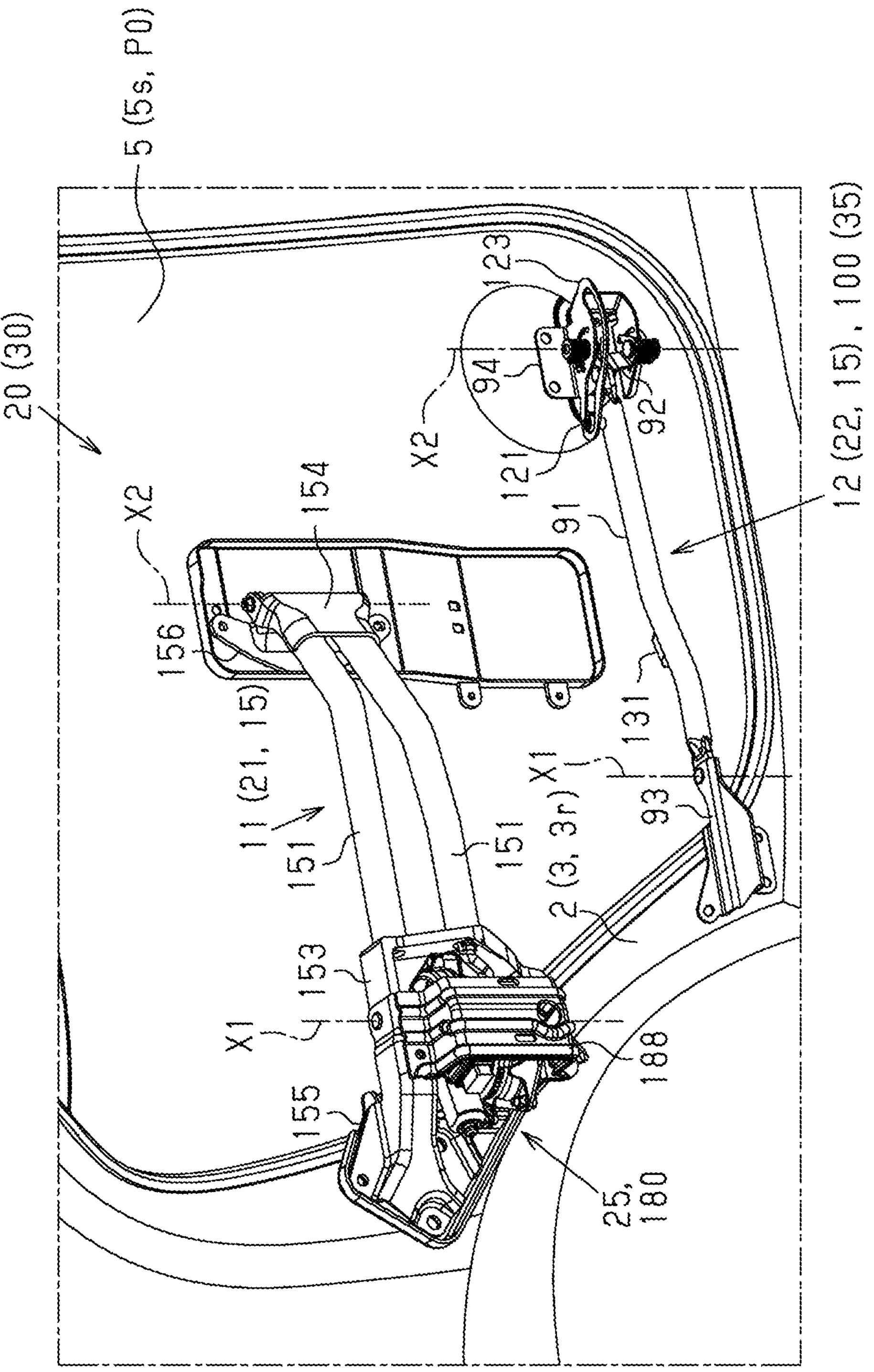
FIG. 24 is a perspective view of a vehicle door device.
Figure 25:
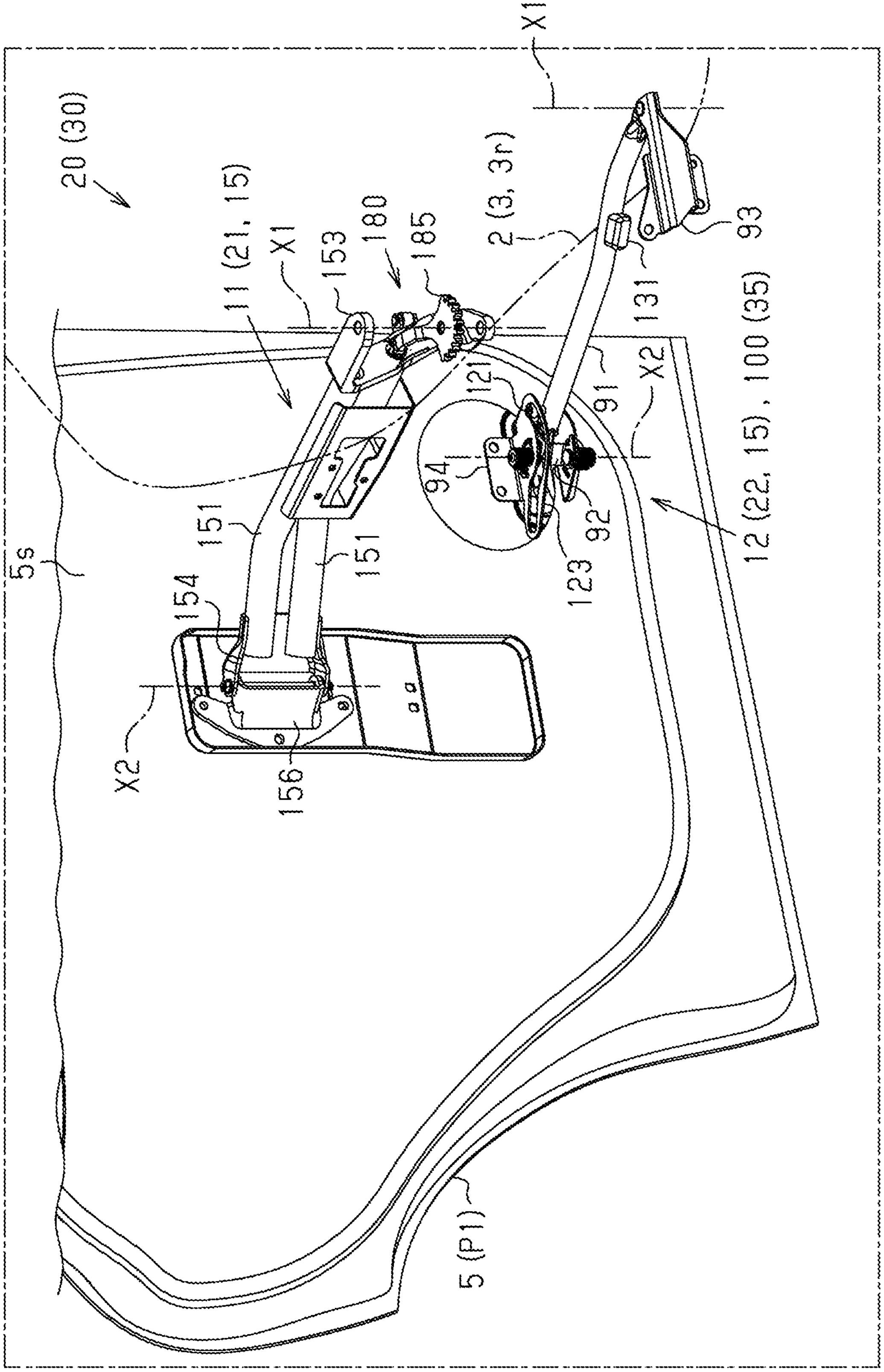
FIG. 25 is a perspective view of a vehicle door device.
Figure 26:
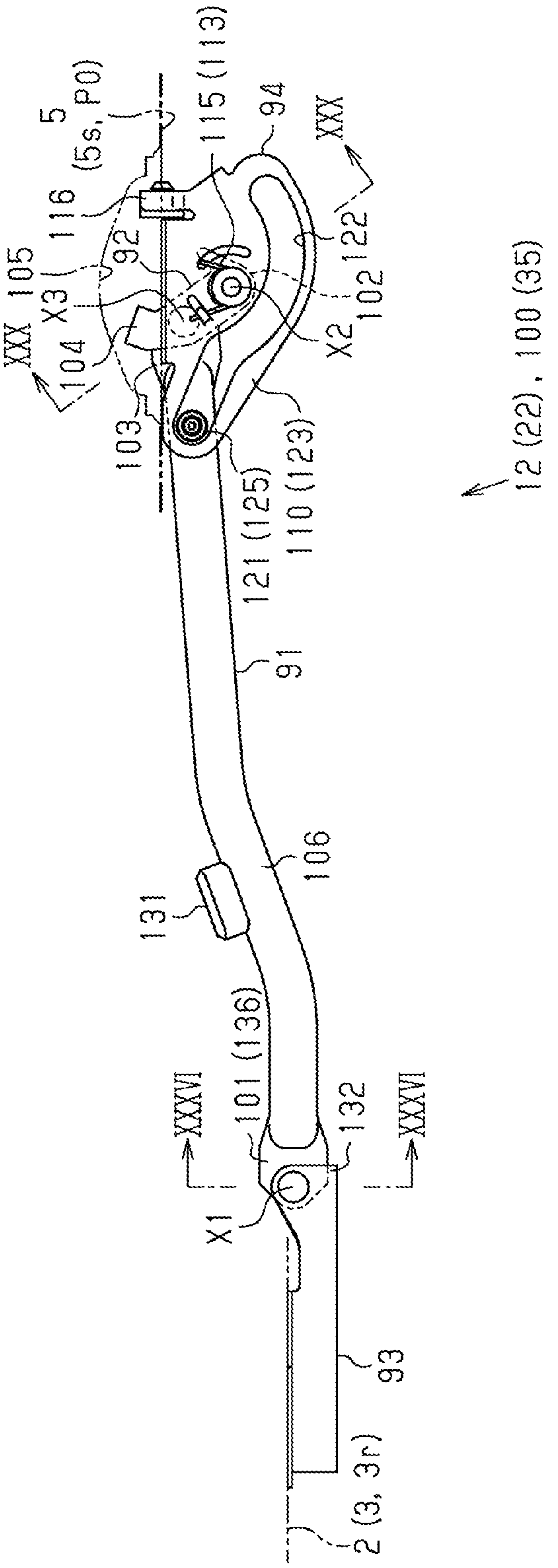
FIG. 26 is a plan view of a second link arm including a joint link mechanism.
Figure 27:
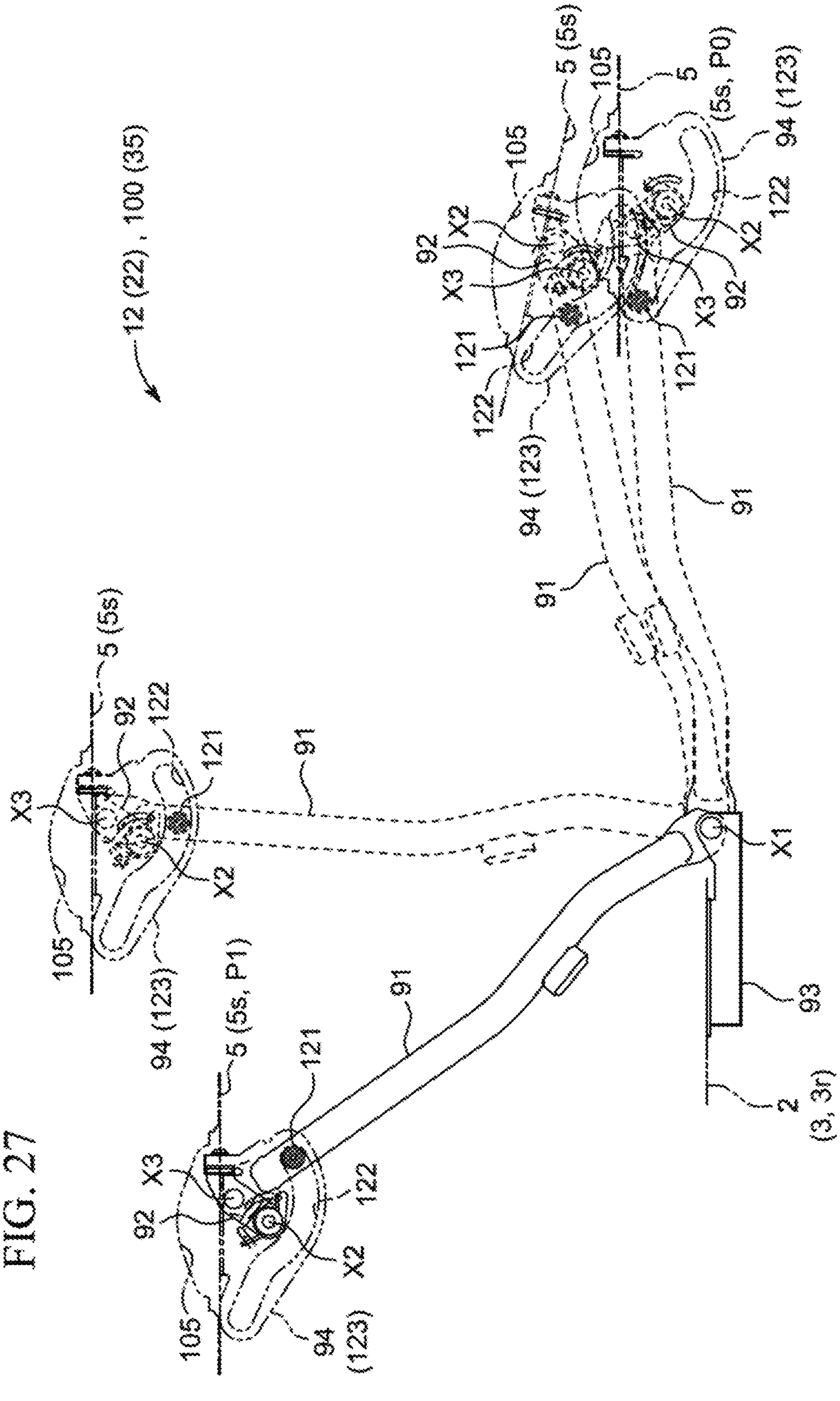
FIG. 27 is an operation explanatory diagram of a second link arm including a joint link mechanism.

More specifically, as illustrated in FIGS. 22 and 23, the door-side link 92 of the present embodiment has a configuration as a so-called mini arm having a short axial length in comparison with the vehicle body-side link 91. Furthermore, the vehicle body-side link 91 has a vehicle body-side coupling portion 101 with respect to the vehicle body 2 on one end side in the longitudinal direction of the vehicle body-side link 91. Moreover, the door-side link 92 also has a door-side coupling portion 102 with respect to the door 5 on one end side in the longitudinal direction of the door-side link 92. The vehicle body-side link 91 and the door-side link 92 respectively have intermediate coupling portions 103 and 104 coupled to each other on the other end side in the longitudinal direction.

That is, in the vehicle door device 20 of the present embodiment, the intermediate coupling portions 103 and 104 form an intermediate coupling point X3 of the joint link mechanism 100 provided in the second link arm 12. Furthermore, in the second link arm 12, the vehicle body-side link 91 and the door-side link 92 form a triangle with the intermediate coupling point X3 as a vertex. Accordingly, the vehicle body-side link 91 and the door-side link 92 relatively rotate, and thus the length of the straight line connecting the first rotation coupling point X1 with the second rotation coupling point X2, which forms the base of the triangle, that is, the connection length L changes.

Specifically, as illustrated in FIGS. 22, 23, 26, and 27, in the present embodiment, the intermediate coupling point X3 between the vehicle body-side link 91 and the door-side link 92 is disposed at a position closer to the inner side surface 5*s* of the door 5 than the second rotation coupling point X2 with respect to the door 5. A recess 105 for avoiding contact with the intermediate coupling portions 103 and 104 of the vehicle body-side link 91 and the door-side link 92 forming the intermediate coupling point X3 is formed on the inner side surface 5*s* of the door 5 of the present embodiment. Accordingly, the vehicle door device 20 of the present embodiment is configured such that the connection length L between the vehicle body 2 and the door 5 by the second link arm 12 changes in a mode in which the intermediate coupling point X3 apparently rotates around the second rotation coupling point X2 based on the opening-and-closing operation of the door 5.

More specifically, as illustrated in FIGS. 26 to 29, the vehicle body-side link 91 of the present embodiment has an elongated substantially axial outer shape. Moreover, the vehicle body-side link 91 has a crank-shaped bent portion 106. Accordingly, the vehicle door device 20 of the present embodiment is configured to avoid interference of the second link arm 12 and the rear edge portion 3*r* of the door opening 3 and secure a larger door opening amount when the door 5 is fully opened.

Figure 28:
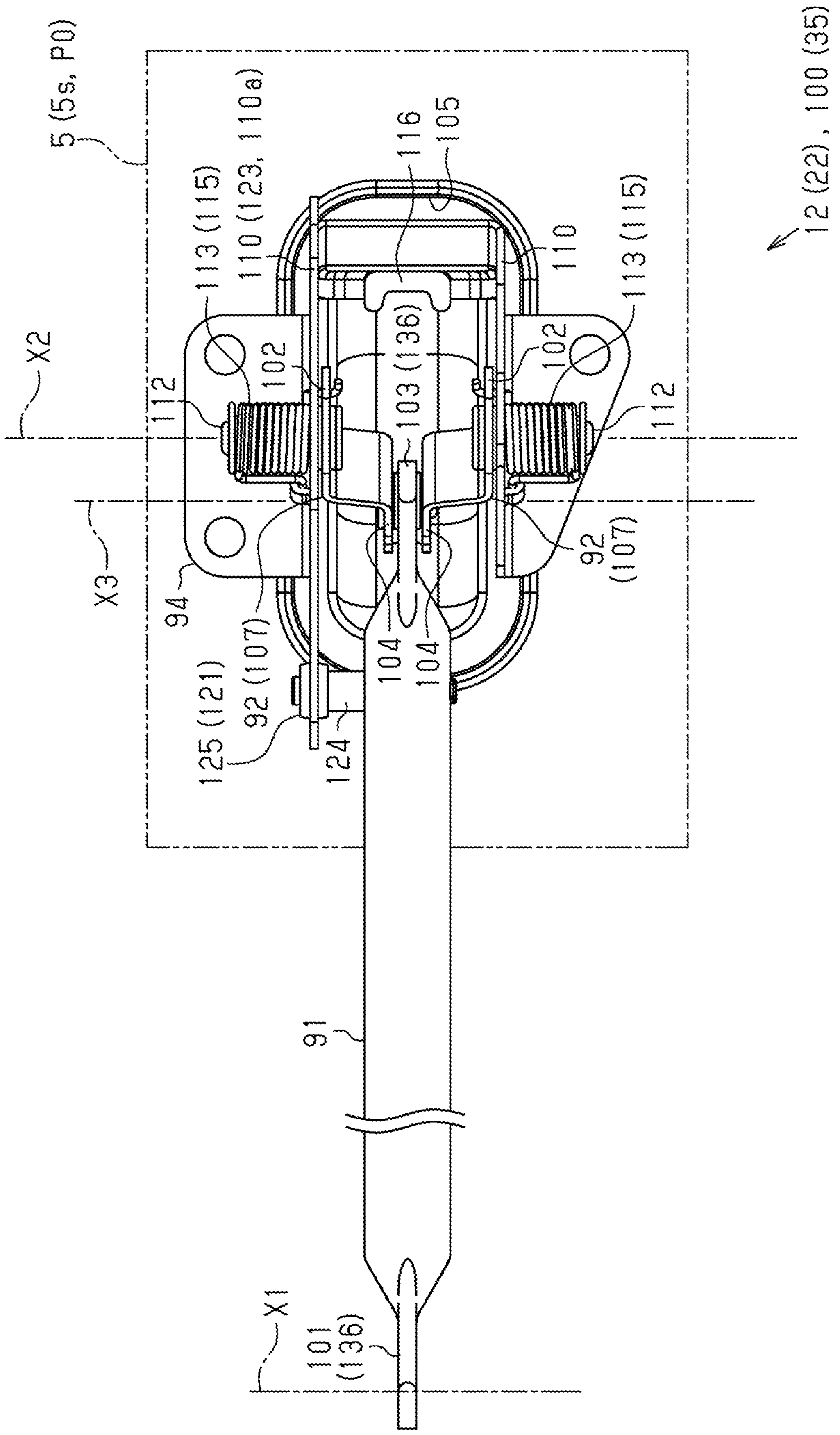
FIG. 28 is a side view of a second link arm including a joint link mechanism.
Figure 29:
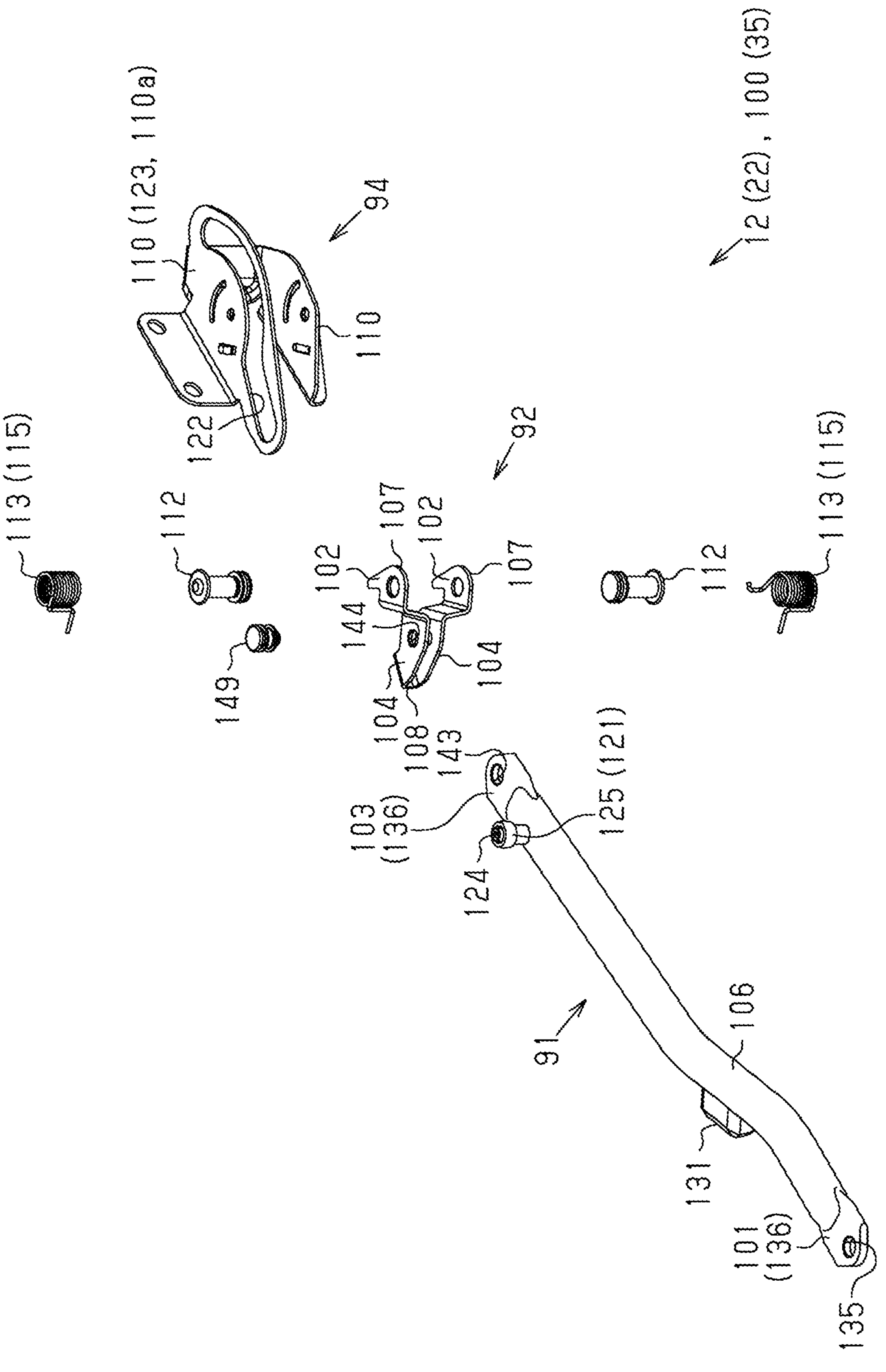
FIG. 29 is an exploded perspective view of a second link arm including a joint link mechanism.
Figure 30:
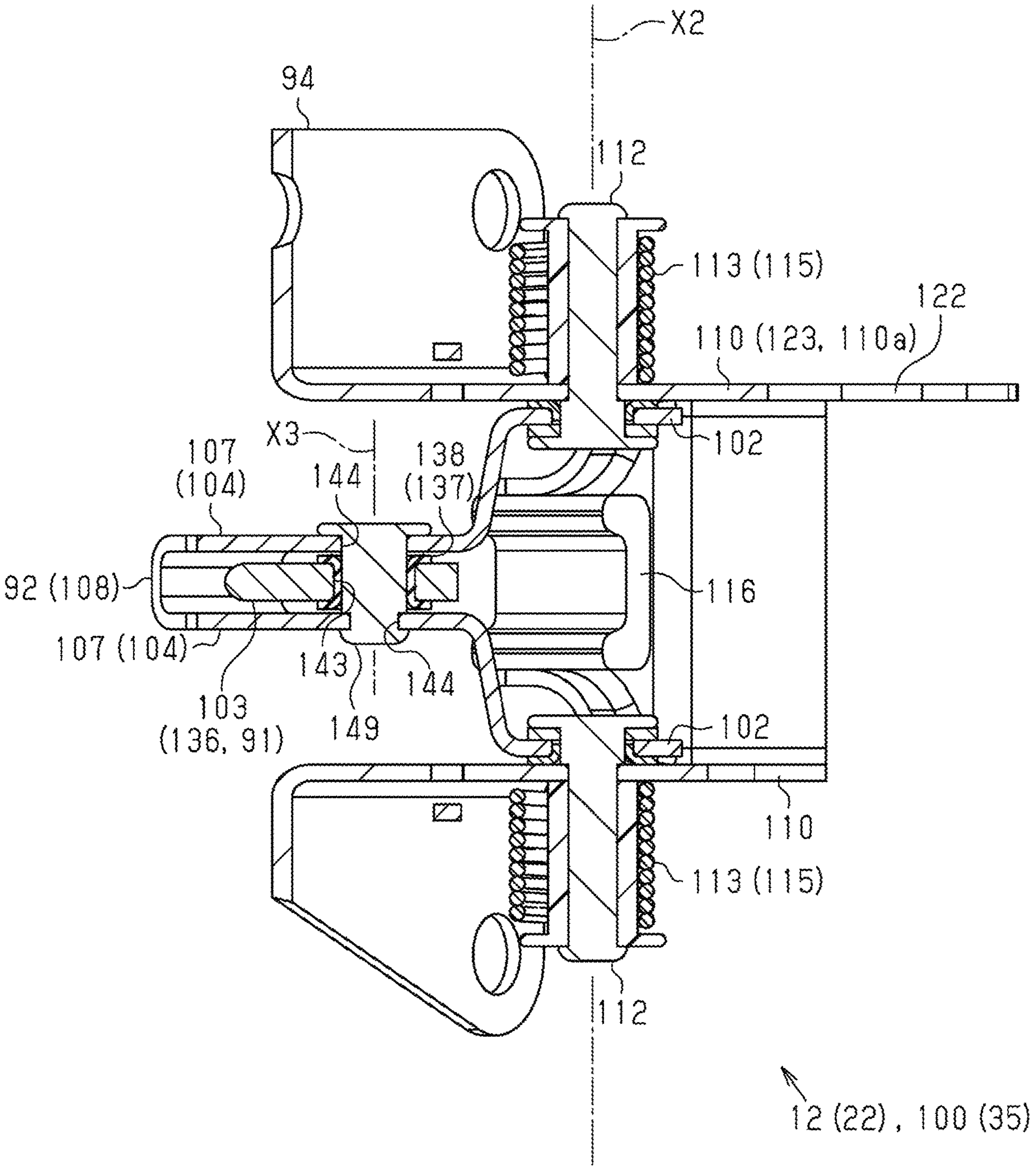
FIG. 30 is a cross-sectional view illustrating a second rotation coupling point with respect to a door of a second link arm and an intermediate coupling point of a joint link mechanism.

Furthermore, as illustrated in FIGS. 28 to 30, in the vehicle door device 20 of the present embodiment, the door-side link 92 has a pair of clamping portions 107 and

107 rotatably coupled to an intermediate coupling portion 103 in a state in which the intermediate coupling portion 103 of the vehicle body-side link 91 is interposed between the clamping portions 107 and 107.

Specifically, each of the clamping portions 107 and 107 has the door-side coupling portion 102 with respect to the door 5 on one end side in the longitudinal direction of the clamping portion 107, and has an intermediate coupling portion 104 with respect to the door-side link 92 on the other end side in the longitudinal direction of the clamping portion 107. Furthermore, the door-side link 92 of the present embodiment has a connection portion 108 at the intermediate coupling portion 104 by bending a metal plate material, and the clamping portions 107 and 107 are integrally formed. Moreover, in the vehicle door device 20 of the present embodiment, the intermediate coupling portion 103 of the vehicle body-side link 91 also has a substantially flat shape. Accordingly, the second link arm 12 has a configuration in which the intermediate coupling portion 103 of the vehicle body-side link 91 is interposed between the intermediate coupling portions 104 and 104 of the door-side link 92 formed by a pair of the clamping portions 107 and 107 having a bent plate shape.

Furthermore, in the door-side link 92 of the present embodiment, each of the clamping portions 107 and 107 has a bent plate-like cross-sectional shape in which the other end sides forming the door-side coupling portions 102 in the longitudinal direction are separated from each other. Accordingly, the door-side link 92 of the present embodiment is configured such that the clamping portions 107 and 107 are rotatably coupled to the door 5 at positions separated in the vertical direction.

More specifically, in the vehicle door device 20 of the present embodiment, the door bracket 94 fixed to the inner side surface 5*s* of the door 5 includes a pair of coupling walls 110 and 110 having a substantially flat shape and facing each other in the vertical direction. In the door-side link 92, the vertically separated door-side coupling portions 102 and 102 formed by a pair of the clamping portions 107 and 107 are respectively coupled to the coupling walls 110 and 110.

Furthermore, the vehicle door device 20 of the present embodiment includes a pair of support shafts 112 and 112 provided coaxially with the second rotation coupling point X2 formed by the door-side coupling portions 102 and 102 of the door-side link 92 and the coupling walls 110 and 110 of the door bracket 94. In the door bracket 94 of the present embodiment, one side of each of the support shafts 112 and 112 is erected in a state of protruding upward from each of the coupling walls 110 above the support shafts 112 and 112. Furthermore, the other side of each of the support shafts 112 and 112 is erected in a state of protruding downward from the coupling wall 110 below the support shaft. Moreover, torsion coil springs 113 and 113 are respectively fitted to the support shafts 112 and 112.

The vehicle door device 20 of the present embodiment is configured such that the door-side link 92 is rotationally biased by using the torsion coil springs 113 and 113 as a biasing member 115.

Figure 31:
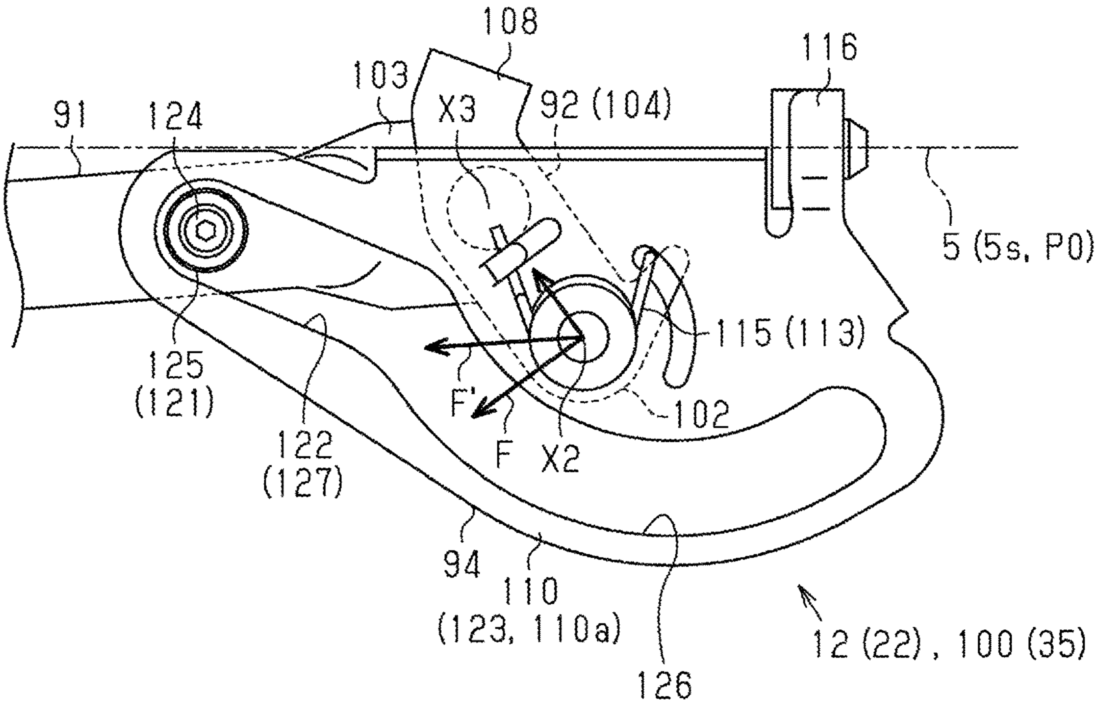
FIG. 31 is a plan view illustrating an engagement protrusion portion provided on a second link arm and a cam member provided on a door.
Figure 32:
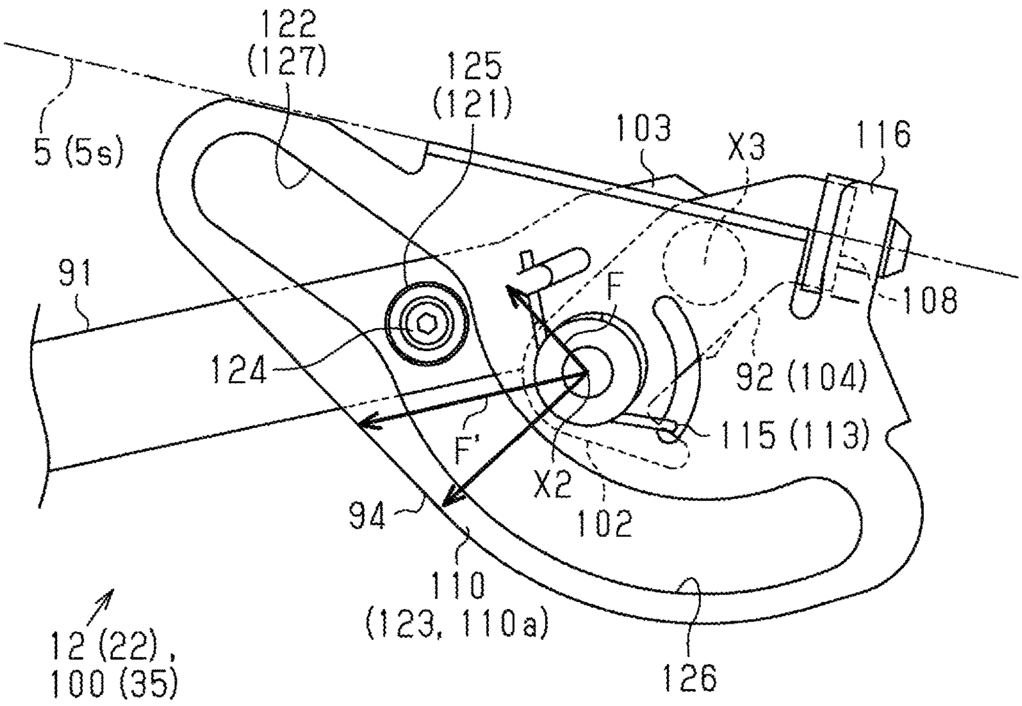
FIG. 32 is a plan view illustrating an engagement protrusion portion provided on a second link arm and a cam member provided on a door.
Figure 33:
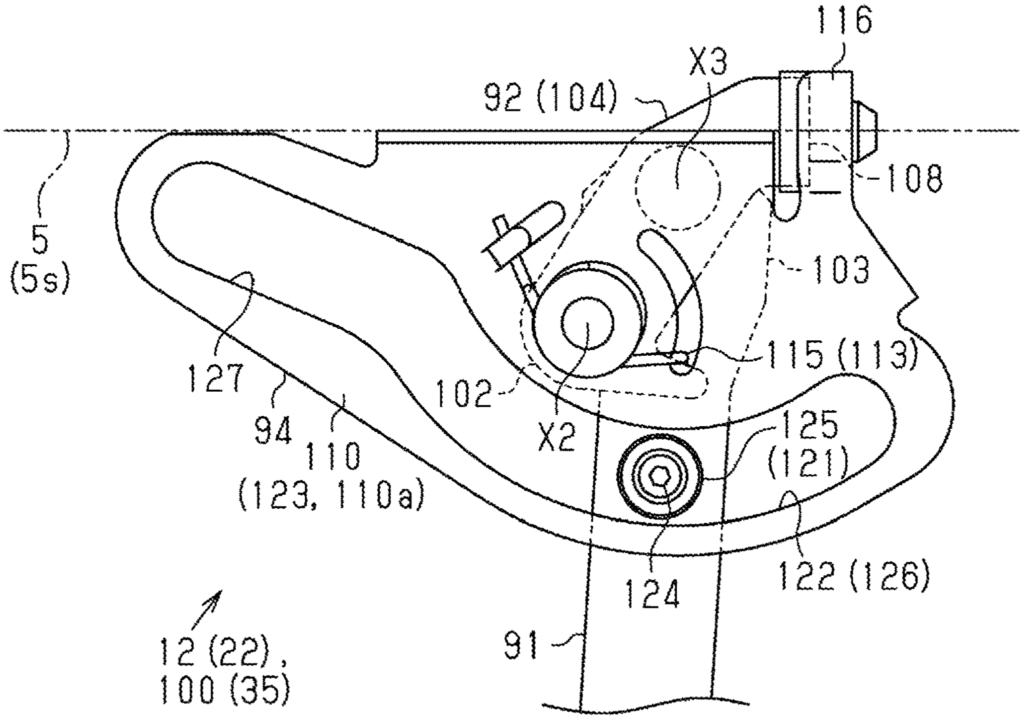
FIG. 33 is a plan view illustrating an engagement protrusion portion provided on a second link arm and a cam member provided on a door.
Figure 34:
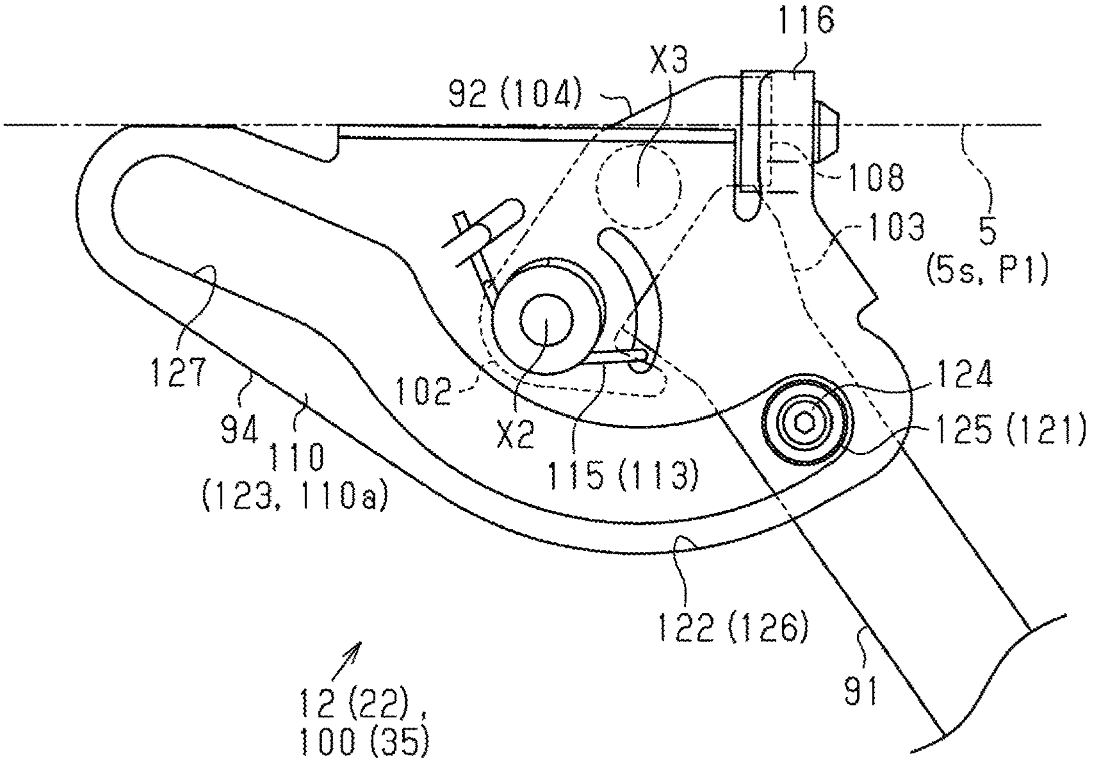
FIG. 34 is a plan view illustrating an engagement protrusion portion provided on a second link arm and a cam member provided on a door.

That is, as illustrated in FIGS. 31 and 32, the torsion coil springs 113 and 113 generates a biasing force F for relatively rotating the vehicle body-side link 91 and the door-side link 92 in a direction in which the connection length L between the first and second rotation coupling points X1 and X2 is shortened. Furthermore, accordingly, in the second link arm 12, the connection length L between the first and second rotation coupling points X1 and X2 becomes shorter than the fully closed position P0 based on the opening operation of the door 5 (see FIGS. 22 and 23). Accordingly, the vehicle door device 20 of the present embodiment is configured to open and close the door 5 in a state in which the connection length L between the first and second rotation coupling points X1 and X2 in the second link arm 12 is shortened (see FIGS. 3 to 6).

As illustrated in FIGS. 28 and 30 to 32, in the vehicle door device 20 of the present embodiment, the door bracket 94 is provided with a stopper 116. Specifically, when the door 5 performs the opening operation from the fully closed position P0, apparently the intermediate coupling point X3 between the vehicle body-side link 91 and the door-side link 92 rotates around the second rotation coupling point X2, and thus the stopper 116 abuts against the connection portion 108 of the door-side link 92. Accordingly, the vehicle door device 20 of the present embodiment is configured to secure a stable opening-and-closing operation orientation of the door 5 supported by the second link arm 12.

Furthermore, as illustrated in FIGS. 31 and 32, the vehicle door device 20 of the present embodiment is configured such that the biasing force F of the biasing member 115 changes based on the relative rotation of the vehicle body-side link 91 and door-side link 92 constituting the joint link mechanism 100. Specifically, when the door 5 performs the opening operation from the fully closed position P0, a component force F' of the biasing force F in a connection length direction in the second link arm 12 becomes stronger than that at the fully closed position P0. Accordingly, the vehicle door device 20 of the present embodiment is configured to secure good fitting of the door 5 by reducing the component force F' of the biasing force F in the connection length direction in a case where the door 5 is in the fully closed state.

More specifically, as illustrated in FIGS. 28 to 34, the vehicle door device 20 of the present embodiment includes an engagement protrusion portion 121 provided on the vehicle body-side link 91, and a cam member 123 having a cam groove 122 with which the engagement protrusion portion 121 engages and provided on the door 5.

Specifically, in the vehicle door device 20 of the present embodiment, the vehicle body-side link 91 includes a support shaft 124 provided in the vicinity of the intermediate coupling portion 103 with the door-side link 92 and protruding upward, and a roller 125 axially supported to be rotatable by the support shaft 124. Accordingly, the vehicle door device 20 of the present embodiment is configured such that the roller 125 functions as the engagement protrusion portion 121.

Furthermore, in the vehicle door device 20 of the present embodiment, the cam member 123 is provided integrally with a coupling wall 110*a* on the upper side of the door bracket 94 to which the door-side link 92 is coupled. That is, the cam member 123 has a substantially flat shape. Moreover, the cam member 123 is disposed above the vehicle body-side link 91 and the door-side link 92 so as to cover the upper side of the intermediate coupling portions 103 and 104. The cam member 123 of the present embodiment includes the cam groove 122 provided so as to vertically penetrate the cam member 123.

Specifically, the cam groove 122 of the present embodiment has an arc-shaped portion 126 protruding inward in the vehicle width direction (lower side in FIGS. 31 to 34) in a state in which the cam member 123 formed integrally with the door bracket 94 is fixed to the inner side surface 5*s* of the door 5. Furthermore, the cam groove 122 has a linear portion 127 extending toward the vehicle rear side continuously with the arc-shaped portion 126. Moreover, in the vehicle door device 20 of the present embodiment, the roller 125 to be the engagement protrusion portion 121 is disposed inside the cam groove 122. The vehicle door device 20 of the present embodiment is configured such that the roller 125 moves inside the cam groove 122 in a state of being in sliding contact with the cam groove 122 based on the opening-and-closing operation of the door 5.

That is, when the door-side engagement portion 31 and the vehicle body-side engagement portion 32 are engaged with each other, the roller 125 moves in the linear portion 127 of the cam groove 122 at the opening-and-closing operation position in the vicinity of the fully closed position P0 at which the front end portion 5*f* of the door 5 draws the linear slide trajectory Rs. Furthermore, when the door-side engagement portion 31 and the vehicle body-side engagement portion 32 are disengaged from each other, the roller 125 moves in the arc-shaped portion 126 of the cam groove 122 in a range in which the front end portion 5*f* of the door 5 draws the arc-shaped glide trajectory Rg and performs the opening-and-closing operation. Accordingly, the vehicle door device 20 of the present embodiment is configured such that the opening-and-closing operation trajectory R of the door 5 is defined.

Specifically, in the vehicle door device 20 of the present embodiment, the relative rotation between the vehicle body-side link 91 and the door-side link 92 is regulated according to the engagement position of the roller 125 in the cam groove 122. That is, the connection length L between the first rotation coupling point X1 and the second rotation coupling point X2 based on the operation of the connection length variable mechanism 35 formed by the vehicle body-side link 91 and the door-side link 92 is defined. Furthermore, similarly, the rotation of the door 5 around the second rotation coupling point X2 formed by the door-side link 92 is regulated based on the engagement position of the roller 125 in the cam groove 122.

Accordingly, the vehicle door device 20 of the present embodiment is configured such that the opening-and-closing operation trajectory R of the door 5 is defined.

Figure 35:
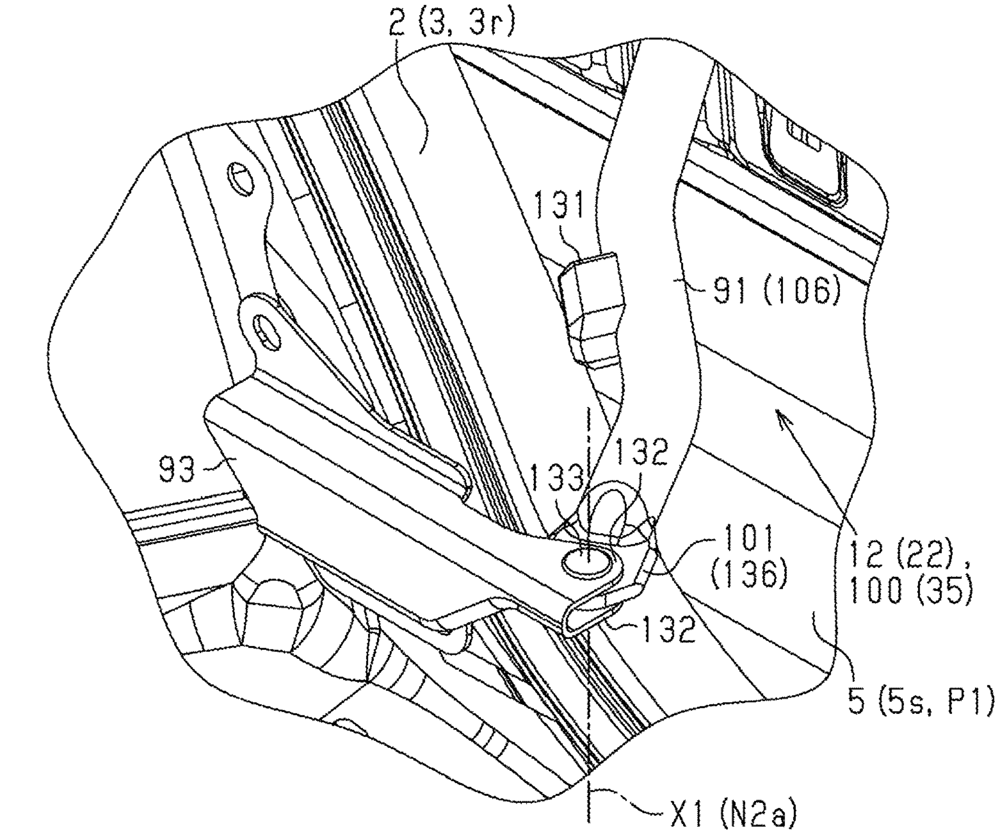
FIG. 35 is a perspective view of the vicinity of a first rotation coupling point of a second link arm with respect to a vehicle body.

Furthermore, as illustrated in FIG. 35, the vehicle door device 20 of the present embodiment includes a buffer member 131 interposed between the vehicle body 2 and the second link arm 12 as a stopper in a case where the door 5 is at a fully opened position P1.

More specifically, in the vehicle door device 20 of the present embodiment, the buffer member 131 is formed using a relatively soft elastic member such as a rubber material or an elastomer. Furthermore, the buffer member 131 is provided on the vehicle body-side link 91 having the first rotation coupling point X1 with respect to the vehicle body 2. Specifically, the buffer member 131 is fixed to the crank-shaped bent portion 106 provided on the vehicle body-side link 91. Accordingly, the second link arm 12 rotates around the first rotation coupling point X1, and the door 5 reaches the fully opened position P1, and thus the buffer member 131 of the present embodiment is sandwiched between the vehicle body-side link 91 and the rear edge portion 3*r* of the door opening 3.

That is, in the vehicle door device 20 of the present embodiment, the buffer member 131 supports the door 5 that has reached the fully opened position P1 on the vehicle body 2 in a state of being crushed between the vehicle body-side link 91 and the rear edge portion 3*r* of the door opening 3. Accordingly, the vehicle door device 20 of the present embodiment is configured such that rocking of the door 5 is suppressed and stably held at the fully opened position P1.

Figure 36:
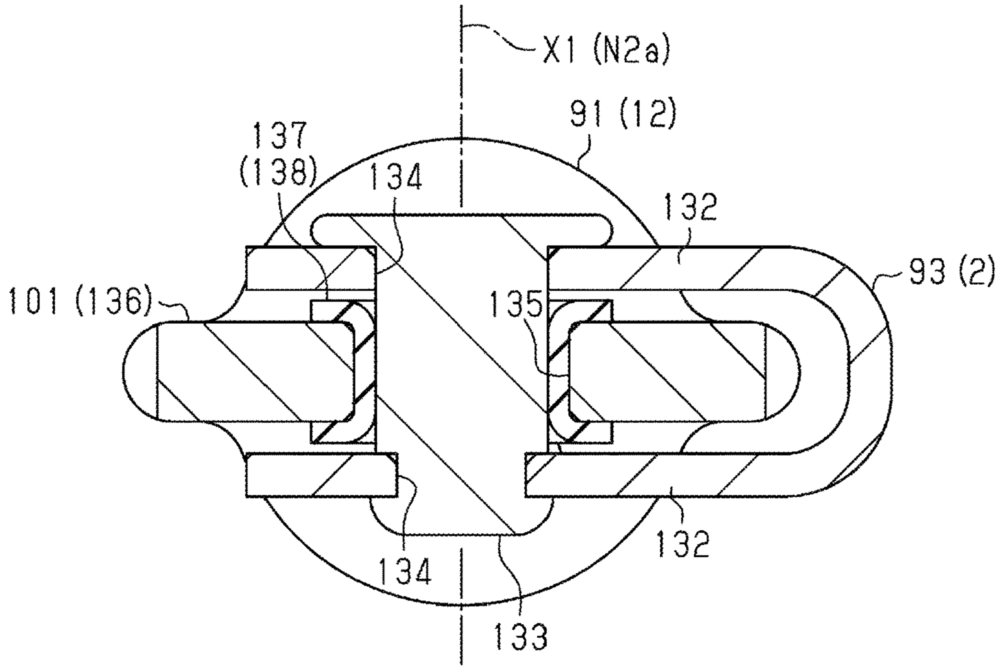
FIG. 36 is a cross-sectional view of a first rotation coupling point of a second link arm with respect to a vehicle body.
Figure 37:
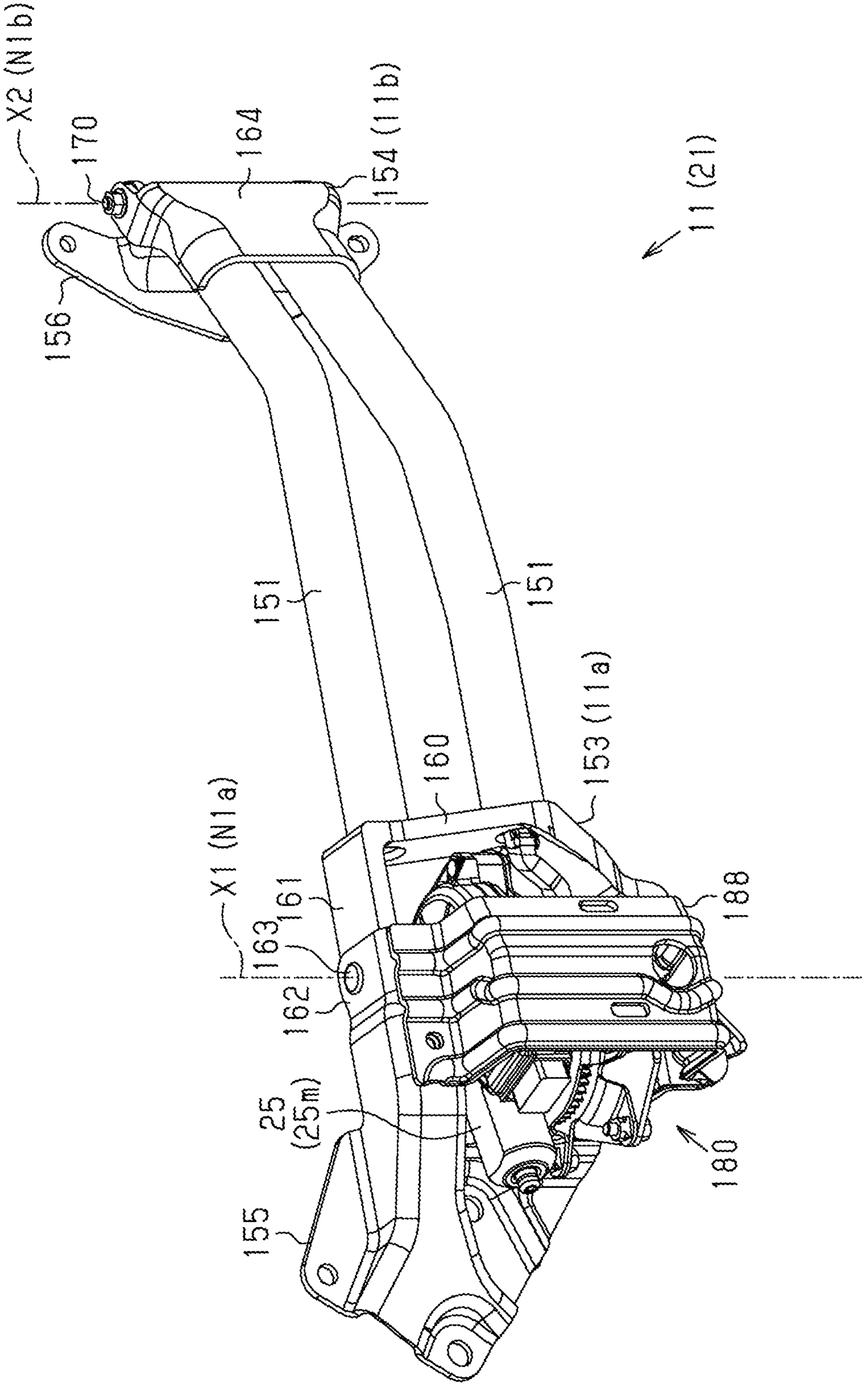
FIG. 37 is a perspective view illustrating a first link arm and an actuator.
Figure 38:
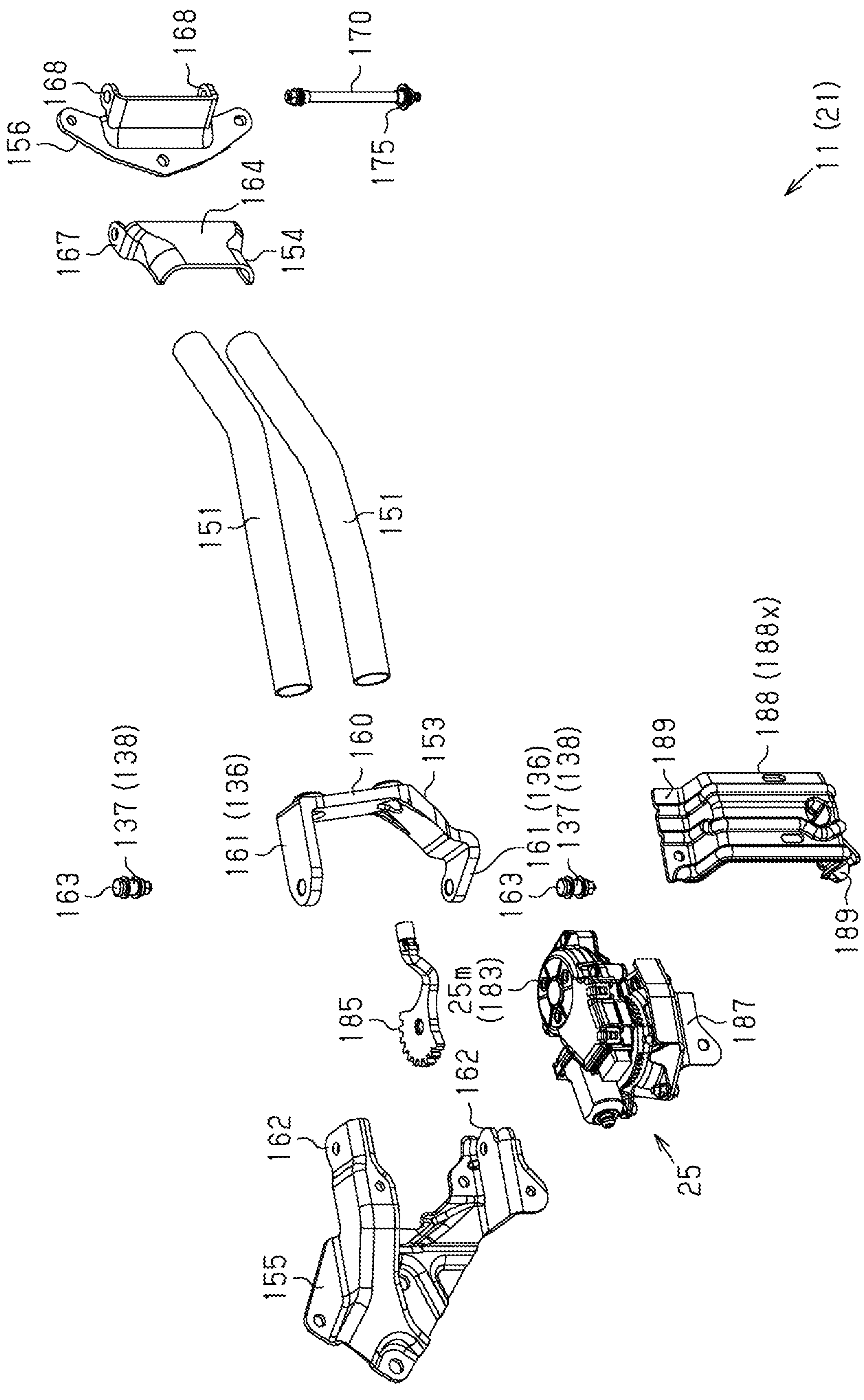
FIG. 38 is an exploded perspective view illustrating a first link arm and an actuator.
Figure 39:
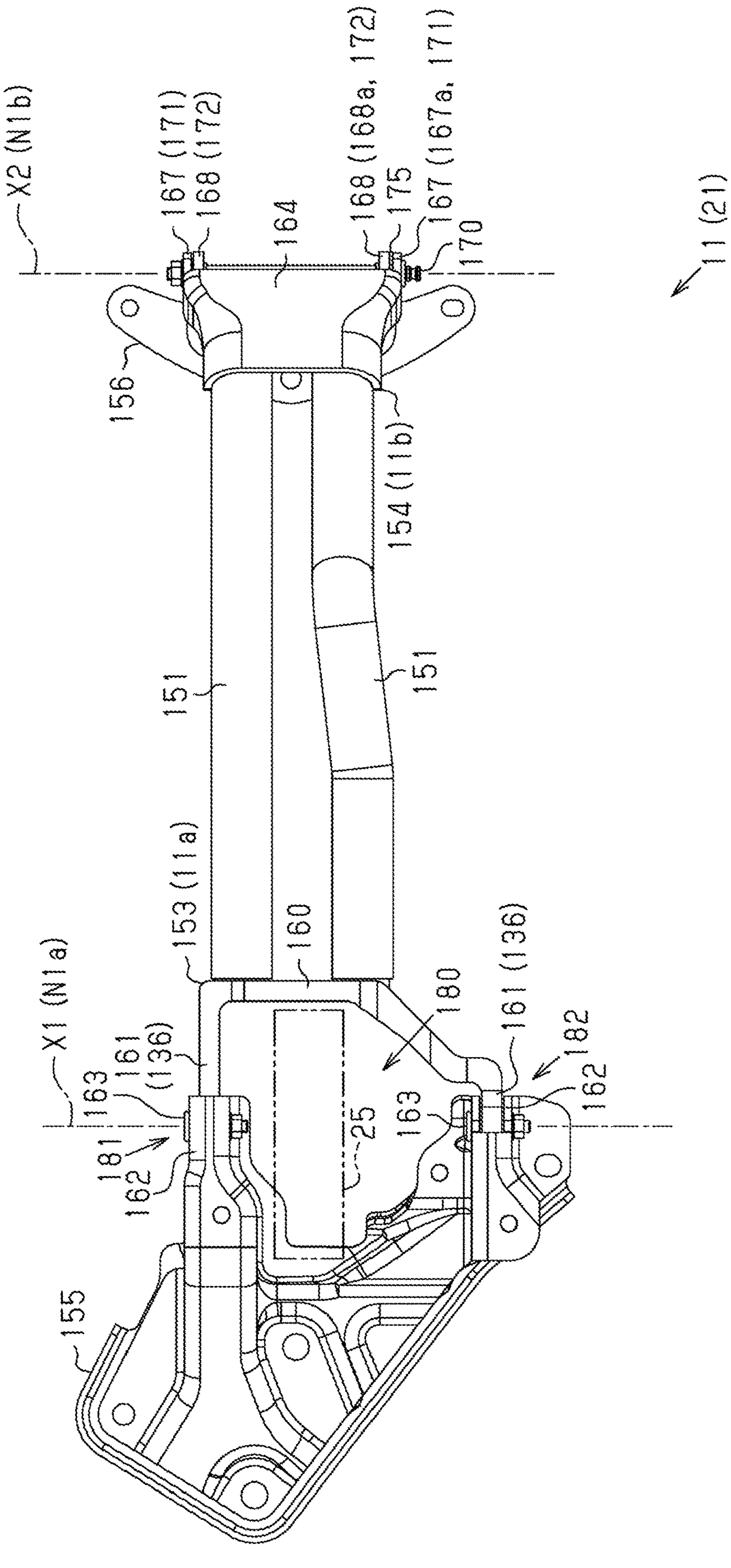
FIG. 39 is a side view of a first link arm.

Furthermore, as illustrated in FIGS. 29, 35, and 36, in the vehicle door device 20 of the present embodiment, the vehicle body-side coupling portion 101 provided on the vehicle body-side link 91 has a substantially flat shape. Moreover, the vehicle body bracket 93 that supports the vehicle body-side link 91 on the vehicle body 2 has a pair of coupling walls 132 and 132 disposed with the vehicle body-side coupling portion 101 interposed therebetween in the vertical direction. In the vehicle door device 20 of the present embodiment, the rotation shaft of the vehicle body-side link 91 with respect to the vehicle body 2 is formed around a support shaft 133 vertically passing through the vehicle body-side coupling portion 101 of the vehicle body-side link 91 and the coupling walls 132 and 132 of the vehicle body bracket 93. That is, the first rotation coupling point X1 is formed with the support shaft 133 as the support shaft N2*a* of the second link arm 12 with respect to the door 5.

More specifically, in the vehicle door device 20 of the present embodiment, the vehicle body bracket 93 includes the coupling walls 132 and 132 and is formed by bending a metal plate material. Furthermore, through holes 134 and 134 and a through hole 135 are respectively provided on the coupling walls 132 and 132 of the vehicle body bracket 93 and the vehicle body-side coupling portion 101 of the vehicle body-side link 91, the through holes 134 and 134, and through hole 135 penetrating, in the thickness direction, the coupling walls 132 and 132 of the vehicle body bracket 93 and the vehicle body-side coupling portion 101 of the vehicle body-side link 91, which have the substantially flat plate shape. The vehicle door device 20 of the present embodiment includes a bush 138 as a cylindrical buffer member 137 fitted in the through hole 135 of the vehicle body-side coupling portion 101 having the configuration as a plate-shaped coupling portion 136.

Specifically, the bush 138 is formed using a relatively soft elastic member such as a rubber material or an elastomer. Furthermore, the support shaft 133 is inserted into the through hole 135 provided on the vehicle body-side coupling portion 101 of the vehicle body-side link 91 via the bush 138. The axial opposite ends of the support shaft 133 are inserted into the through holes 134 and 134 provided on the coupling walls 132 and 132 of the vehicle body bracket 93, and thus the support shaft 133 is supported by the vehicle body bracket 93 in a state of extending in the vertical direction.

That is, in the vehicle door device 20 of the present embodiment, the vehicle body-side link 91 rotates around the support shaft 133, and thus the first rotation coupling point X1 of the second link arm 12 with respect to the vehicle body 2 is formed. In the vehicle door device 20 of the present embodiment, a gap is set between the vehicle body-side coupling portion 101 of the vehicle body-side link 91 and the coupling walls 132 and 132 of the vehicle body bracket 93 sandwiching the vehicle body-side coupling portion 101 in the vertical direction. Moreover, in the vehicle door device 20 of the present embodiment, the bush 138 as the cylindrical buffer member 137 is elastically deformed, and thus the vehicle body-side coupling portion 101 having the configuration as the plate-shaped coupling portion 136 is allowed to be displaced. That is, the vertical displacement of the second link arm 12 including tilting with respect to the support shaft N2*a* is allowed. Accordingly, the vehicle door device 20 of the present embodiment is configured to increase the degree of freedom of coupling the second link arm 12 with respect to the vehicle body 2.

As illustrated in FIG. 30, in the vehicle door device 20 of the present embodiment, the intermediate coupling point X3 formed by the intermediate coupling portions 103 and 104 of the vehicle body-side link 91 and the door-side link 92 also has a similar coupling structure.

That is, the intermediate coupling portion 103 of the vehicle body-side link 91 and the intermediate coupling portions 104 and 104 of the door-side link 92, which are disposed so as to sandwich the intermediate coupling portion 103 in the vertical direction, also have a substantially flat plate shape. Furthermore, the intermediate coupling portions 103, 104, and 104 are respectively provided with a through hole 143 and through holes 144 and 144 penetrating the intermediate coupling portions 103, 104, and 104 in the thickness direction, which have the substantially flat plate shape. Similarly to the vehicle body-side coupling portion 101 of the vehicle body-side link 91, the bush 138 as the cylindrical buffer member 137 is fitted into the through hole 143 provided on the intermediate coupling portion 103 of the vehicle body-side link 91 having the configuration as the plate-shaped coupling portion 136.

Furthermore, the vehicle door device 20 of the present embodiment has a support shaft 149 inserted into the through hole 143 provided on the intermediate coupling portion 103 of the vehicle body-side link 91 via the bush 138. Moreover, the axial opposite side portions of the support shaft 149 are inserted into the through holes 144 and 144 provided in the intermediate coupling portions 104 and 104 of the door-side link 92. Accordingly, the vehicle door device 20 of the present embodiment is configured such that the vehicle body-side link 91 and door-side link 92 constituting the second link arm 12 relatively rotate around the support shaft 149, and thus the intermediate coupling point X3 is formed.

Moreover, also for the intermediate coupling point X3, the bush 138 as the cylindrical buffer member 137 is elastically deformed, and thus tilting of the intermediate coupling portion 103 of the vehicle body-side link 91 with respect to the support shaft 149 is allowed, the intermediate coupling portion 103 having the configuration as the plate-shaped coupling portion 136. Accordingly, in the vehicle door device 20 of the present embodiment, the degree of freedom of coupling between the vehicle body-side link 91 and the door-side link 92 at the intermediate coupling point X3 is increased.

First Link Arm

Next, a configuration of the first link arm 11 having a configuration as the main link 21 will be described.

As illustrated in FIG. 24 and FIGS. 37 to 39, in the vehicle door device 20 of the present embodiment, the first link arm 11 includes a pair of pipe frames 151 and 151 disposed side by side in the vertical direction. The first link arm 11 includes a base end bracket 153 coupling the base end portions of the pipe frames 151 and 151 and a distal end bracket 154 coupling the distal end portions of the pipe frames 151 and 151.

Furthermore, the vehicle door device 20 of the present embodiment includes a vehicle body bracket 155 to which the base end bracket 153 constituting the first link arm 11 is rotatably coupled in a state of being fixed in the vicinity of the rear edge portion 3*r* of the door opening 3. Moreover, similarly, the vehicle door device 20 includes a door bracket 156 to which the distal end bracket 154 constituting the first link arm 11 is rotatably coupled in a state of being fixed to the inner side surface 5*s* of the door 5. Accordingly, in the vehicle door device 20 of the present embodiment, the first and second rotation coupling points X1 and X2 in the first link arm 11 are formed.

More specifically, in the vehicle door device 20 of the present embodiment, the base end bracket 153 forming a base end portion 11*a* of the first link arm 11 includes a base portion 160 that couples a pair of the pipe frames 151 and 151 in a state of extending in the vertical direction. Furthermore, the base end bracket 153 includes a pair of coupling portions 161 and 161 extending in a direction opposite to the extending direction of the pipe frames 151 and 151 coupled to the base portion 160 from the upper end and lower end of the base portion 160. Moreover, the vehicle body bracket 155 is provided with a pair of coupling portions 162 and 162 to which the coupling portions 161 and 161 are independently coupled. In the vehicle door device 20 of the present embodiment, the coupling portions 161 and 161 of the base end bracket 153 and the coupling portions 162 and 162 of the vehicle body bracket 155 are independently coupled to each other so as to be rotatable around the support shafts 163 and 163 extending in the vertical direction.

That is, accordingly, in the vehicle door device 20 of the present embodiment, the base end portion 11*a* of the first link arm 11 is rotatably coupled to the vehicle body 2 at two positions separated in the vertical direction. Accordingly, the first rotation coupling point X1 is formed with the support shafts 163 and 163 as the support shaft N1*a* of the first link arm 11 with respect to the vehicle body 2.

In the vehicle door device 20 of the present embodiment, each of the support shafts 163 and 163 is also provided to pass through the bush 138 as the cylindrical buffer member 137 fitted into the each of the coupling portions 161 and 161 of the base end bracket 153 having a substantially flat plate shape. That is, for the first rotation coupling point X1 in the first link arm 11, similarly to the case of the second link arm 12, the bush 138 is elastically deformed, and thus, the displacement of each of the coupling portions 161 and 161 of the base end bracket 153 is allowed as the plate-shaped coupling portion 136*d*. Accordingly, the vehicle door device 20 of the present embodiment is configured to increase the degree of freedom of coupling the first link arm 11 with respect to the vehicle body 2 by allowing the displacement of the second link arm 12 in the vertical direction, which includes tilting with respect to the support shaft N1*a*.

On the other hand, in the vehicle door device 20 of the present embodiment, the distal end bracket 154 forming a distal end portion 11*b* of the first link arm 11 has a cover shape covering a distal end side of a pair of the pipe frames 151 and 151. Specifically, the distal end bracket 154 includes a cover portion 164 that covers the distal end sides of the pipe frames 151 and 151 in a state of being disposed on the inner side than the pipe frames 151 and 151 in the vehicle width direction. In the vehicle door device 20, for example, each of the pipe frames 151 and 151 is fixed to the back surface of the cover portion 164 by welding or the like. Accordingly, the vehicle door device 20 of the present embodiment is configured such that the distal end portions of the pipe frames 151 and 151 constituting the first link arms 11 are coupled by the distal end bracket 154.

Furthermore, in the vehicle door device 20 of the present embodiment, the distal end bracket 154 includes a pair of coupling flanges 167 and 167 facing each other in the vertical direction. Moreover, the door bracket 156 fixed to the inner side surface 5*s* of the door 5 also includes a pair of coupling flanges 168 and 168 facing each other in the vertical direction. The coupling flanges 167 and 167 of the distal end bracket 154 and the coupling flanges 168 and 168 of the door bracket 156 are rotatably coupled to each other, and thus the second rotation coupling point X2 in the first link arm 11 is formed.

Specifically, the vehicle door device 20 of the present embodiment includes a support shaft 170 that vertically passes through the coupling flanges 167 and 167 of the distal end bracket 154 and the coupling flanges 168 and 168 of the door bracket 156. The coupling flanges 167 and 167 of the distal end bracket 154 and the coupling flanges 168 and 168 of the door bracket 156 relatively rotate around the support shaft 170.

That is, in the vehicle door device 20 of the present embodiment, the coupling flanges 167 and 167 and the coupling flanges 168 and 168 are respectively used as a first rotation coupling portion 171 and a second rotation coupling portion 172, and the second rotation coupling point X2 is formed. Moreover, the vehicle door device 20 of the present embodiment includes a friction member 175 interposed between the first and second rotation coupling portions 171 and 172 and in sliding contact with the first and second rotation coupling portions 171 and 172. Specifically, the friction member 175 is formed using a resin material having relatively large frictional resistance, such as nylon. Moreover, the friction member 175 is subjected to surface treatment for increasing the frictional resistance. Accordingly, sliding resistance is applied when the first and second rotation coupling portions 171 and 172 forming the second rotation coupling point X2 relatively rotate.

More specifically, in the vehicle door device 20 of the present embodiment, each of the coupling flanges 168 and 168 of the door bracket 156 is disposed inside each of the coupling flanges 167 and 167 of the distal end bracket 154 separated from each other in the vertical direction.

Figure 40:
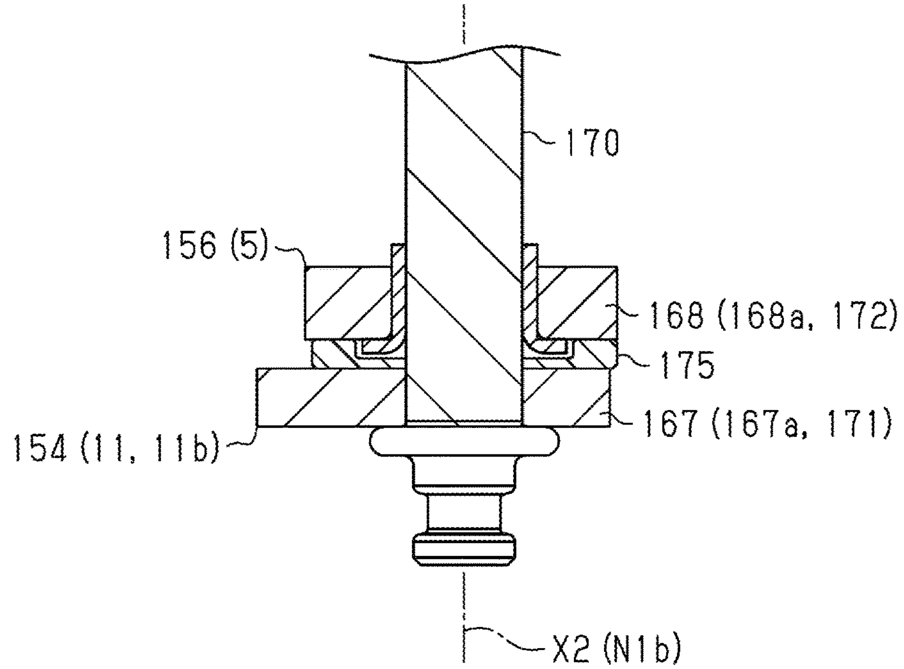
FIG. 40 is a cross-sectional view illustrating a distal end bracket, a door bracket, and a friction member which form a second rotation coupling point of a first link arm with respect to a door.
Figure 41:
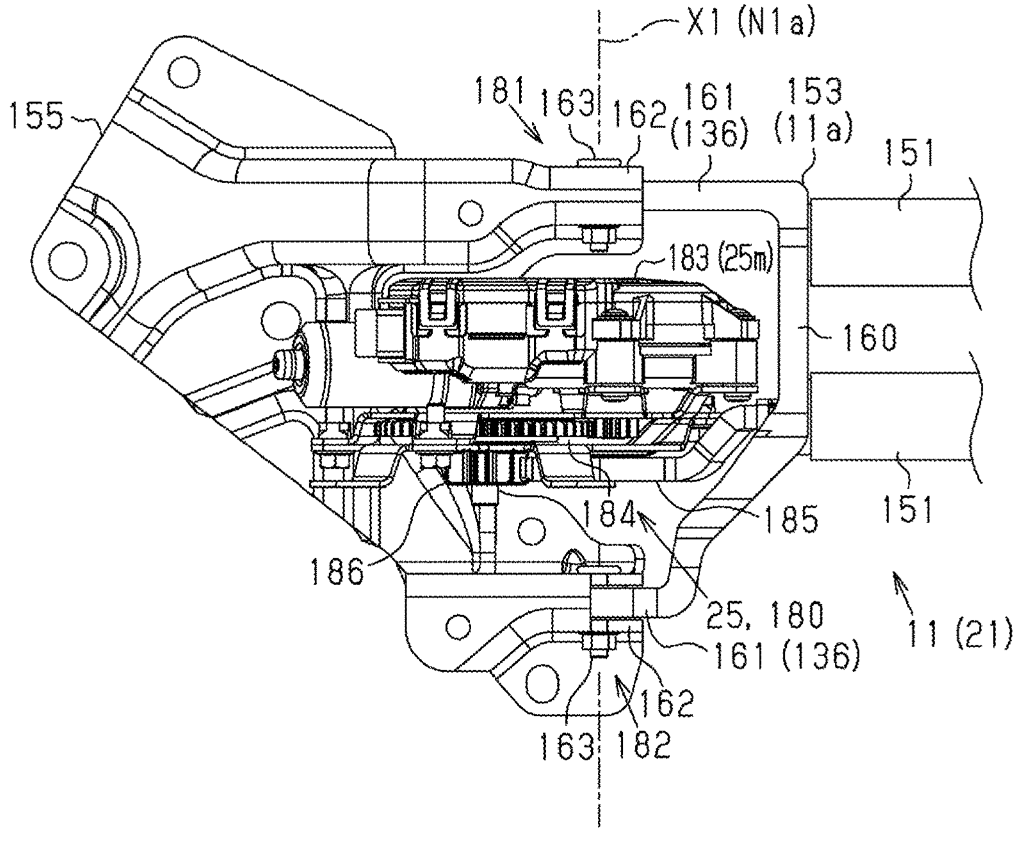
FIG. 41 is a side view of the vicinity of a formation portion of a first rotation coupling point of a first link arm provided with an actuator with respect to a vehicle body.
Figure 42:
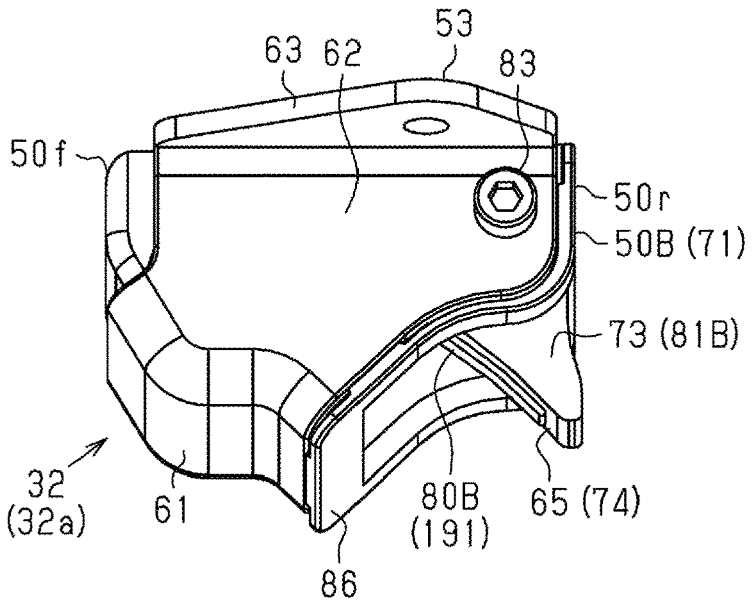
FIG. 42 is a perspective view illustrating a guide member and a fixing bracket according to a second embodiment.
Figure 43:
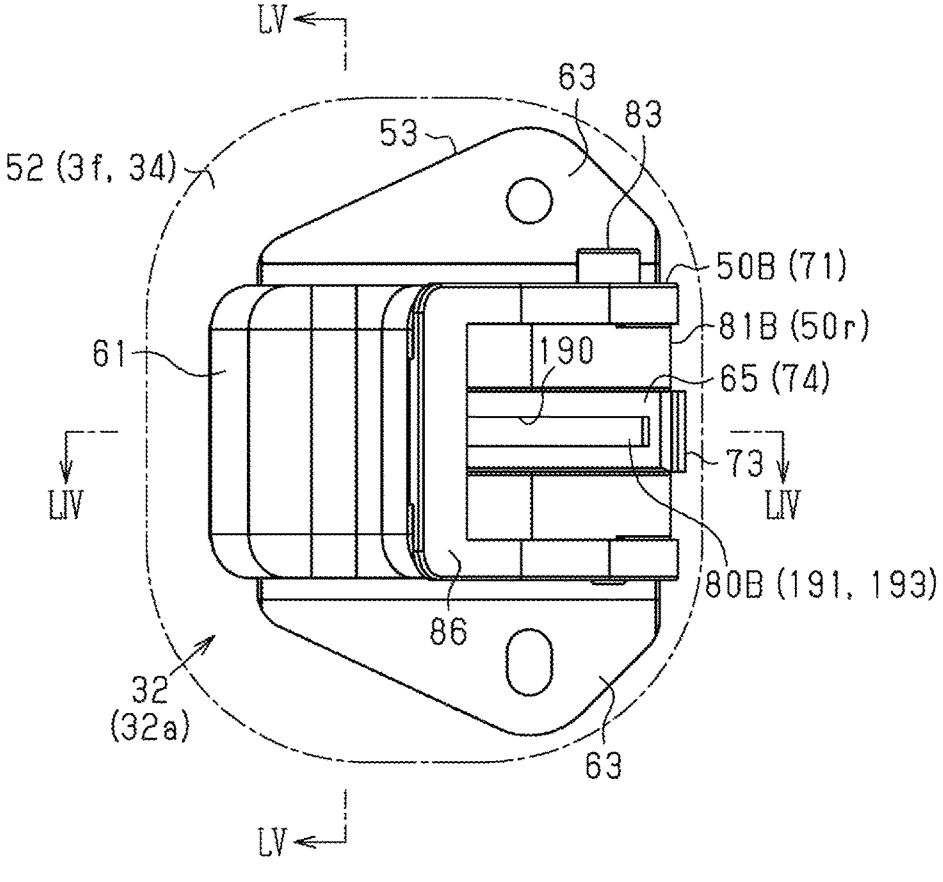
FIG. 43 is a side view illustrating a guide member and a fixing bracket according to the second embodiment.
Figure 44:
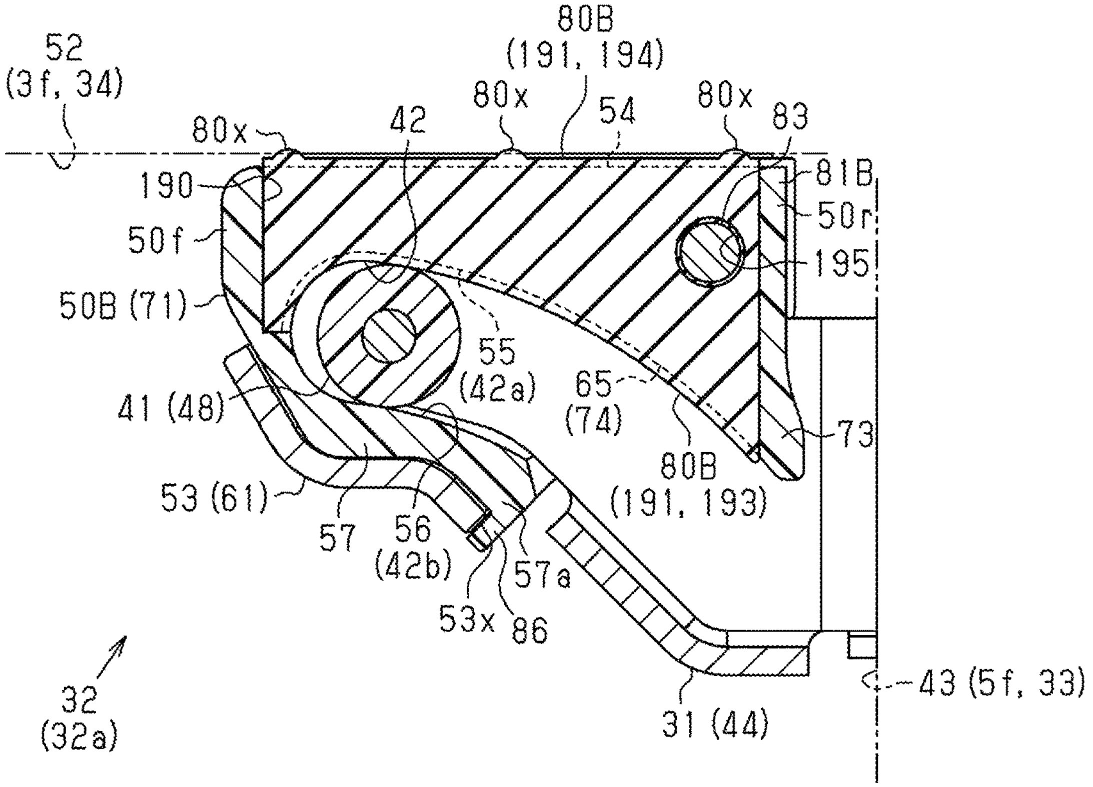
FIG. 44 is a cross-sectional view illustrating a door-side engagement portion and a vehicle body-side engagement portion according to the second embodiment.
Figure 45:
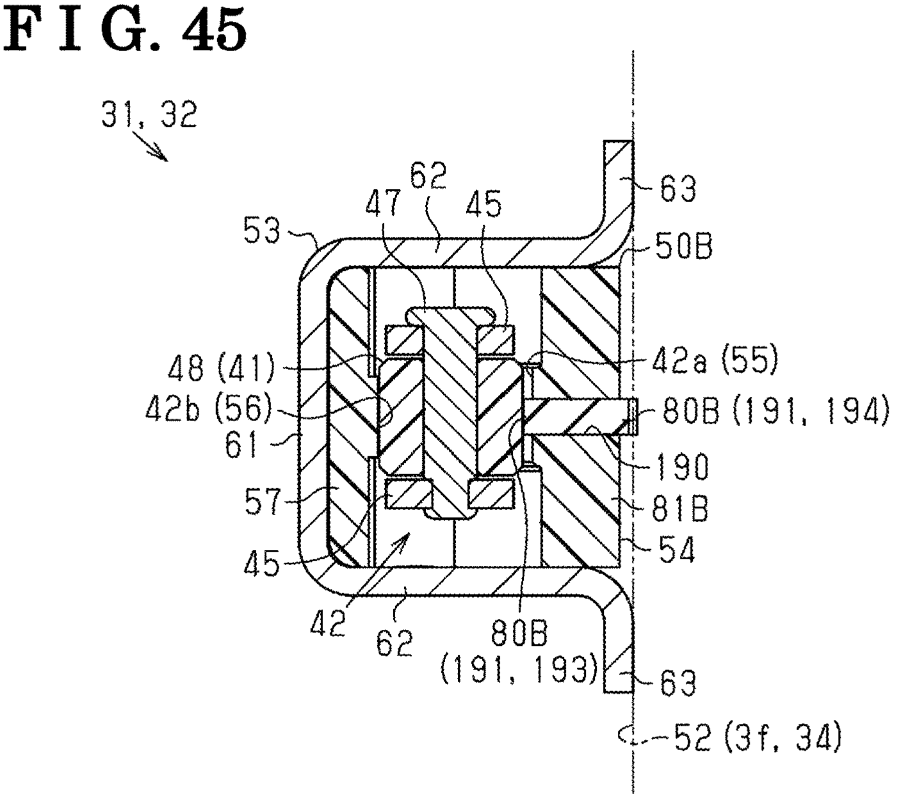
FIG. 45 is a cross-sectional view illustrating a door-side engagement portion and a vehicle body-side engagement portion according to the second embodiment.
Figure 46:
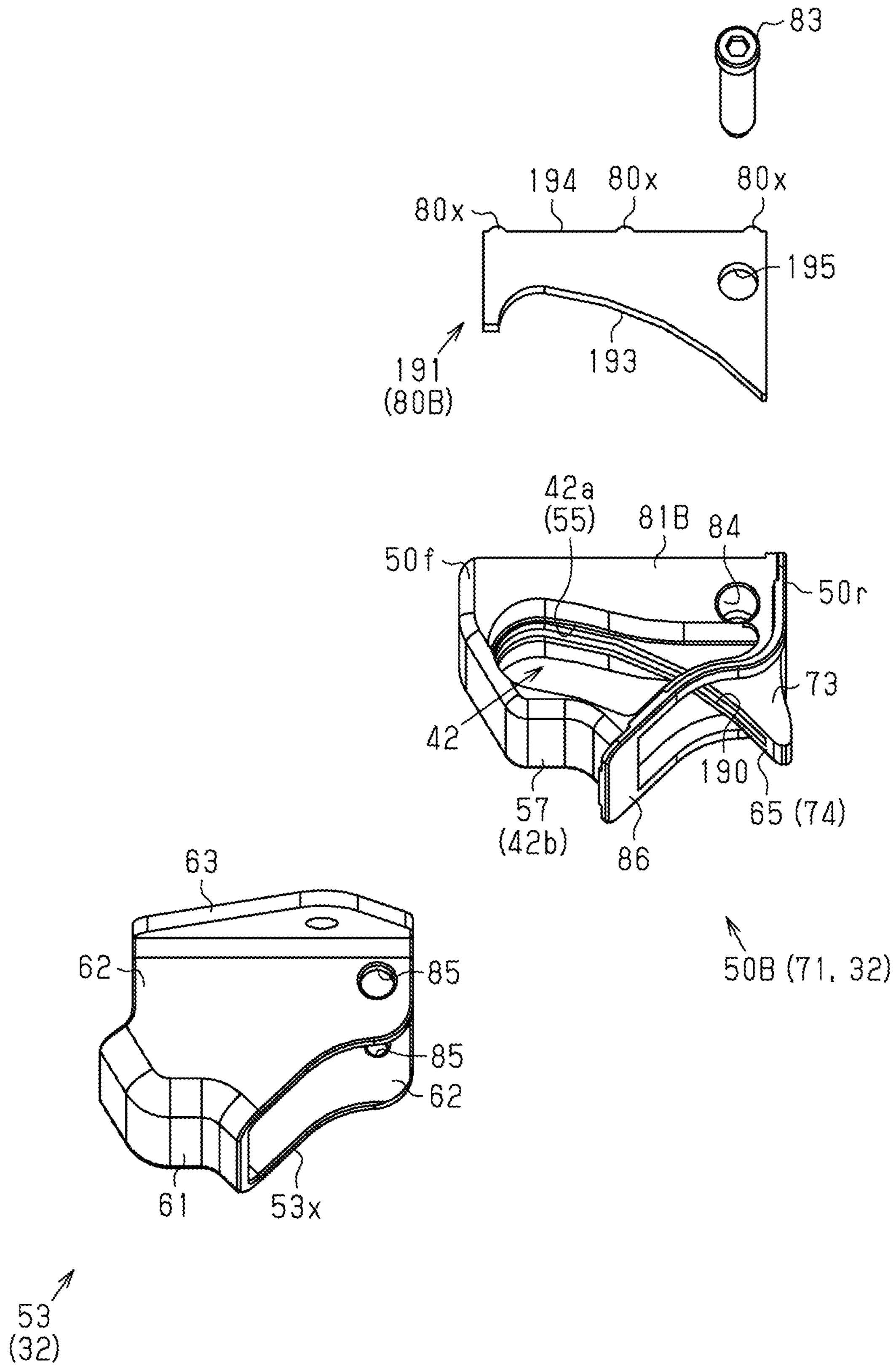
FIG. 46 is an exploded perspective view illustrating a guide member and a fixing bracket according to the second embodiment.
Figure 47:
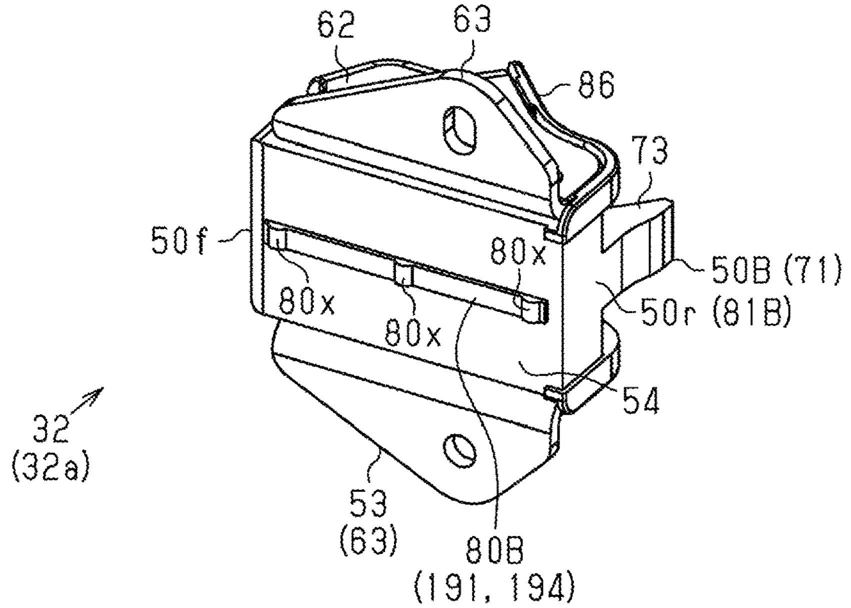
FIG. 47 is a perspective view illustrating a guide member and a fixing bracket according to the second embodiment.
Figure 48:
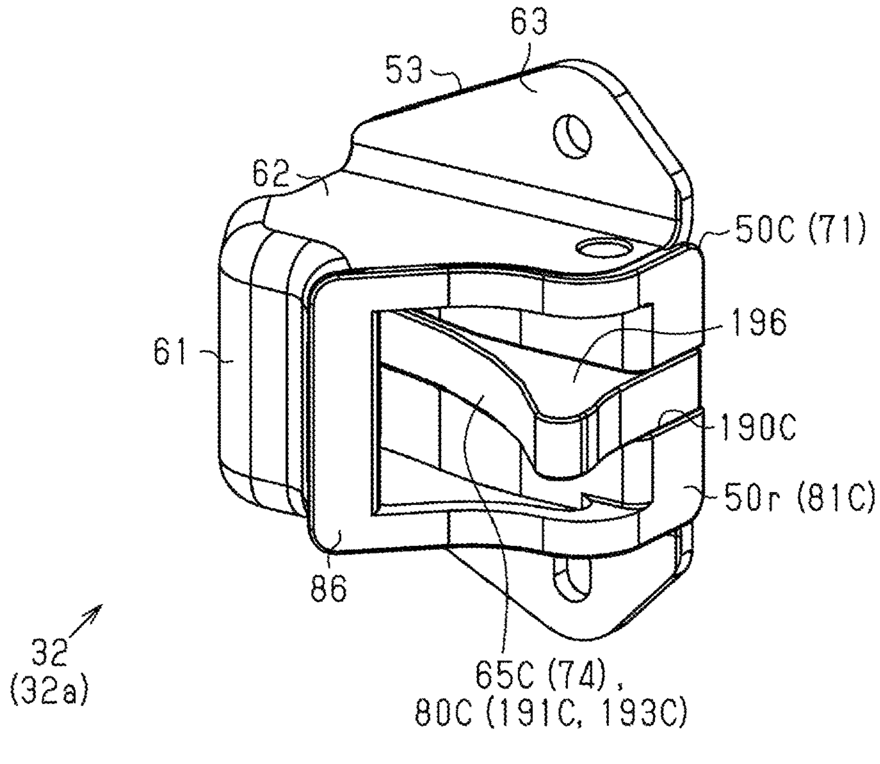
FIG. 48 is a perspective view illustrating a guide member and a fixing bracket according to a third embodiment.
Figure 49:
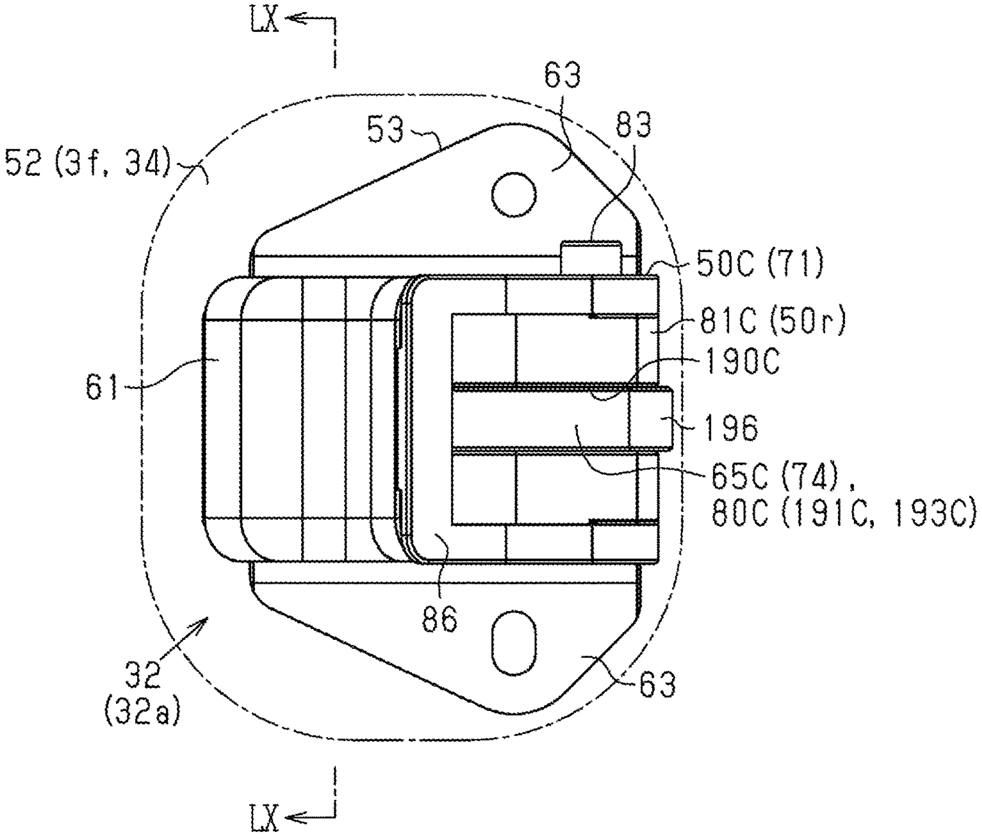
FIG. 49 is a side view illustrating a guide member and a fixing bracket according to the third embodiment.
Figure 50:
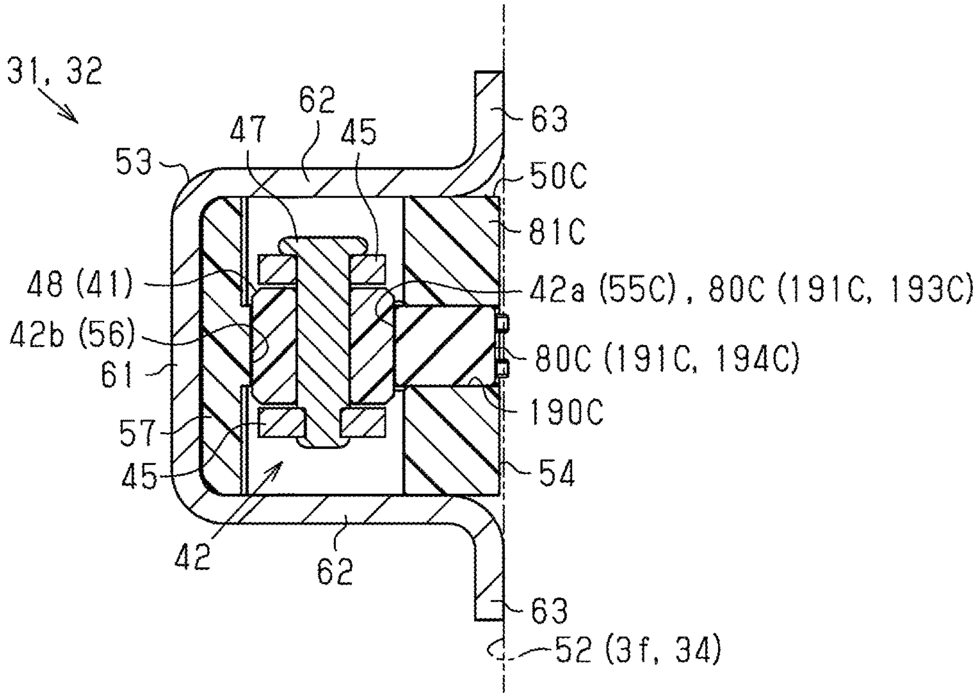
FIG. 50 is a cross-sectional view illustrating a door-side engagement portion and a vehicle body-side engagement portion according to the third embodiment.
Figure 51:
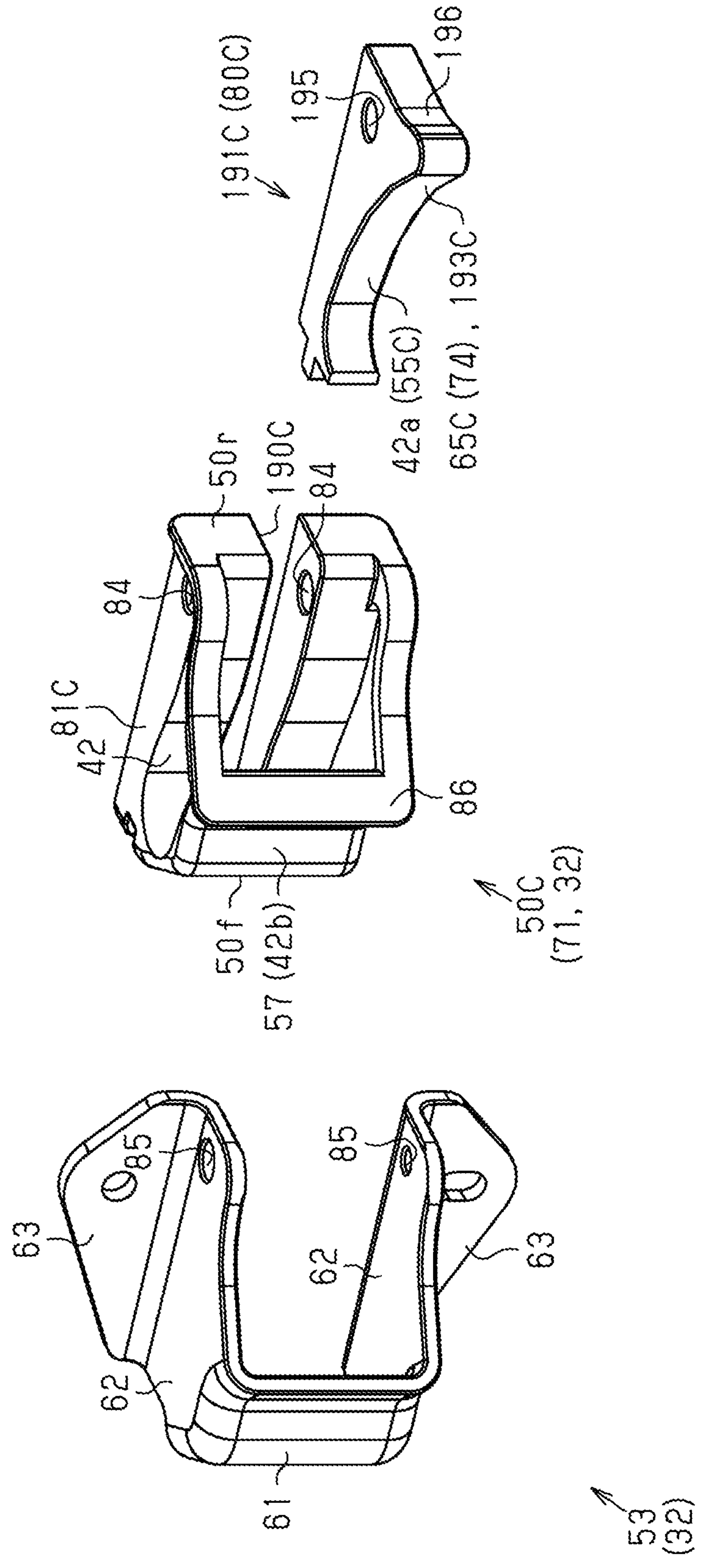
FIG. 51 is an exploded perspective view illustrating a guide member and a fixing bracket according to the third embodiment.
Figure 52:
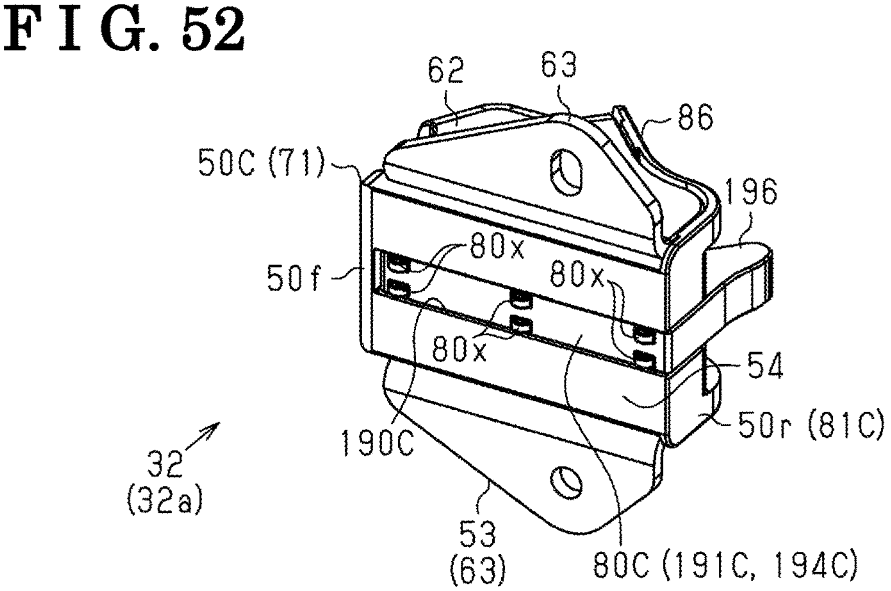
FIG. 52 is a perspective view illustrating a guide member and a fixing bracket according to the third embodiment.

That is, as illustrated in FIG. 40, for a coupling flange 167*a* and coupling flange 168*a* on the lower side, the coupling flange 168*a* of the door bracket 156 is disposed above the coupling flange 167*a* of the distal end bracket 154. Furthermore, the friction member 175 of the present embodiment has an annular plate shape fitted to the support shaft 170. In the vehicle door device 20 of the present embodiment, the friction member 175 is provided in a state of being sandwiched between the coupling flange 167*a* of the distal end bracket 154 and the coupling flange 168*a* of the door bracket 156, which overlap each other in the vertical direction.

That is, in the vehicle door device 20 of the present embodiment, the load of the door 5 is applied to the friction member 175 via the coupling flange 168*a* of the door bracket 156 located above the friction member 175. Furthermore, accordingly, a frictional force is generated between the friction member 175 and the coupling flange 167*a* of the distal end bracket 154 and the coupling flange 168*a* of the door bracket 156, which sandwich the friction member 175. Moreover, the coupling flange 167*a* of the distal end bracket 154 and the coupling flange 168*a* of the door bracket 156 relatively rotate around the support shaft 170, and thus the sliding resistance is applied. Accordingly, the vehicle door device 20 of the present embodiment is configured to attenuate rocking and vibration generated in the door 5 by increasing the operation resistance of the door 5 rotating around the second rotation coupling point X2 formed by the first and second rotation coupling portions 171 and 172.

Actuator

Next, a configuration of the actuator 25 in the vehicle door device 20 of the present embodiment will be described.

As described above, in the vehicle door device 20 of the present embodiment, the actuator 25 that generates the drive force for opening and closing the door 5 is provided at the base end portion 11*a* of the first link arm 11. Moreover, the actuator 25 rotationally drives the first link arm 11 by using the motor 25*m* as a drive source. Accordingly, the vehicle door device 20 is configured to open and close the door 5 supported by the vehicle body 2 via the link mechanism 15 based on the operation of the link mechanism 15 formed by the first link arm 11 and the second link arm 12 (see FIGS. 3 to 6).

More specifically, as illustrated in FIGS. 37 to 39 and FIG. 41, in the vehicle door device 20 of the present embodiment, the actuator 25 is disposed at a formation portion 180 of the first rotation coupling point X1 of the first link arm 11 with respect to the vehicle body 2.

Specifically, as described above, the base end portion 11*a* of the first link arm 11 is rotatably coupled to the vehicle body bracket 155 provided in the vehicle body 2 at two positions separated in the vertical direction. The actuator 25 of the present embodiment is disposed at a vertical direction position between the coupling portions 161 and 161 on the first link arm 11 side and the coupling portions 162 and 162 on the vehicle body bracket 155 side, which are rotatably coupled to each other at two positions separated from each other in the vertical direction.

That is, in the vehicle door device 20 of the present embodiment, the base end bracket 153 having a substantially U-shape forms the base end portion 11*a* of the first link arm 11. Moreover, the vehicle body bracket 155 also has a substantially U-shaped portion including the coupling portions 162 and 162 separated from each other in the vertical direction. The vehicle door device 20 of the present embodiment is configured such that the actuator 25 is disposed in the formation portion 180 of the first rotation coupling point X1 formed by coupling the two U-shaped members in a relatively rotatable manner.

In other words, in the vehicle door device 20 of the present embodiment, the first rotation coupling point X1 of the first link arm 11 with respect to the vehicle body 2 has an upper coupling point 181 and a lower coupling point 182 which are provided to be separated from each other in the vertical direction. The actuator 25 is provided at a position between the upper coupling point 181 and the lower coupling point 182 in the formation portion 180 of the first rotation coupling point X1.

More specifically, in the actuator 25 of the present embodiment, the motor 25*m* serving as a drive source has a configuration as a geared motor 183 with a reduction gear. Furthermore, the actuator 25 of the present embodiment includes a speed reduction mechanism 184 that further decreases the rotation of the motor 25*m*. Moreover, the vehicle door device 20 of the present embodiment includes a sector gear 185 that protrudes from the base portion 160 of the base end bracket 153 forming the base end portion 11*a* of the first link arm 11 and is disposed at a position between the coupling portions 161 and 161. In the vehicle door device 20 of the present embodiment, a pinion gear 186 of the speed reduction mechanism 184 meshes with the sector gear 185, and thus the drive force of the actuator 25 is transmitted to the first link arm 11.

The actuator 25 of the present embodiment is fixed to the vehicle body bracket 155 by using a fixing bracket 187. Furthermore, the vehicle door device 20 of the present embodiment includes a cover member 188 having a substantially cross section U-shape. Moreover, in the vehicle door device 20 of the present embodiment, in the cover member 188, flange portions 189 and 189 provided at opposite ends of a cover portion 188*x* having the substantially cross section U-shape are fixed to the coupling portions 162 and 162 on the vehicle body bracket 155 side provided to be separated from each other in the vertical direction. Accordingly, the vehicle door device 20 of the present embodiment is configured such that the cover member 188 covers the side of the actuator 25 disposed in the formation portion 180 of the first rotation coupling point X1.

Next, an action of the present embodiment will be described.

That is, in the vehicle door device 20 of the present embodiment, the axial engagement portion 41 abuts against the first guide member 71 via the elastic buffer member 80, and thus the impact at the time of the abutment is alleviated. When the axial engagement portion 41 abuts against the first guide member 71, the buffer member 80 interposed between the fixing surface 54 and the installation surface 52 is elastically deformed, and thus the impact due to the abutment is alleviated.

Next, effects of the present embodiment will be described.

(1) The vehicle door device 20 includes the first and second link arms 11 and 12 that include the first rotation coupling point X1 with respect to the vehicle body 2, and the second rotation coupling point X2 with respect to the door 5 of the vehicle 1. Furthermore, the vehicle door device 20 includes the door-side engagement portion 31 provided at the close-side end portion 33 of the door 5 that opens and closes the door opening 3 of the vehicle 1 based on the operation of the link mechanism 15 formed by the first and second link arms 11 and 12. Moreover, the vehicle door device 20 includes the vehicle body-side engagement portion 32 provided at the close-side end portion 34 of the door opening 3 which the close-side end portion 33 of the door 5 comes into contact with or separates from, that is, approaches or separates from, based on the opening-and-closing operation of the door 5. The door-side engagement portion 31 includes the axial engagement portion 41 extending in the vertical direction of the vehicle 1, and the vehicle body-side engagement portion 32 includes the guide groove 42 having a pair of the side wall portions **42*a* and 42*b* facing each other in the vehicle width direction and extending in the opening-and-closing operation direction of the door 5**.

At the opening-and-closing operation position in the vicinity of the fully closed position P0 of the door 5 at which the door-side engagement portion 31 and the vehicle body-side engagement portion 32 are engaged with each other, the axial engagement portion 41 is disposed inside the guide groove 42.

According to the above-described configuration, the axial engagement portion 41 is disposed inside the guide groove 42, and thus the displacement of the door 5 in the vehicle width direction is regulated. Accordingly, even at the opening-and-closing operation position in the vicinity of the fully closed position P0 at which the first and second link arms 11 and 12 are brought closer to each other and are linearly aligned, the door 5 can be stably supported.

(2) Furthermore, the configuration in which the door-side engagement portion 31 includes the axial engagement portion 41 is adopted, and thus the door-side engagement portion 31 is less likely to interfere with the user when the user gets on and off the vehicle 1. Moreover, when the guide groove 42 is provided on the vehicle body-side engagement portion 32 side, for example, clothes of the user are less likely to be caught by the guide groove 42. Therefore, convenience can be improved.

(3) The vehicle door device 20 includes the guide member 50 forming the guide groove 42. The guide member 50 includes the buffer member 80 having elasticity that reduces the impact when the axial engagement portion 41 that relatively moves based on the opening-and-closing operation of the door 5 abuts against the guide member 50.

According to the above-described configuration, when the door-side engagement portion 31 and the vehicle body-side engagement portion 32 are engaged with or disengaged from each other based on the opening-and-closing operation of the door 5, it is possible to effectively alleviate the impact acting on the guide member 50 due to the abutment of the axial engagement portion 41. Therefore, it is possible to suppress the generation of noise or vibration and secure a high operation feeling.

(4) The buffer member 80 is provided at a position at which the axial engagement portion 41 of the door-side engagement portion 31 that relatively moves based on the opening-and-closing operation of the door 5 abuts against the first guide member 71.

According to the above configuration, the axial engagement portion 41 abuts against the guide member 50 via the elastic buffer member 80, and thus the impact acting on the guide member 50 due to the abutment of the axial engagement portion 41 can be effectively alleviated.

(5) The guide member 50 includes the guide surface 65 continuous with the guide groove 42. The buffer member 80 is provided on the guide surface 65.

That is, the axial engagement portion 41 that is engaged with or disengaged from the guide groove 42 of the guide member 50 based on the opening-and-closing operation of the door 5 is guided in a direction of entering the guide groove 42 and in a direction of disengaging from the guide groove 42 by abutting on the guide surface 65. According to the above-described configuration, it is possible to effectively alleviate the impact acting on the guide member 50 due to the abutment of the axial engagement portion 41.

(6) The buffer member 80 is provided on the fixing surface 54 of the guide member 50 with respect to the installation surface 52 on the vehicle body 2 side.

According to the above configuration, the buffer member 80 interposed between the fixing surface 54 and the installation surface 52 is elastically deformed, and thus the impact acting on the guide member 50 due to the abutment of the axial engagement portion 41 can be effectively alleviated.

(7) The buffer member 80 has a plurality of the protrusions **80*x* that are crushed by the installation surface 52 when the guide member 50 is fixed to the installation surface 52**.

According to the above-described configuration, since the crushed protrusions **80*x* reduce backlash, rattling of the guide member 50 fixed to the installation surface 52** can be suppressed. Therefore, a high operation feeling can be secured.

(8) The buffer member 80 and the installation surface 52 are located on an extension line in a direction in which the axial engagement portion 41 comes into contact with and separates from the guide member 50 based on the opening-and-closing operation of the door 5. Therefore, it is possible to effectively alleviate the impact acting on the guide member 50 due to the abutment of the axial engagement portion 41.

(9) The guide member 50 includes a base member 81 having the guide groove 42 and a covering body 82 forming the buffer member 80 in a state of covering the base member 81.

According to the above-described configuration, the buffer member 80 can be appropriately disposed at a position at which the impact when the axial engagement portion 41 abuts against the guide member 50 can be alleviated. Moreover, for example, the covering body 82 to be the buffer member 80 can be integrally molded with the base member 81 by using two-color molding. Therefore, the manufacturing process of the guide member 50 can be facilitated.

(10) The vehicle door device 20 includes, as the guide member 50, the first and second guide members 71 and 72 that are disposed to be separated from each other in the vertical direction. The first guide member 71 has the guide protrusion 73 protruding in the contacting-and-separating direction of the axial engagement portion 41 based on the opening-and-closing operation of the door 5, and the guide protrusion 73 forms the guide surface 65. The second guide member 72 does not have the guide protrusion 73.

According to the above-described configuration, in the first guide member 71, the engagement and disengagement trajectory of the axial engagement portion 41 with respect to the first guide member 71 is defined by the guide surface 65 formed by the guide protrusion 73. Furthermore, in the second guide member 72, the guide protrusion 73 is not provided, and thus the degree of freedom of engagement and disengagement of the axial engagement portion 41 with respect to the second guide member 72 is increased. Accordingly, the axial engagement portions 41 and 41 are hardly caught by the corresponding first and second guide members 71 and 72 when the corresponding axial engagement portions 41 and 41 are engaged with or disengaged from the first and second guide members 71 and 72. As a result, the rocking of the door 5 caused by the occurrence of the catching can be suppressed, and good operation feeling can be secured.

(11) The first link arm 11 has the second rotation coupling point X2 connected to the door 5 at a position closer to the center of gravity G of the door 5 as compared with the second link arm 12. The first guide member 71 is provided at the first vertical direction position Y1 corresponding to the first link arm 11.

That is, near the support position by the first link arm 11 configured as described above, the orientation change of the door 5 tends to be small, that is, the engagement and disengagement orientation of the axial engagement portion 41 with respect to the guide groove 42 tends to hardly change. Therefore, by providing the first guide member 71 having the guide protrusion 73 at the first vertical direction position Y1 corresponding to the first link arm 11, it is possible to define the engagement and disengagement trajectory while preventing the axial engagement portion 41 from being caught.

(12) The vehicle door device 20 includes the connection length variable mechanism 35 provided in the second link arm 12 and capable of changing the connection length L between the first rotation coupling point X1 and the second rotation coupling point X2. The second guide member 72 is provided at the second vertical direction position Y2 corresponding to the second link arm.

That is, in a state in which the door-side engagement portion 31 and the vehicle body-side engagement portion 32 are engaged with each other, the opening-and-closing operation trajectory of the door 5 changes from the arc-shaped glide trajectory Rg to the linear slide trajectory Rs based on the operation of the connection length variable mechanism 35. Therefore, the door 5 can be smoothly closed to the fully closed position and opened from the fully closed position.

However, near the position supported by the second link arm 12 provided with the connection length variable mechanism 35, the orientation change of the door 5 tends to be large. That is, the engagement and disengagement orientation of the axial engagement portion 41 with respect to the guide groove 42 tends to change easily. In view of this point, as in the above-described configuration, the second guide member 72 not having the guide protrusion 73 is provided at the second vertical direction position Y2 corresponding to the second link arm 12. Therefore, by securing the degree of freedom of engagement or disengagement of the axial engagement portion 41, it is possible to effectively prevent the axial engagement portion 41 from being caught.

(13) The vehicle door device 20 includes the fixing bracket 53 that fixes the guide member 50 to the installation surface 52 in a state in which the formation portion of the guide groove 42 is sandwiched between the fixing bracket 53 and the installation surface 52 on the vehicle body 2 side set at the close-side end portion 34 of the door opening 3.

According to the above-described configuration, the guide member 50 can be stably fixed to the installation surface 52. In particular, one side wall portion **42*b* of the guide groove 42 engaged with the axial engagement portion 41 tends to have a cantilever beam structure. However, by sandwiching the formation portion of the guide groove 42 with the installation surface 52, high strength can be secured. Moreover, the fixing bracket 53 can cover the formation portion of the guide groove 42. Therefore, the guide groove 42 can be protected, and, for example, clothes of the user can be prevented from being caught by the guide groove 42**.

(14) The fixing bracket 53 has the regulation wall 61 that sandwiches the formation portion of the guide groove 42 with the installation surface 52. The vehicle door device 20 includes the coupling shaft 83 passing through the guide member 50 and the fixing bracket 53 in a state of being parallel to the installation surface 52 and the regulation wall 61.

According to the above-described configuration, when the axial engagement portion 41 abuts against the guide member 50, a direction in which the guide member 50 is displaced with the coupling shaft 83 as the support shaft is defined. That is, the guide member 50 tends to rotate around the coupling shaft 83 by the abutment of the axial engagement portion 41. The movement of the guide member 50 is regulated by the installation surface 52 on the vehicle body 2 side or the regulation wall 61 of the fixing bracket 53, which is located in the rotation direction, and thus the guide member 50 can be stably fixed to the installation surface 52.

(15) The door-side engagement portion 31 includes the roller 48 axially supported to be rotatable by the support shaft 47. The roller 48 functions as the axial engagement portion 41.

According to the above-described configuration, the axial engagement portion 41 can be smoothly engaged with and disengaged from the guide groove 42.

(16) The vehicle door device 20 includes the actuator 25 that applies a drive force to the link mechanism 15 formed by the first and second link arms 11 and 12 to open and close the door 5.

Therefore, convenience can be improved.

Second Embodiment

Hereinafter, the second embodiment embodying a vehicle door device will be described with reference to the drawings. For convenience of description, the same components as those of the first embodiment are denoted by the same reference numerals, and the description thereof will be omitted.

As illustrated in FIGS. 42 to 47, the present embodiment is different from the first embodiment in a configuration of a guide member 50B, specifically, a configuration of a buffer member 80B provided in the guide member 50B. In the present embodiment, the guide member 50B illustrated in FIGS. 42 to 47 is used as the first guide member 71 forming the upper vehicle body-side engagement portion 32*a*. The second guide member 72 forming the lower vehicle body-side engagement portion 32*b* is similar to that of the first embodiment (see FIGS. 18 to 20).

More specifically, the guide member 50B of the present embodiment also includes a base member 81B having the guide groove 42. Furthermore, in the guide member 50B of the present embodiment, the base member 81B is provided with a hole portion 190. Moreover, the guide member 50B of the present embodiment is provided with an insertion body 191 inserted into the hole portion 190. In the guide member 50B of the present embodiment, the insertion body 191 functions as the buffer member 80B.

Specifically, in the guide member 50B of the present embodiment, the hole portion 190 has a configuration as a through hole passing through the base member 81B in the vehicle width direction (in FIG. 44, the vertical direction) in a state in which the guide member 50B is fixed to the installation surface 52 on the vehicle body 2 side. Moreover, the hole portion 190 has a configuration as a groove hole extending in the vehicle horizontal direction (horizontal direction in FIGS. 43 and 44) in a state in which the guide member 50B is similarly fixed to the installation surface 52. Accordingly, the guide member 50B of the present embodiment is configured such that the hole portion 190 opens to the first facing surface 55 forming the side wall portion 42*a* of the guide groove 42, the guide surface 65 formed by the guide protrusion 73, and the fixing surface 54 with respect to the installation surface 52.

Furthermore, in the guide member 50B of the present embodiment, the insertion body 191 has a substantially flat plate shape to be inserted in a state of being fitted into the hole portion 190 provided in the base member 81B. Moreover, the insertion body 191 is configured such that a first end portion 193 and a second end portion 194 disposed in the vehicle width direction slightly protrude from the hole portion 190 in a state of being inserted into the hole portion 190. Accordingly, the guide member 50B of the present embodiment is configured such that the insertion body 191 as the buffer member 80B is disposed at a position at which the fixing surface 54 with respect to the installation surface 52 and the axial engagement portion 41 of the door-side engagement portion 31 that relatively moves based on the opening-and-closing operation of the door 5 abut.

More specifically, in the guide member 50B of the present embodiment, the first end portion 193 of the insertion body 191 has an end surface shape substantially equal to that of the first facing surface 55 and the guide surface 65 of the guide member 50B formed by the base member 81B. Specifically, the insertion body 191 of the present embodiment has the end surface shapes of the side wall portion 42*a* of the guide groove 42 facing outward in the vehicle width direction and the first end portion 193 curved to have the substantially equal shape to the curved shape set to the guide surface 65 continuous with the side wall portion 42*a*. Accordingly, the guide member 50B of the present embodiment is configured such that the first end portion 193 of the insertion body 191 protruding from the hole portion 190 of the base member 81B and facing outward in the vehicle width direction has a substantially constant protruding amount over the extending direction of the hole portion 190 having the groove hole shape.

Furthermore, the second end portion 194 of the insertion body 191 has a substantially flat end surface shape similarly to that of the fixing surface 54 with respect to the installation surface 52. Accordingly, the guide member 50B of the present embodiment is configured such that the second end portion 194 of the insertion body 191 protruding from the hole portion 190 of the base member 81B and facing inward in the vehicle width direction also has a substantially constant protruding amount over the extending direction of the hole portion 190 having the groove hole shape.

The guide member 50B of the present embodiment also includes a plurality of the protrusions 80*x* provided on the second end portion 194 of the insertion body 191 forming the buffer member 80B. The guide member 50B of the present embodiment is also configured to be fixed to the installation surface 52 on the vehicle body 2 side in a state in which the protrusions 80*x* are crushed.

Moreover, in the guide member 50B of the present embodiment, the insertion body 191 includes a hole 195 into which the coupling shaft 83 is inserted. Accordingly, the guide member 50B of the present embodiment is also configured such that the insertion body 191, the base member 81B, and the fixing bracket 53 are integrated with each other.

As described above, also in the present embodiment, the same effects as those of the first embodiment can be obtained. In addition, the following specific effects can be obtained.

(1) The guide member 50B includes the base member 81B having the guide groove 42, and the insertion body 191 forming the buffer member 80B in a state of being inserted into the hole portion 190 provided in the base member 81B.

According to the above-described configuration, the buffer member 80B can be appropriately disposed at a position at which the impact when the axial engagement portion 41 abuts against the guide member 50B can be alleviated. Moreover, the base member 81B and the buffer member 80B can be easily and integrally assembled. Therefore, the manufacturing process of the guide member 50B can be facilitated.

(2) The hole portion 190 is provided at a position open to the guide surface 65. The insertion body 191 forms the buffer member 80B in a state of protruding to the guide surface 65.

According to the above-described configuration, the buffer member 80B can be appropriately disposed on the guide surface 65 that comes into contact with the axial engagement portion 41 that comes into contact with and separates from the guide member 50B based on the opening-and-closing operation of the door 5 and defines the engagement and disengagement trajectory with respect to the guide groove 42. Therefore, it is possible to effectively alleviate the impact acting on the guide member 50B due to the abutment of the axial engagement portion 41.

Furthermore, the elastic deformation amount of the buffer member 80B in accordance with the abutment of the axial engagement portion 41 can be controlled based on the amount of protrusion from the hole portion 190. That is, the portion protruding to the guide surface 65 is crushed, and thus the axial engagement portion 41 directly abuts on the guide surface 65. Accordingly, the engagement and disengagement trajectory of the axial engagement portion 41 with respect to the guide groove 42 can be accurately defined.

(3) The hole portion 190 has a configuration as a through hole passing through the base member 81B in the vehicle width direction in a state in which the guide member 50B is fixed to the installation surface 52 on the vehicle body 2 side. Accordingly, the guide member 50B is configured such that the insertion body 191 inserted into the hole portion 190 is sandwiched between the axial engagement portion 41 abutting on the insertion body 191 as the buffer member 80B and the installation surface 52 of the guide member 50B.

According to the above-described configuration, it is possible to elastically deform the insertion body 191 based on the pressing force of the axial engagement portion 41 abutting on the insertion body 191 forming the buffer member 80B without interposing the base member 81B. Therefore, it is possible to effectively alleviate the impact acting on the guide member 50B due to the abutment of the axial engagement portion 41.

Third Embodiment

Hereinafter, the third embodiment embodying a vehicle door device will be described with reference to the drawings. For convenience of description, the same components as those of the first embodiment and the second embodiment are denoted by the same reference numerals, and the description thereof will be omitted.

As illustrated in FIGS. 48 to 52, the present embodiment is also different from the first embodiment and the second embodiment in a configuration of a guide member 50C, specifically, a configuration of a buffer member 80C provided in the guide member 50C.

More specifically, similarly to the guide member 50B in the second embodiment, the guide member 50C of the present embodiment also includes a hole portion 190C provided in a base member 81C and an insertion body 191C inserted into the hole portion 190C. The insertion body 191C functions as the buffer member 80C.

Specifically, the hole portion 190C of the present embodiment has a slit-like groove shape provided by cutting out the rear end portion 50*r* of the guide member 50C. Moreover, in comparison with the guide member 50B of the second embodiment, the groove width of the hole portion 190C of the present embodiment is set to be wider. Accordingly, the guide member 50C of the present embodiment is configured such that the insertion body 191C as the buffer member 80C inserted into the hole portion 190C forms a guide surface 65C at the rear end portion 50*r* of the guide member 50C.

More specifically, the insertion body 191C of the present embodiment also has a substantially flat plate shape inserted in a state of being fitted to the hole portion 190C. Furthermore, the insertion body 191 is configured such that a first end portion 193C side facing outward in the vehicle width direction in a state of being inserted into the hole portion 190C protrudes from the hole portion 190C. Specifically, in the guide member 50 of the first embodiment, the insertion body 191C has a protrusion 196 having substantially the same end surface shape as the guide protrusion 73 forming the guide surface 65 on the first end portion 193C side. The guide member 50C of the present embodiment is configured such that the protrusion 196 provided on the first end portion 193C side of the insertion body 191C protrudes from the hole portion 190C of the base member 81C to form the guide surface 65C.

Also in the base member 81C of the present embodiment, the hole portion 190C extends to the front end portion 50*f* side of the guide member 50C forming the guide groove 42. Accordingly, the guide member 50C of the present embodiment is configured such that the insertion body 191C as the buffer member 80C inserted into the hole portion 190C forms a first facing surface 55C forming the side wall portion 42*a* of the guide groove 42.

Moreover, the guide member 50C of the present embodiment also includes a plurality of protrusions 80*x* provided on a second end portion 194C of the insertion body 191C. The guide member 50C is configured to be fixed to the installation surface 52 on the vehicle body 2 side in a state in which the protrusions 80*x* are crushed.

As described above, also in the present embodiment, the same effects as those of the first embodiment can be obtained.

Moreover, in the present embodiment, the insertion body 191C as the buffer member 80C inserted into the hole portion 190C of the base member 81C forms the guide surface 65C of the guide member 50C.

According to the above-described configuration, a larger amount of elastic deformation can be secured for the insertion body 191C as the buffer member 80C disposed on the guide surface 65C that defines the engagement and disengagement trajectory with respect to the guide groove 42. Therefore, it is possible to effectively alleviate the impact acting on the guide member 50C due to the abutment of the axial engagement portion 41.

Furthermore, since the insertion body 191C itself forming the guide surface 65C of the guide member 50C is elastically deformed, there is an advantage that the axial engagement portion 41 is hardly caught when the axial engagement portion 41 is engaged with or disengaged from the guide groove 42. Therefore, the rocking of the door 5 caused by the occurrence of the catching can be suppressed, and good operation feeling can be secured.

Moreover, the shape of the base member 81C can be simplified. Accordingly, the manufacturing can be easily performed and the cost can be reduced. In addition, the assemblability of the insertion body 191C to the base member 81C can be improved.

The above-described embodiments can be modified as below. The above-described embodiments and the following modification examples can be implemented in combination with each other within a range not technically contradictory.

In the above-described embodiments, the connection length variable mechanism 35 has a configuration as the joint link mechanism 100 formed by rotatably coupling the vehicle body-side link 91 having the first rotation coupling point X1 and the door-side link 92 having the second rotation coupling point X2. However, the present disclosure is not limited thereto, and the configuration of the connection length variable mechanism 35 may be arbitrarily changed.

Figure 53:
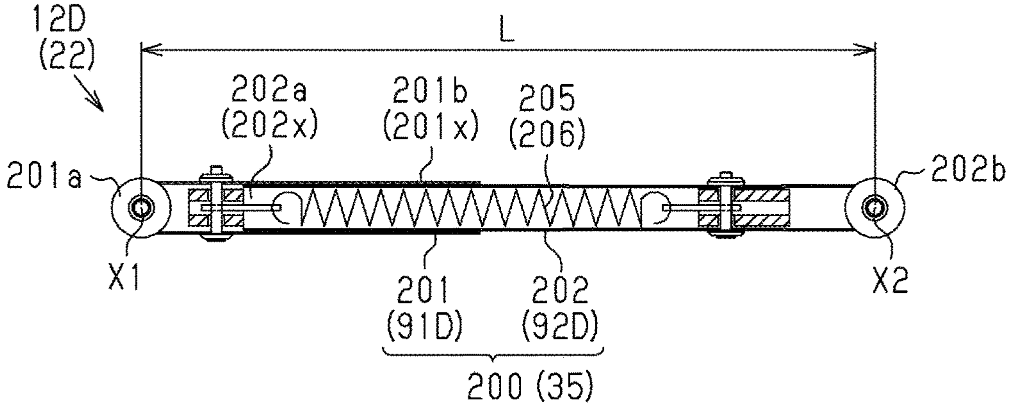
FIG. 53 is a plan view of an extension and contraction link mechanism forming a connection length variable mechanism of another example.
Figure 54:
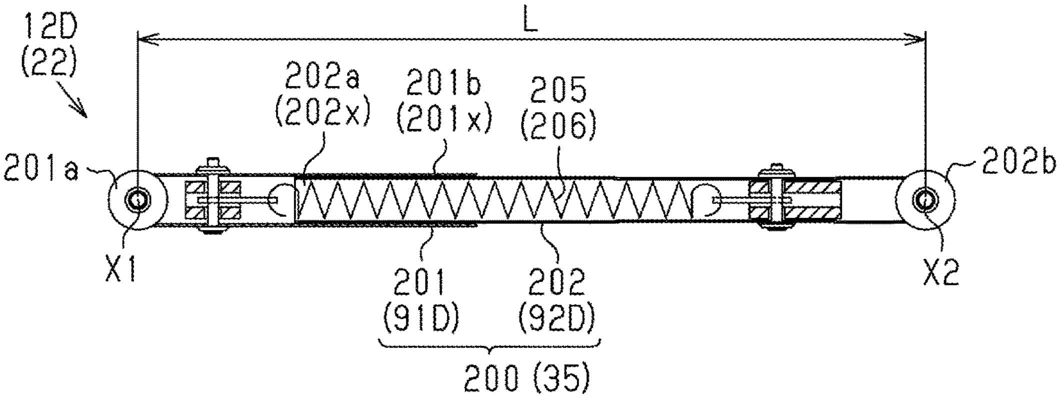
FIG. 54 is a plan view of an extension and contraction link mechanism.

For example, a linear motion extension and contraction link mechanism 200 as illustrated in FIGS. 53 and 54 may be provided to a second link arm 12D as the connection length variable mechanism 35. That is, the second link arm 12D illustrated in another example includes an outer tube 201 and an inner tube 202 disposed concentrically. Specifically, the outer tube 201 has the first rotation coupling point X1 with respect to the vehicle body 2 on a first end portion 201*a* side and an opening portion 201*x* on a second end portion 201*b* side. Furthermore, the inner tube 202 has the second rotation coupling point X2 with respect to the door 5 on a second end portion 202*b* side and an opening portion 202*x* on a first end portion 202*a* side. Moreover, the inner diameter of the outer tube 201 is set to a value greater than the outer diameter of the inner tube 202. The second link arm 12D is configured such that the outer tube 201 and the inner tube 202 are concentrically disposed by inserting the first end portion 202*a* side of the inner tube 202 into the cylinder of the outer tube 201 from the second end portion 201*b* side.

That is, in the second link arm 12D illustrated in another example, the outer tube 201 forms a vehicle body-side link 91D, and the inner tube 202 forms a door-side link 92D. The outer tube 201 and the inner tube 202 are relatively displaced in an axial direction, and thus the connection length L between the first and second rotation coupling points X1 and X2 changes.

Specifically, the outer tube 201 and the inner tube 202 are relatively displaced in a direction in which the inner tube 202 is drawn out from the cylinder of the outer tube 201, and thus the connection length L between the first and second rotation coupling points X1 and X2 is extended. The outer tube 201 and the inner tube 202 are relatively displaced in a direction in which the inner tube 202 is retracted into the cylinder of the outer tube 201, and thus the connection length L between the first and second rotation coupling points X1 and X2 is shortened.

Furthermore, the second link arm 12D illustrated in another example is provided with a biasing member 205 that applies a tensile force in a direction of shortening the connection length L between the first and second rotation coupling points X1 and X2. As the biasing member 205, for example, a tension spring 206 can be used. By using the biasing force F generated by the biasing member 205, the connection length L between the first rotation coupling point X1 and the second rotation coupling point X2 is held at the time of the opening-and-closing operation of the door 5. Even when such a configuration is adopted, the same effects as those of the above-described embodiments can be obtained.

Furthermore, in another example, the extension and contraction link mechanism 200 is formed by using the long cylindrical outer tube 201 and inner tube 202 disposed concentrically as the vehicle body-side link 91D and the door-side link 92D. However, the present disclosure is not limited thereto, and the vehicle body-side link 91D and the door-side link 92D may not necessarily have a cylindrical shape disposed concentrically. As long as the vehicle body-side link 91D and the door-side link 92D are disposed so as to be relatively displaceable in an axial direction, the shapes of the vehicle body-side link 91D and the door-side link 92D may be arbitrarily changed.

A vehicle door device includes: first and second link arms that have a first rotation coupling point with respect to a vehicle body and a second rotation coupling point with respect to a door of a vehicle; a door-side engagement portion that is provided at a close-side end portion of the door that opens and closes a door opening of the vehicle based on operation of a link mechanism formed by the first and second link arms; and a vehicle body-side engagement portion that is provided at a close-side end portion of the door opening that the close-side end portion of the door comes into contact with and separates from based on opening-and-closing operation of the door, in which one side of the door-side engagement portion and the vehicle body-side engagement portion includes an axial engagement portion extending in a vertical direction of the vehicle, the other side of the door-side engagement portion and the vehicle body-side engagement portion includes a guide groove having a pair of side wall portions facing each other in a vehicle width direction and extending in an opening-and-closing operation direction of the door, and the axial engagement portion is disposed inside the guide groove at an opening-and-closing operation position in the vicinity of a fully closed position of the door at which the door-side engagement portion and the vehicle body-side engagement portion are engaged with each other.

According to the above-described configuration, the axial engagement portion is disposed inside the guide groove, and thus the displacement of the door in the vehicle width direction is regulated. Therefore, even at the opening-and-closing operation position in the vicinity of the fully closed position at which the first and second link arms are brought closer to each other and are linearly aligned, the door can be stably supported.

According to the present disclosure, even in a case where the opening-and-closing operation position of the door is in the vicinity of the fully closed position, the opening-and-closing operation can be performed in a state in which the door is stably supported.

The vehicle door device further includes a guide member that forms the guide groove, and the guide member includes a buffer member having elasticity that reduces impact when the axial engagement portion that relatively moves based on the opening-and-closing operation of the door abuts against the guide member.

According to the above-described configuration, when the door-side engagement portion and the vehicle body-side engagement portion are engaged with or disengaged from each other based on the opening-and-closing operation of the door, it is possible to effectively alleviate the impact acting on the guide member due to the abutment of the axial engagement portion. Therefore, it is possible to suppress the generation of noise or vibration and secure a high operation feeling.

In the vehicle door device, the buffer member is provided at a position at which the axial engagement portion abuts against the guide member.

According to the above configuration, the axial engagement portion abuts against the guide member via the elastic buffer member, and thus the impact acting on the guide member due to the abutment of the axial engagement portion can be effectively alleviated.

In the vehicle door device, the guide member is fixed to an installation surface set at the close-side end portion of the door or the close-side end portion of the door opening, and the buffer member is provided on a fixing surface with respect to the installation surface.

According to the above configuration, the buffer member interposed between the installation surface and the fixing surface of the guide member is elastically deformed, and thus the impact acting on the guide member due to the abutment of the axial engagement portion can be effectively alleviated.

In the vehicle door device, the buffer member has protrusions that come into contact with the installation surface and are crushed by the fixing.

According to the above-described configuration, since the crushed protrusions reduce backlash, rattling of the guide member fixed to the installation surface can be suppressed. Therefore, a high operation feeling can be secured.

In the vehicle door device, the buffer member and the installation surface are preferably located on an extension line in a direction in which the axial engagement portion comes into contact with and separates from based on the opening-and-closing operation of the door.

According to the above-described configuration, it is possible to effectively alleviate the impact acting on the guide member due to the abutment of the axial engagement portion.

In the vehicle door device, the guide member includes a base member having the guide groove and a covering body forming the buffer member in a state of covering the base member.

According to the above-described configuration, the buffer member can be appropriately disposed at a position at which the impact when the axial engagement portion abuts against the guide member can be alleviated. Moreover, for example, the covering body to be the buffer member can be integrally molded with the base member by using two-color molding.

Therefore, the manufacturing process of the guide member can be facilitated.

In the vehicle door device, the guide member includes a base member having the guide groove and an insertion body forming the buffer member in a state of being inserted into a hole portion provided on the base member.

According to the above-described configuration, the buffer member can be appropriately disposed at a position at which the impact when the axial engagement portion abuts against the guide member can be alleviated. Moreover, the base member and the buffer member can be easily and integrally assembled. Therefore, the manufacturing process of the guide member can be facilitated.

In the vehicle door device, the base member forms a guide surface continuous with the guide groove, and includes the hole portion opened to the guide surface, and the insertion body forms the buffer member in a state of protruding to the guide surface.

According to the above-described configuration, the buffer member can be appropriately disposed on the guide surface that comes into contact with the axial engagement portion that comes into contact with and separates from the guide member based on the opening-and-closing operation of the door and defines the engagement and disengagement trajectory with respect to the guide groove. Therefore, it is possible to effectively alleviate the impact acting on the guide member due to the abutment of the axial engagement portion.

Furthermore, the elastic deformation amount of the buffer member in accordance with the abutment of the axial engagement portion can be controlled based on the amount of protrusion from the hole portion. That is, the portion protruding to the guide surface is crushed, and thus the axial engagement portion directly abuts on the guide surface. Accordingly, the engagement and disengagement trajectory of the axial engagement portion with respect to the guide groove can be accurately defined.

In the vehicle door device, the guide member includes a guide surface continuous with the guide groove, and the insertion body forms the guide surface.

According to the above-described configuration, a larger amount of elastic deformation can be secured for the insertion body as the buffer member disposed on the guide surface that defines the engagement and disengagement trajectory with respect to the guide groove. Therefore, it is possible to effectively alleviate the impact acting on the guide member due to the abutment of the axial engagement portion.

Furthermore, since the insertion body itself forming the guide surface of the guide member is elastically deformed, there is an advantage that the axial engagement portion is hardly caught when the axial engagement portion is engaged with or disengaged from the guide groove. Therefore, the rocking of the door caused by the occurrence of the catching can be suppressed, and good operation feeling can be secured.

Moreover, the shape of the base member can be simplified. Accordingly, the manufacturing can be easily performed and the cost can be reduced. In addition, the assemblability of the insertion body to the base member can be improved.

The vehicle door device is configured such that the insertion body is sandwiched between the axial engagement portion and an installation surface of the guide member set at the close-side end portion of the door or the close-side end portion of the door opening.

According to the above-described configuration, it is possible to elastically deform the insertion body based on the pressing force of the axial engagement portion abutting on the insertion body forming the buffer member without interposing the base member. Therefore, it is possible to effectively alleviate the impact acting on the guide member due to the abutment of the axial engagement portion.

The vehicle door device further includes a guide member that forms the guide groove, in which the guide member includes a guide surface continuous with the guide groove, and includes first and second guide members that are disposed to be separated from each other in the vertical direction as the guide member, the first guide member has a guide protrusion protruding in a contacting-and-separating direction of the axial engagement portion based on the opening-and-closing operation of the door, the guide protrusion forms the guide surface, and the second guide member does not have the guide protrusion, or an amount of protrusion of the guide protrusion forming the guide surface is smaller than that of the first guide member.

According to the above-described configuration, in the first guide member, the engagement and disengagement trajectory of the axial engagement portion with respect to the first guide member is defined by the guide surface formed by the guide protrusion. Furthermore, in the second guide member, the degree of freedom of engagement and disengagement of the axial engagement portion with respect to the second guide member is increased. Accordingly, the axial engagement portions of the first and second guide members are hardly caught by the corresponding first and second guide members when the corresponding axial engagement portions are engaged with or disengaged from the first and second guide members. As a result, the rocking of the door caused by the occurrence of the catching can be suppressed, and good operation feeling can be secured.

In the vehicle door device, the first link arm has the second rotation coupling point coupled to the door at a position closer to the center of gravity of the door than the second link arm, and the first guide member is provided at a first vertical direction position corresponding to the first link arm.

That is, near the support position by the first link arm configured as described above, the orientation change of the door tends to be small, that is, the engagement and disengagement orientation of the axial engagement portion with respect to the guide groove tends to hardly change.

Therefore, by providing the first guide member having the guide protrusion at the first vertical direction position corresponding to the first link arm, it is possible to define the engagement and disengagement trajectory while preventing the axial engagement portion from being caught.

The vehicle door device further includes a connection length variable mechanism that is provided in the second link arm and allows changing a connection length between the first and second rotation coupling points, and the second guide member is provided at a second vertical direction position corresponding to the second link arm.

According to the above-described configuration, in a state in which the door-side engagement portion and the vehicle body-side engagement portion are engaged with each other, the opening-and-closing operation trajectory of the door changes from the arc-shaped glide trajectory to the linear slide trajectory based on the operation of the connection length variable mechanism. Therefore, the door can be smoothly closed to the fully closed position and opened from the fully closed position.

However, near the position supported by the second link arm provided with the connection length variable mechanism, the orientation change of the door tends to be large. That is, the engagement and disengagement orientation of the axial engagement portion with respect to the guide groove tends to change easily. In view of this point, as in the above-described configuration, the second guide member is provided at the second vertical direction position corresponding to the second link arm having the connection length variable mechanism. Therefore, by securing the degree of freedom of engagement or disengagement of the axial engagement portion, it is possible to effectively prevent the axial engagement portion from being caught.

The vehicle door device further includes a connection length variable mechanism that is provided in at least one of the first link arm or the second link arm, and allows changing a connection length between the first and second rotation coupling points.

According to the above-described configuration, the opening-and-closing operation trajectory of the door can be changed based on the operation of the connection length variable mechanism.

The vehicle door device further includes a guide member that forms the guide groove and a fixing bracket that fixes the guide member to an installation surface in a state in which a formation portion of the guide groove is sandwiched between the fixing bracket and the installation surface set at the close-side end portion of the door or the close-side end portion of the door opening.

According to the above-described configuration, the guide member can be stably fixed to the installation surface. In particular, one side wall portion of the guide groove engaged with the axial engagement portion tends to have a cantilever beam structure. However, by sandwiching the formation portion of the guide groove with the installation surface, high strength can be secured. Moreover, the fixing bracket can cover the formation portion of the guide groove. Therefore, the guide groove can be protected, and, for example, clothes of the user can be prevented from being caught by the guide groove.

In the vehicle door device, the fixing bracket has a regulation wall that sandwiches the formation portion of the guide groove with the installation surface, and includes a coupling shaft passing through the guide member and the fixing bracket in a state of being parallel to the installation surface and the regulation wall.

According to the above-described configuration, when the axial engagement portion abuts against the guide member, a direction in which the guide member is displaced with the coupling shaft as the support shaft is defined. That is, the guide member tends to rotate around the coupling shaft by the abutment of the axial engagement portion. The movement of the guide member is regulated by the installation surface or the regulation wall of the fixing bracket, which is located in the rotation direction, and thus the guide member can be stably fixed to the installation surface.

In the vehicle door device, the door-side engagement portion has the axial engagement portion, and the vehicle body-side engagement portion has the guide groove.

According to the above-described configuration, the door-side engagement portion is less likely to interfere with a user when the user gets on and off the vehicle. Moreover, when the guide groove is provided on the vehicle body-side engagement portion side, for example, clothes of the user are less likely to be caught by the guide groove. Therefore, convenience can be improved.

The vehicle door device further includes an actuator that applies a drive force to the link mechanism to open and close the door.

According to the above-described configuration, convenience can be improved.

In the above-described embodiments, the first link arm 11 having the configuration as the main link 21 is disposed above the second link arm 12 having the configuration as the sub-link 22. The second link arm 12 is disposed at a position closer to the close-side end portion 33 of the door 5 than the first link arm 11. However, the present disclosure is not limited thereto, and the arrangement of the first and second link arms 11 and 12 may be arbitrarily changed.

In the above-described embodiments, the connection length variable mechanism 35 is provided in the second link arm 12, but the connection length variable mechanism 35 may be provided in the first link arm 11. Furthermore, the connection length variable mechanism 35 may be provided in both the first and second link arms 11 and 12. Since the first and second link arms 11 and 12 and the connection length variable mechanism 35 are disposed, the connection length L between the first and second rotation coupling points X1 and X2 may be extended by the operation of the connection length variable mechanism 35 when the door 5 is closed to the fully closed position P0.

Moreover, the biasing members 115 and 205 of the connection length variable mechanism 35 may be arbitrarily changed. For example, another elastic member such as a compression spring, or a gas biasing member or an electromagnetic biasing member may be used. Furthermore, since the connection length variable mechanism 35 is disposed, a biasing force in a direction of extending the connection length L between the first and second rotation coupling points X1 and X2 may be generated. The connection length variable mechanism 35 may not be provided with a biasing member.

In the above-described embodiments, the actuator 25 drives the first link arm 11, but may be configured to drive the second link arm 12. Furthermore, the actuator 25 may be configured to drive both the first and second link arms 11 and 12. That is, the number and arrangement of the actuators 25 may be arbitrarily changed. Furthermore, for example, the actuator 25 may be provided on the door 5 side. Moreover, the actuator 25 may be incorporated in the link arm. The configuration of the actuator 25 may also be arbitrarily changed.

In the above-described embodiments, the present disclosure is applied to the configuration in which the door 5 of the vehicle 1 performs the opening operation toward the vehicle rear side. However, the present disclosure may be applied to the configuration in which the door 5 performs the opening operation toward the vehicle front side. The present disclosure may be applied to a manual door device having no drive source such as the actuator 25.

In the above-described embodiments, the axial engagement portion 41 is formed by the roller 48 axially supported by the support shaft 47, but the axial engagement portion 41 does not necessarily need to rotate.

In the above-described embodiments, the door-side engagement portion 31 has the axial engagement portion 41, and the vehicle body-side engagement portion 32 has the guide groove 42. However, the present disclosure is not limited thereto, and the door-side engagement portion 31 may have the guide groove 42, and the vehicle body-side engagement portion 32 may have the axial engagement portion 41. In this case, for example, the guide member 50 may be fixed to the installation surface 43 set at the close-side end portion 33 of the door 5.

In the above-described embodiments, the guide member 50 is fixed to the installation surface 52 by using the fixing bracket 53. The fixing bracket 53 fixes the guide member 50 between the fixing bracket 53 and the installation surface 52 in a state in which the formation portion of the guide groove 42 provided in the guide member 50 is sandwiched. However, the present disclosure is not limited thereto, and the fixing structure of the guide member 50 may be arbitrarily changed including the shape of the fixing bracket 53. For example, the regulation wall 61 that sandwiches the formation portion of the guide groove 42 with the installation surface 52 or the coupling shaft 83 passing through the guide member 50 and the fixing bracket 53 in a state of being parallel to the installation surface 52 and the regulation wall 61 may not be provided. For example, the guide member 50 may be directly fixed to the installation surface 52 without using the fixing bracket 53.

In the above-described embodiments, the guide member 50 includes the buffer member 80 that alleviates the impact when the axial engagement portion 41 abuts against the guide member 50. The buffer member 80 is provided at a position at which the axial engagement portion 41 abuts against the guide member 50, on the fixing surface 54 of the guide member 50 with respect to the installation surface 52, and on the guide surface 65 continuous with the guide groove 42.

However, the present disclosure is not limited thereto, and the shape and arrangement of the buffer member 80 may be arbitrarily changed. For example, the buffer member 80 may be provided only at a position at which the axial engagement portion 41 abuts against the guide member 50. Moreover, the buffer member 80 may be provided only on the guide surface 65. Furthermore, for example, the buffer member 80 may be provided only on the fixing surface 54 with respect to the installation surface 52. The buffer member 80 and the installation surface 52 may not necessarily be located on an extension line in a direction in which the axial engagement portion 41 comes into contact with and separates from the guide member 50. The guide member 50 may not include the buffer member 80.

Furthermore, the number of the protrusions 80*x* crushed by the installation surface 52 may be arbitrarily changed. The buffer member 80 may not have the protrusions 80*x*.

In the first embodiment, the covering body 82 covering the base member 81 having the guide groove 42 functions as the buffer member 80. The base member 81 and the covering body 82 are integrally formed by insert molding, more specifically, two-color molding. However, the present disclosure is not limited thereto, and for example, the covering body 82 to be the buffer member 80 may be attached to the base member 81 by adhesion or the like.

In the second and third embodiments, the insertion bodies 191 and 191C for the hole portions 190 and 190C provided on the base members 81B and 81C function as the buffer members 80B and 80C. Moreover, the hole portions 190 and 190C have configurations as through holes penetrating the base members 81B and 81C. Accordingly, the insertion bodies 191 and 191C as the buffer members 80B and 80C inserted into the hole portion 190 and 190C are provided at the position at which the axial engagement portion 41 abuts, and on the fixing surface 54 with respect to the installation surface 52. However, the present disclosure is not limited thereto, and the shapes of the hole portions 190 and 190C and the insertion bodies 191 and 191C may be arbitrarily changed. For example, the insertion bodies 191 and 191C are not necessarily configured to be sandwiched between the axial engagement portion 41 abutting on the insertion bodies 191 and 191C and the installation surface 52. As in the above-described another example, the covering body 82 to be the buffer member 80 may be combined with a configuration in which the covering body 82 is attached to the base member 81.

In the above-described embodiments, as the guide member 50, the first and second guide members 71 and 72 that are disposed to be separated from each other in the vertical direction are provided. The first guide member 71 has the guide protrusion 73 protruding in the contacting-and-separating direction of the axial engagement portion 41 based on the opening-and-closing operation of the door 5, and the guide protrusion 73 forms the guide surface 65. The second guide member 72 does not have the guide protrusion 73. However, the present disclosure is not limited thereto, and the second guide member 72 may be configured such that a protrusion amount a of the guide protrusion 73 forming the guide surface 65 is smaller than that of the first guide member 71. Even when such a configuration is adopted, the degree of freedom of engagement and disengagement of the axial engagement portion 41 with respect to the second guide member 72 is increased, and the axial engagement portion 41 can be made less likely to be caught.

Furthermore, in a case where the first and second guide members 71 and 72 have different shapes, the buffer member 80 may be provided in the second guide member 72. Therefore, it is possible to more effectively suppress noise and vibration generated when the axial engagement portion 41 abuts and to secure a high operation feeling.

Furthermore, the second guide member 72 may have the same configuration as that of the first guide member 71. Therefore, a stable engagement and disengagement trajectory of the axial engagement portion 41 can be more effectively defined by the guide surface 65 formed by the guide protrusion 73.

Furthermore, the number and arrangement of the door-side engagement portions 31 and the vehicle body-side engagement portions 32 may be arbitrarily changed. The first guide member 71 having the guide protrusion 73 may be only required to be provided at a vertical direction position close to the center of gravity G of the door 5. The second guide member 72 is provided at a height position at which the connection length variable mechanism 35 is disposed. That is, in comparison with the first guide member 71, it is only required to provide the guide member 50 which does not have the guide protrusion 73 or in which the protrusion amount a of the guide protrusion 73 forming the guide surface 65 is smaller as in the above-described another example.

Next, a technical idea that can be grasped from the above-described embodiments and modification examples will be described.

(A) The guide member includes a guide surface continuous with the guide groove, and the buffer member is provided on the guide surface.

That is, the axial engagement portion that is engaged with or disengaged from the guide groove of the guide member based on the opening-and-closing operation of the door is guided in a direction of entering the guide groove and in a direction of disengaging from the guide groove by abutting on the guide surface. According to the above-described configuration, it is possible to effectively alleviate the impact acting on the guide member due to the abutment of the axial engagement portion.

(B) The axial engagement portion is axially supported to be rotatable.

According to the above-described configuration, the axial engagement portion can be smoothly engaged with and disengaged from the guide groove.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle door device comprising:

first and second link arms each having a first rotation coupling point with respect to a vehicle body of a vehicle and a second rotation coupling point with respect to a door of the vehicle;

a door-side engagement portion that is provided at a close-side end portion of the door configured to open or close a door opening of the vehicle based on operation of a link mechanism comprising the first and second link arms; and a vehicle body-side engagement portion that is provided at a close-side end portion of the door opening, the close-side end portion of the door being configured to come into contact with or separate from the vehicle body-side engagement portion based on opening-and-closing operation of the door, wherein the door-side engagement portion includes an axial engagement portion extending in a vertical direction of the vehicle, the vehicle body-side engagement portion includes a guide groove having a pair of side wall portions facing each other in a vehicle width direction and extending along an operation trajectory of the door, the axial engagement portion is disposed inside the guide groove when the door-side engagement portion and the vehicle body-side engagement portion are engaged with each other, the vehicle door device further comprises a guide member that forms the guide groove, the guide member includes first and second guide members that are disposed to be separated from each other in the vertical direction, the first guide member has a guide surface including a guide protrusion protruding outward in the vehicle width direction of the axial engagement portion, and the second guide member has a guide surface that does not have the guide protrusion, the axial engagement portion includes a first axial engagement portion and a second axial engagement portion, an opening of the second guide member which is a widest portion of the second guide member in which the second axial engagement portion engages with the guide surface of the second guide member is larger than an opening of the first guide member which is a widest portion of the first guide member in which the first axial engagement portion engages with the guide surface of the first guide member, and an inclined surface of the guide protrusion at the opening of the first guide member is a curved surface having a substantially constant curvature, and the guide surface at the opening of the second guide member is substantially flat.

2. The vehicle door device according to claim 1, wherein each of the first and second guide members includes a buffer member having elasticity that reduces impact when each of the first and second axial engagement portions, that relatively move based on the opening-and-closing operation of the door, respectively abuts against the first and second guide members.

3. The vehicle door device according to claim 2, wherein the buffer member is provided at a position at which each of the first and second axial engagement portions respectively abuts against the first and second guide members.

4. The vehicle door device according to claim 2, wherein the first and second guide members each includes a base member having the guide groove and a covering body which covers the base member, the base member and the covering body forming the buffer member.

5. The vehicle door device according to claim 2, wherein the first and second guide members each includes a base member having the guide groove and an insertion body inserted into the base member, the base member and the insertion body forming the buffer member.

6. The vehicle door device according to claim 5, wherein the base member includes a hole portion.

7. The vehicle door device according to claim 1, wherein the first link arm has the second rotation coupling point coupled to the door at a position closer to a center of gravity of the door than the second link arm, and the first guide member is provided at a first vertical position vertically aligned with the first link arm.

8. The vehicle door device according to claim 1, further comprising a connection length variable mechanism that is provided in the second link arm and allows changing a connection length between the first rotation coupling point and the second rotation coupling point, wherein the second guide member is provided at a second vertical direction position corresponding to the second link arm.

9. The vehicle door device according to claim 1, further comprising a connection length variable mechanism that is provided in at least one of the first link arm or the second link arm, and allows changing a connection length between the first rotation coupling point and the second rotation coupling point.

10. The vehicle door device according to claim 1, wherein the first and second guide members each having a fixing bracket that fixes to an installation surface in a state in which a front end portion of the first and second guide members is sandwiched between the fixing bracket and the installation surface.

11. The vehicle door device according to claim 10, wherein the fixing bracket has a regulation wall, and includes a coupling shaft passing through the first and second guide members and the fixing bracket in a state of being parallel to the installation surface and the regulation wall.

12. The vehicle door device according to claim 1, further comprising an actuator that applies a drive force to the link mechanism to open and close the door.

* * * * *